US012311521B2

(12) United States Patent
Wason et al.

(10) Patent No.: US 12,311,521 B2
(45) Date of Patent: May 27, 2025

(54) TOOL WITH MULTI-STAGE TRIGGER

(71) Applicant: Hubbell Incorporated, Shelton, CT (US)

(72) Inventors: Peter Matthew Wason, Derry, NH (US); Brian McCulloh White, Manchester, NH (US); John David LeFavour, Litchfield, NH (US)

(73) Assignee: Hubbell Incorporated, Shelton, CT (US)

( * ) Notice: Subject to any disclaimer, the term of this patent is extended or adjusted under 35 U.S.C. 154(b) by 317 days.

(21) Appl. No.: 17/939,784

(22) Filed: Sep. 7, 2022

(65) Prior Publication Data

US 2023/0072765 A1 Mar. 9, 2023

Related U.S. Application Data

(60) Provisional application No. 63/241,477, filed on Sep. 7, 2021.

(51) Int. Cl.

| | |
|---|---|
| ***B25F 5/00*** | (2006.01) |
| ***B25B 5/16*** | (2006.01) |
| ***B25B 27/14*** | (2006.01) |
| ***B25F 5/02*** | (2006.01) |

(52) U.S. Cl.

CPC .................. *B25F 5/02* (2013.01); *B25B 5/16* (2013.01); *B25B 27/146* (2013.01)

(58) Field of Classification Search

CPC .......................... A61B 18/1445; B25B 27/146

See application file for complete search history.

(56) References Cited

U.S. PATENT DOCUMENTS

| | | | |
|---|---|---|---|
| 2,780,944 | A | 2/1957 | Ondeck |
| D378,340 | S | 3/1997 | Harte |
| 5,662,545 | A | 9/1997 | Zimmerman |
| D386,660 | S | 11/1997 | Hirabayashi |
| 5,735,353 | A | 4/1998 | Undin |
| 5,779,589 | A | 7/1998 | Futterer |
| D404,627 | S | 1/1999 | Hirabayashi |
| RE37,905 | E | 11/2002 | Bourner et al. |
| 6,520,266 | B2 | 2/2003 | Bongers-Ambrosius et al. |
| 6,662,620 | B1 | 12/2003 | Baron et al. |

(Continued)

FOREIGN PATENT DOCUMENTS

| | | |
|---|---|---|
| CN | 107405703 | 11/2017 |
| CN | 107810076 | 3/2018 |

(Continued)

OTHER PUBLICATIONS

International Preliminary Report on Patentability in corresponding International Application No. PCT/US2022/042782 mailed Mar. 21, 2024. (9 pages).

(Continued)

*Primary Examiner* — Eyamindae C Jallow

(74) *Attorney, Agent, or Firm* — Wissing Miller LLP

(57) ABSTRACT

A multi-stage trigger assembly for portable, hand-held, battery powered tools is provided. The tool may be configured as a crimping tool, a cutting tool or other type of tool. The tool has an in-line handle assembly and a working head assembly. The trigger assembly has a first stage that is a manual operation and a second stage that is an electro-mechanical operation.

16 Claims, 51 Drawing Sheets

(56) References Cited

U.S. PATENT DOCUMENTS

| | | | | |
|---|---|---|---|---|
| 6,676,558 | B2 | 1/2004 | Futterer | |
| D487,216 | S | 3/2004 | Arvidsson et al. | |
| 7,219,526 | B2 | 5/2007 | Herod | |
| D547,264 | S | 7/2007 | Kondo | |
| D553,937 | S | 10/2007 | Karlsson | |
| D572,554 | S | 7/2008 | Chen | |
| 7,464,578 | B2 | 12/2008 | Ayer et al. | |
| D591,128 | S | 4/2009 | Chuan | |
| D597,482 | S | 8/2009 | Kondo | |
| D597,690 | S | 8/2009 | Yamamoto | |
| D614,472 | S | 4/2010 | Meyers | |
| 7,766,787 | B2 | 8/2010 | Liu | |
| D656,370 | S | 3/2012 | Tinius | |
| D657,220 | S | 4/2012 | Isobe et al. | |
| D657,221 | S | 4/2012 | Isobe et al. | |
| 8,313,411 | B2 | 11/2012 | Schafer | |
| 8,336,640 | B2 | 12/2012 | Saur | |
| D673,829 | S | 1/2013 | Takeshima et al. | |
| D696,090 | S | 12/2013 | Takeshima et al. | |
| 8,829,750 | B2 | 9/2014 | Sherwin et al. | |
| D716,124 | S | 10/2014 | Kamijyo | |
| D718,108 | S | 11/2014 | Beukema | |
| D729,602 | S | 5/2015 | Stucki et al. | |
| 9,033,849 | B2 | 5/2015 | Klein et al. | |
| D734,112 | S | 7/2015 | Herault et al. | |
| 9,097,331 | B2 | 8/2015 | Saur et al. | |
| D767,959 | S | 10/2016 | Sokat et al. | |
| D767,960 | S | 10/2016 | Haneishi | |
| D774,858 | S | 12/2016 | Stucki et al. | |
| D779,902 | S | 2/2017 | Sokat et al. | |
| 9,680,347 | B2 | 6/2017 | Sherwin et al. | |
| 9,993,885 | B2 | 6/2018 | Frenken | |
| D832,670 | S | 11/2018 | Uchiyama | |
| D834,908 | S | 12/2018 | Konnecke et al. | |
| D835,487 | S | 12/2018 | Wason et al. | |
| D845,729 | S | 4/2019 | Kitahara | |
| D849,808 | S | 5/2019 | Assmann | |
| D859,949 | S | 9/2019 | Wason et al. | |
| D861,455 | S | 10/2019 | Chang | |
| D891,212 | S | 7/2020 | Suzuki | |
| D891,214 | S | 7/2020 | Lu | |
| D892,592 | S | 8/2020 | Patil et al. | |
| D894,703 | S | 9/2020 | White | |
| D907,978 | S | 1/2021 | Schaefer et al. | |
| D932,268 | S | 10/2021 | Fang | |
| D1,002,313 | S | 10/2023 | Bert | |
| 11,785,887 | B2 | 10/2023 | Bicheier | |
| 2002/0007658 | A1 | 1/2002 | Amherd | |
| 2002/0056308 | A1 | 5/2002 | Frenken | |
| 2002/0094907 | A1 | 7/2002 | Elger | |
| 2004/0144146 | A1 | 7/2004 | Amherd et al. | |
| 2006/0272381 | A1 | 12/2006 | Ayer et al. | |
| 2007/0251711 | A1 | 11/2007 | Chen | |
| 2007/0256554 | A1 | 11/2007 | Montminy et al. | |
| 2008/0087064 | A1 | 4/2008 | Lefavour et al. | |
| 2009/0031779 | A1 | 2/2009 | Lefavour et al. | |
| 2009/0098975 | A1 | 4/2009 | Liu | |
| 2010/0107843 | A1 | 5/2010 | Lefavour et al. | |
| 2010/0325894 | A1 | 12/2010 | Scott et al. | |
| 2014/0001234 | A1 | 1/2014 | Shelton, IV et al. | |
| 2014/0088753 | A1 | 3/2014 | Lim | |
| 2015/0190917 | A1* | 7/2015 | Hua | B25F 5/02 173/169 |
| 2015/0196295 | A1 | 7/2015 | Shelton, IV et al. | |
| 2015/0209061 | A1* | 7/2015 | Johnson | A61B 90/03 606/171 |
| 2015/0251256 | A1 | 9/2015 | Frenken | |
| 2015/0272660 | A1* | 10/2015 | Boudreaux | A61B 17/320092 606/48 |
| 2016/0120601 | A1* | 5/2016 | Boudreaux | A61B 18/1445 606/33 |
| 2016/0268068 | A1 | 9/2016 | Chiasson et al. | |
| 2017/0202595 | A1* | 7/2017 | Shelton, IV | A61B 18/1445 |
| 2017/0202609 | A1* | 7/2017 | Shelton, IV | A61B 18/1445 |
| 2017/0302044 | A1 | 10/2017 | Lafavour et al. | |
| 2019/0047125 | A1 | 2/2019 | Junkers et al. | |
| 2019/0160639 | A1* | 5/2019 | Lefavour | B25B 27/146 |
| 2019/0207356 | A1 | 7/2019 | Lemke | |
| 2019/0363502 | A1* | 11/2019 | Glockseisen | B25B 7/12 |
| 2020/0036150 | A1* | 1/2020 | LeFavour | H01R 43/0428 |
| 2020/0198116 | A1 | 6/2020 | Skrobot | |
| 2021/0154821 | A1 | 5/2021 | Wason | |
| 2022/0347824 | A1* | 11/2022 | Lefavour | B25B 27/146 |
| 2023/0302621 | A1 | 9/2023 | Kamijo | |
| 2023/0318051 | A1 | 10/2023 | Ke | |
| 2024/0100665 | A1 | 3/2024 | Park | |

FOREIGN PATENT DOCUMENTS

| | | |
|---|---|---|
| DE | 19709017 | 6/1998 |
| EP | 679476 | 4/1995 |

OTHER PUBLICATIONS

Greenlee, Next Generation GATOR Tools Brochure, Sep. 2016 (40 pages).

Greenlee, Instruction Manual, EK50ML Battery-Powered Crimping Tool, Mar. 2015 (16 pages).

Greenlee, Battery Ratchet Cutter ESR1000LX product page, Apr. 2018 (1 page).

Milwaukee Force Logic 15T Crimper 2879, ProTool Reviews, URL:<https://www.protoolreviews.com/trades/electrical-trades/milwaukee-force-logic-15t-crimper-2879/44941/>, Sep. 28, 2020.

International Search Report and Written Opinion mailed in corresponding PCT/US22/42782 on Jan. 3, 2023 (10 pages).

Greenlee Tetron Inc, EL50ML Battery-powered Crimping Tool Instruction Manual, pp. 1-16, www.greenlee.com, Mar. 2015.

* cited by examiner

TOOL WITH MULTI-STAGE TRIGGER

CROSS-REFERENCE TO RELATED APPLICATIONS

The present disclosure is based on and claims benefit from co-pending U.S. Provisional Patent Application Ser. No. 63/241,477 filed on Sep. 7, 2021 entitled "Tool with Multi-Stage Trigger" the contents of which are incorporated herein in their entirety by reference.

BACKGROUND

Field

The present disclosure relates to trigger assemblies for portable, battery powered tools having one or more moving jaws. More particularly, the present disclosure relates to hand-held portable, hand-held tools with multi-stage trigger assemblies that provide a jaw hold feature where a jaw of a jaw assembly of the tool can be moved to hold an object before activation of the tool.

Description of the Related Art

Hand-held, battery powered tools, such as crimping tools, are known in the art. For example, using a hand-held, battery powered tool, an electrical wire termination can be manually held in place between a pair of jaws, typically a fixed jaw and a movable jaw. Crimping of the electrical wire termination is carried out when a motor is activated causing the movable jaw to move toward the fixed jaw so that the jaws impinge the object. However, manually holding an electrical wire termination between the pair of jaws and then activating the motor makes it difficult to align the electrical wire termination between the pair of jaws prior to activating the motor.

The present disclosure provides multi-stage trigger assemblies that can be used with hand-held, battery powered tools that use a single trigger assembly to facilitate activation of multiple tool functions.

SUMMARY

The present disclosure provides exemplary embodiments of two jaw, portable, hand-held, battery powered or motorized tools and multi-stage trigger assemblies for such tools. In one exemplary embodiment, a multi-stage trigger assembly for moving a movable jaw of a two jaw, portable, hand-held, motorized tool includes a trigger and at least one switch. The trigger has a pivot portion, a lever portion extending from a first end of the pivot portion and at least one leg extending from a second end of the pivot portion. The at least one leg may be, for example, a pair of legs. The at least one switch is attached to an interior of the tool so that the pivot portion of the trigger is in close proximity to the at least one switch. The pivot portion of the trigger is pivotably coupled to a portion of a fixed jaw of the two jaws of the tool such that when the lever portion of the trigger is manually articulated a first predefined distance, the at least one leg interacts with the movable jaw of the tool mechanically causing the movable jaw to move from a fully open position to a hold position. Further, when the lever portion of the trigger is manually articulated a second predefined distance, the switch is activated causing a motor in the tool to activate to electro-mechanically move the movable jaw from the hold position to an operation cycle position where an operation of the jaw assemblies is performed.

In this exemplary embodiment, the pivot portion of the trigger is normally biased, using for example one or more springs, away from the at least one switch while the lever portion of the trigger is manually articulated the first predefined distance. When the lever portion of the trigger is manually articulated the second predefined distance the biasing force is overcome permitting the trigger to activate the switch. Preferably, a pivot pin is inserted into a mounting aperture in the pivot portion of the trigger to pivotably coupled the pivot portion to a portion of a fixed jaw of the two jaws of the tool. In this embodiment, a portion of the pivot pin activates the switch.

The multi-stage trigger assembly may also include a safety system that is configured to selectively block movement of the trigger, e.g., the lever portion of the trigger, to the first predefined distance. In an exemplary embodiment, the safety system includes a button, a trigger blocking member and a cutout switch. The button is movable between an ON position and an OFF position. When the button is in the ON position the trigger blocking member blocks movement of the trigger, e.g., the lever portion of the trigger, to the first predefined distance and activates the cutout switch.

In one exemplary embodiment, a portable, hand-held, motorized tool includes a working head assembly, a handle assembly and a trigger assembly similar to the trigger assembly described above. The working head assembly has a fixed jaw assembly, a movable jaw assembly and a biasing member used to normally bias the movable jaw assembly in a direction away from the fixed jaw assembly to a fully open position.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The portable, battery-powered, hand-held tools contemplated by the present disclosure include crimping tools that crimp one or more conductors to an object and cutting tools used to cut one or more conductors. The present disclosure will be shown and described in connection with portable, battery-powered, hand-held tools with an in-line handle design. However, the handle design of the portable, battery-powered, hand-held tool may be a pistol grip design, a suitcase design or other type handle design. The present disclosure will also be shown and described in connection with a crimping tool. However, the crimping jaws of the tool may be substituted with jaws that perform other types of operations. For example, the crimping jaws of the tool may be substituted with cutting jaws to create a cutting tool.

For ease of description, the portable, battery-powered, crimping tools according to the present disclosure may also be referred to as the "tools" in the plural and the "tool" in the singular. Objects crimped by the crimping tool include wire terminations. Thus, objects crimped by the crimping tool may also be referred to herein as "wire terminations" in plural and "wire termination" in the singular. Non-limiting examples of the wire terminations include lugs and splices. The conductors, cables, wires or other objects to be crimped within the wire terminations by the tools of the present disclosure may also be referred to as the "conductors" in the plural and the "conductor" in the singular. In addition, as used in the present disclosure, the terms "front," "rear," "upper," "lower," "upwardly," "downwardly," "proximal," "distal" and other orientation descriptors are intended to facilitate the description of the exemplary embodiments disclosed herein and are not intended to limit the structure of the exemplary embodiments or limit the claims to any particular position or orientation.

Figure 1:
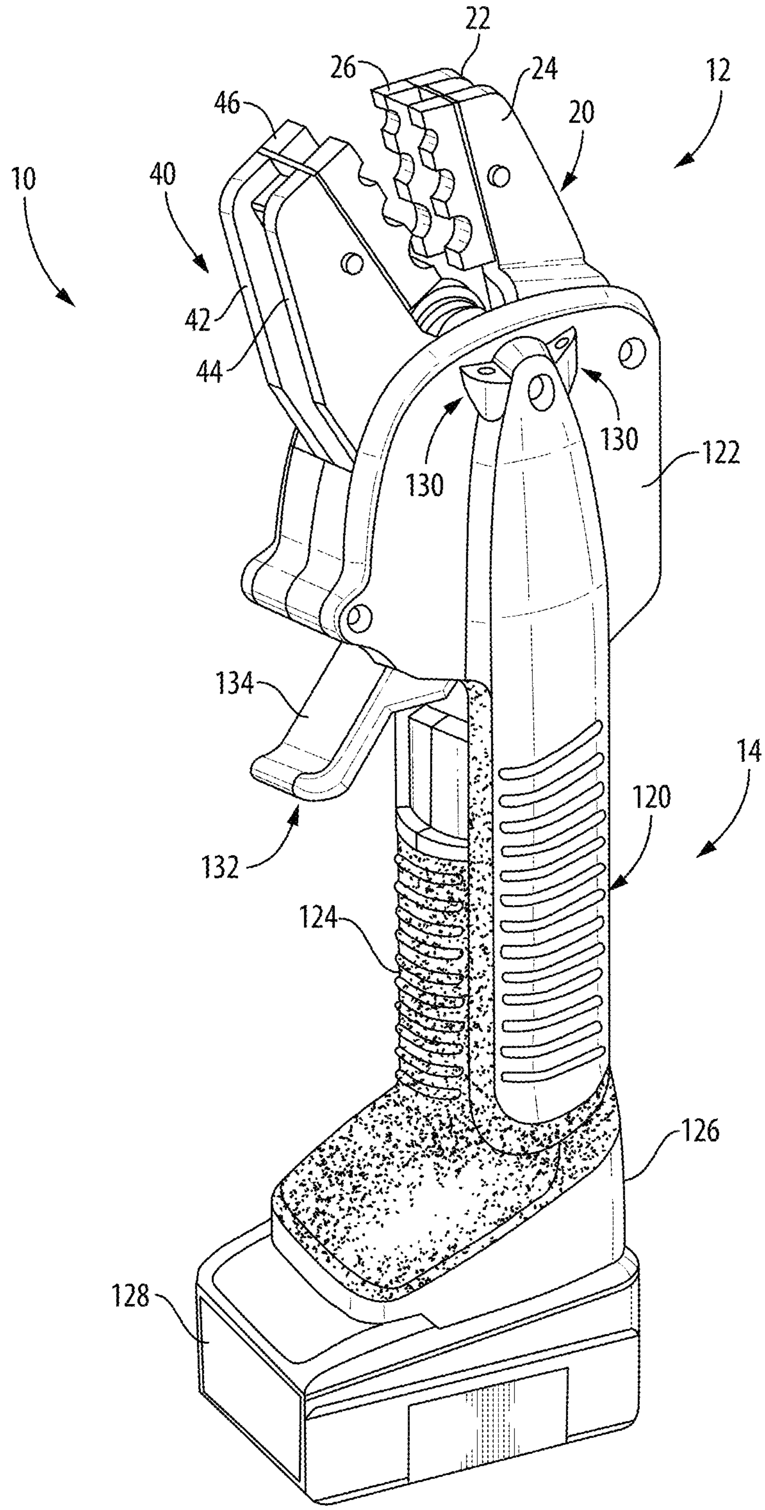
FIG. 1 is a side perspective view of a first side of an exemplary embodiment of a battery-powered tool according to the present disclosure, illustrating a working head assembly and a handle assembly.
Figure 2:
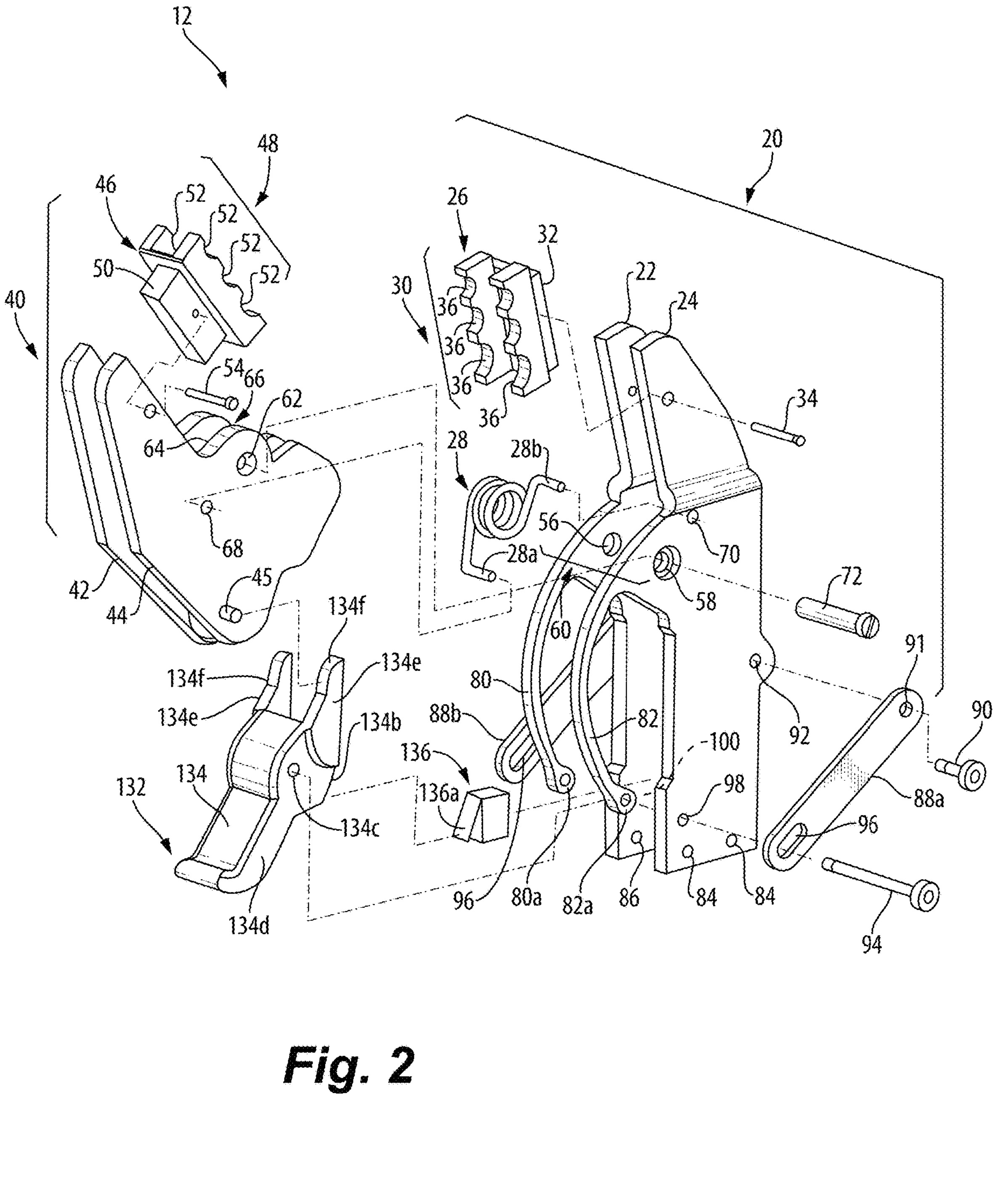
FIG. 2 is an exploded perspective view of an exemplary embodiment of jaw assemblies of the tool according to the present disclosure.

Referring to FIGS. 1 and 2, a battery-powered, hand-held crimping tool 10 according to the present disclosure is shown. The tool 10 includes a working head assembly 12 and a handle assembly 14. The working head assembly 12 includes a first jaw assembly 20 and a second jaw assembly 40. A biasing member 28 is used to normally and automatically bias the second jaw assembly 40 in a direction away from the first jaw assembly 20 to a fully open position, seen in FIG. 3. The first jaw assembly 20 includes a first jaw plate 22, a second jaw plate 24 and a die 26. The first jaw plate 22 and second jaw plate 24 are aligned in parallel and spaced apart, as shown in FIG. 2. In this exemplary embodiment, the die 26 includes one or more impinging regions 30 and a mounting member 32. Each of the one or more impinging regions 30 may include one or more impacting surfaces 36, each surface being configured and dimensioned to receive a barrel portion of a wire termination 800, seen in FIG. 5. The die 26 is secured to the first and second jaw plates 22 and 24 by positioning the mounting member 32 between the first and second jaw plates so that a fastener 34, e.g., a bolt, can be passed through apertures in the plates 22 and 24 and the mounting member 32, as shown, and tightened. In this exemplary embodiment, the first jaw assembly 20 is a fixed jaw assembly. The second jaw assembly 40 includes a first jaw plate 42, a second jaw plate 44 and a die 46. The first jaw plate 42 and second jaw plate 44 are aligned in parallel and spaced apart, as shown in FIG. 2. In this exemplary embodiment, the die 46 includes one or more impinging regions 48 and a mounting member 50. Each of the one or more impinging regions 48 may include one or more impacting surfaces 52, each surface 52 being configured and dimensioned to receive a barrel portion of a wire termination 800, seen in FIG. 5. The die 46 is secured to the first and second jaw plates 42 and 44 by positioning the mounting member 50 between the first and second jaw plates 42 and 44 so that a fastener 54, e.g., a bolt, can be passed through apertures in the plates 42 and 44 and the mounting member 50, as shown, and tightened. In this exemplary embodiment, the second jaw assembly 40 is a movable jaw assembly. It is noted that the dies 26 and 46 form a die assembly.

Continuing to refer to FIGS. 1 and 2, the second jaw assembly 40 is operatively coupled to the first jaw assembly 20 so that the second jaw assembly 40 is movable relative to the first jaw assembly 20. Various known techniques may be used to couple the jaw assemblies 20 and 40. For example, in the embodiment of FIG. 2, a tang and clevis type configuration is used, where a portion of the first and second jaw plates 22 and 24 include through apertures 56 and 58 acting as a clevis 60, and portion of the first and second jaw plates 42 and 44 include apertures 62 and 64 acting as a tang 66. In this exemplary embodiment, the biasing member 28, e.g., a helical torsion spring, is positioned within the tang 66 of the second jaw assembly 40 so that a central opening of the biasing member 28 is aligned with the apertures 62 and 64 in the tang 66. One end **28*a* of the biasing member 28 is inserted into a spring aperture 68 in the second jaw plate 44 of the second jaw assembly 40 to couple the biasing member 28 to the second jaw assembly 40. The tang 66 is then positioned between the clevis 60 of the first jaw assembly 20, and another end 28*b* of the biasing member 28 is inserted into a spring aperture 70 in the second jaw plate 24 of the first jaw assembly 20 to couple the biasing member 28 to the first jaw assembly 20. With the tang 66 aligned with the clevis 60, a bolt 72 is passed through the clevis apertures 56 and 58, the tang apertures 62 and 64, and the central opening of the biasing member 28 to movably secure the second jaw assembly 40 to the first jaw assembly 20. In this exemplary embodiment, the second jaw assembly 40 pivots relative to the first jaw assembly 20 where the bolt 72 acts as the pivot pin. As noted above, the biasing member 28 normally biases the second jaw assembly 40 in a direction away from the first jaw assembly 20 so that the jaw assemblies 20 and 40 are normally bias to an open position, seen in FIG. 5**.

Referring now to FIGS. 1-6, the handle assembly 14 houses a drive system and one or more electrical controls, e.g., a control assembly, used to activate and deactivate the tool 10. In the exemplary embodiment shown, the handle assembly 14 includes a housing 120, seen in FIG. 1, and a drive system similar to the drive system 710 shown in FIG. 15. Exemplary embodiments of drive systems that may be included in the tool 10 are described in commonly owned U.S. patent application Ser. No. 17/105,172, filed on Nov. 25, 2020, which is incorporated herein in its entirety by reference. The housing 120 is configured and dimensioned to enclose or wrap around the drive system and at least a proximal portion of the working head assembly 12. More specifically, the distal end of the housing 120 is a head portion 122 configured and dimensioned to enclose a portion of the jaw assemblies 20 and 40. An intermediate portion of the housing 120 is a grip portion 124 that is configured and dimensioned to enclose the drive assembly. The proximal end of the housing 120 is an end portion 126 configured and dimensioned to receive a portion of a battery 128 and to house the components used to connect the battery 128 to the housing 120 using, for example, known battery clips. The head portion 122 of the housing 120 may also include one or more lights 130, e.g., LEDs, used to illuminate an area between the first and second jaw assemblies 20 and 40 when, for example, the tool 10 is activated.

Figure 3:
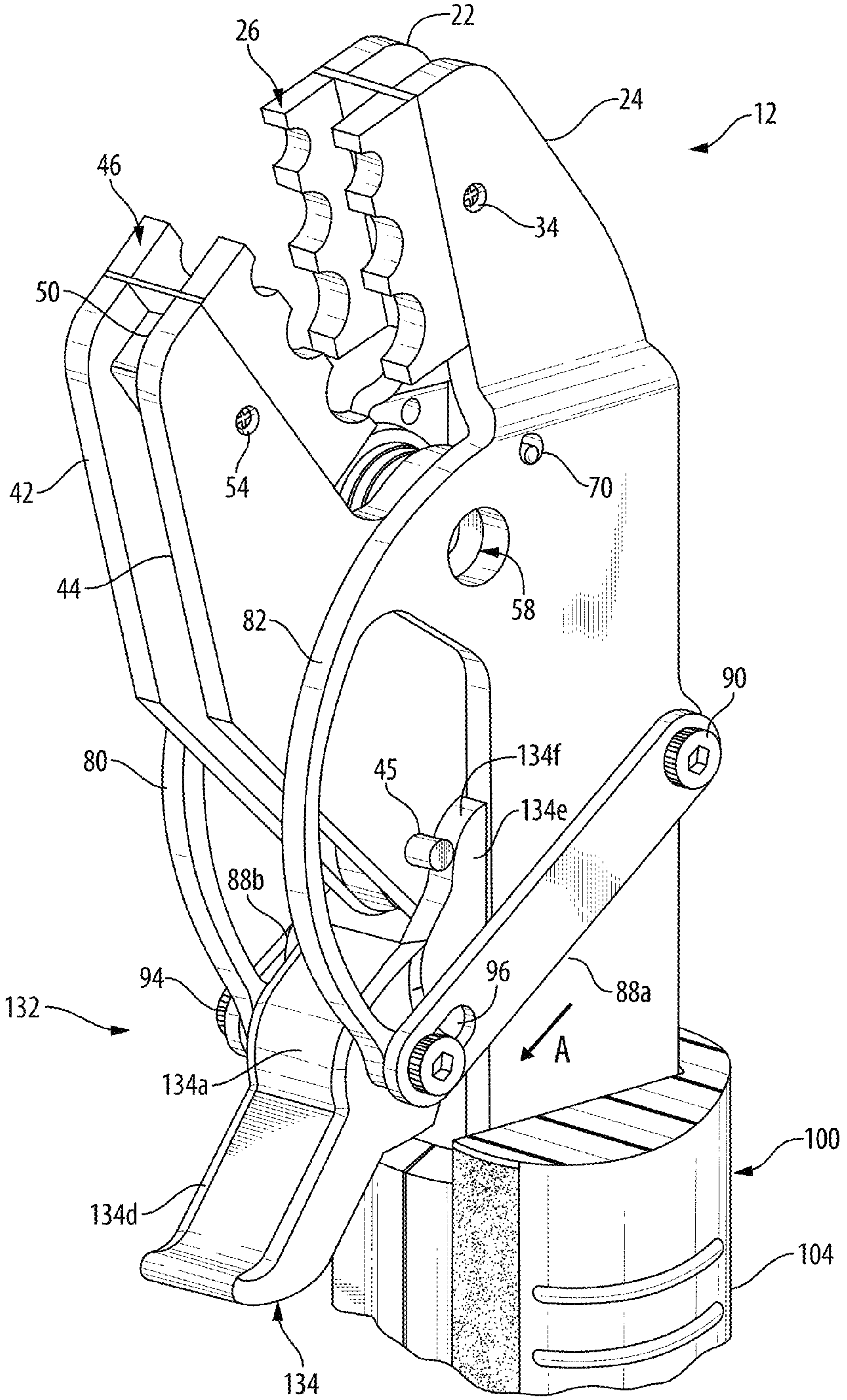
FIG. 3 is a side perspective view of the tool of FIG. 1 with a portion of the outer housing of the tool removed.

In the exemplary embodiment shown, the battery 128 is removably connected to the end portion 126 of the housing 120. In another embodiment, the battery 128 could be removably mounted or connected to any suitable position on the housing 120. In another embodiment, the battery 128 may be affixed to the housing 120 so that it is not removable. The battery 128 shown is a rechargeable battery, such as a lithium ion battery, that can output a voltage of at least 16 VDC, and preferably in the range of between about 16 VDC and about 24 VDC. The battery 128 provides power to a motor 700 in the drive system 710 via electrical contacts (not shown) on the motor 700. To activate the motor 700 and the lights 130, if used, one or more operator control assemblies 132 may be used. The operator control assemblies 132 may also be referred to herein as the trigger assemblies 132. In the exemplary embodiment shown, the one or more trigger assemblies 132 may include a trigger 134 and a switch 136, seen in FIGS. 2 and 4. The trigger 134 includes a pivot portion 134*a* having a switch camming surface 134*b* and a mounting aperture 134*c*, a lever portion 134*d*, and a pair of legs 134*e* each having a leg camming surface 134*f*. The trigger 134 is operatively, e.g., pivotally, connected to a spring arm 80 extending from the first jaw plate 22 of the first jaw assembly 20 and to a spring arm 82 extending from the second jaw plate 24 of the first jaw assembly 20 to pivotably secure the trigger to the first jaw assembly 20. More specifically, a first end of stop arms 88*a* and 88*b* are attached to the first jaw plate 22 and the second jaw plate 24 by passing bolt 90 through aperture 91 in the stop arms 88*a* and 88*b* into threaded aperture 92 in the first jaw plate 22 and the second jaw plate 24. The stop arms 88*a* and 88*b* are provided to limit movement of the spring arms 80 and 82. To secure the trigger 114 to the spring arms 80 and 82, a bolt 94 is passed through an opening 96 in the stop arm 88*a* , through an aperture 82*a* in the spring arm 82, through the mounting aperture 134*c* in the pivot portion 134*a* of the trigger 134, through an aperture 80*a* in the spring arm 80, and through the opening 96, e.g., a slot, in the stop arm 88*b*. With the pivot portion 134*a* of the trigger 134 pivotably mounted to the first jaw assembly 20, the leg camming surfaces 134*f* of each leg 134*e* of the trigger 134 are aligned to engage pins 45 extending from the first jaw plate 42 and the second jaw plate 44 of the second jaw assembly 40. The spring arms 80 and 82 are provided to normally bias, i.e., apply a force on, the trigger 134 in the direction of arrow “A” so that the trigger 134 is normally at a furthest most position relative to the opening 96, e.g., a slot, in the stop arms 88*a* and 88*b*, as shown in FIG. 3.

Figure 4:
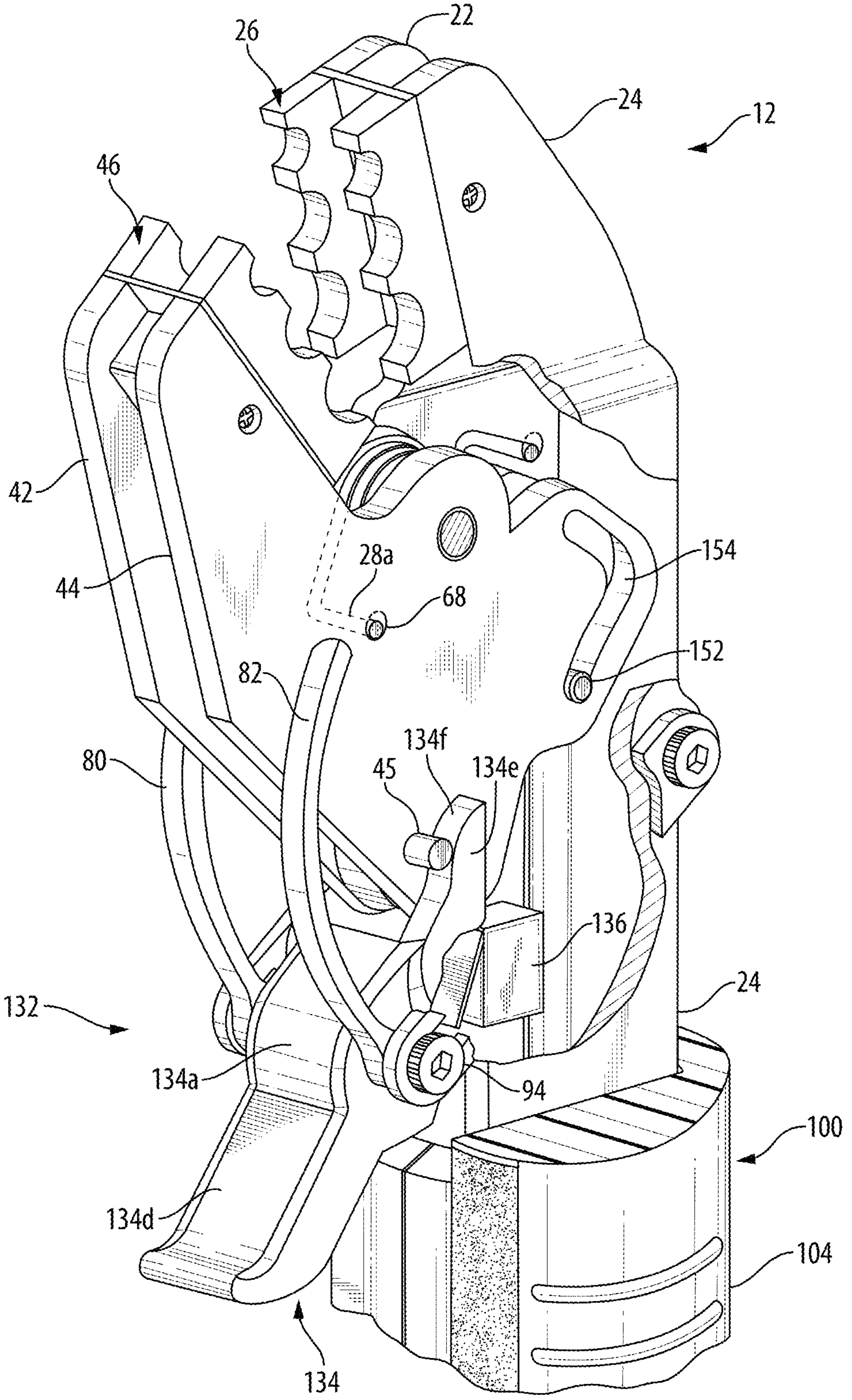
FIG. 4 is the side perspective view of the tool of FIG. 3 with a portion of one jaw of a fixed jaw assembly of the tool removed.
Figure 5:
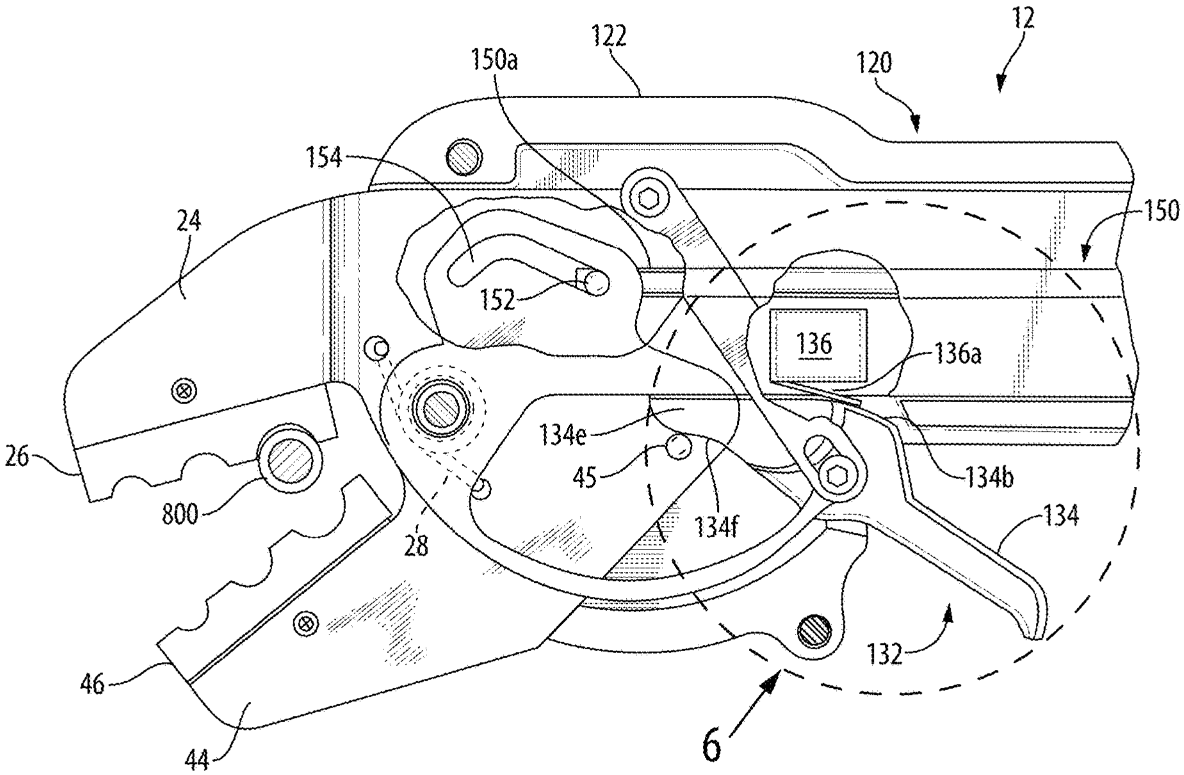
FIG. 5 is a partial cross-sectional view of the tool of FIG. 1, illustrating a portion of one jaw of the fixed jaw assembly removed to reveal a switch used to activate a motor of the tool and a trigger of the tool in an open position.
Figure 6:
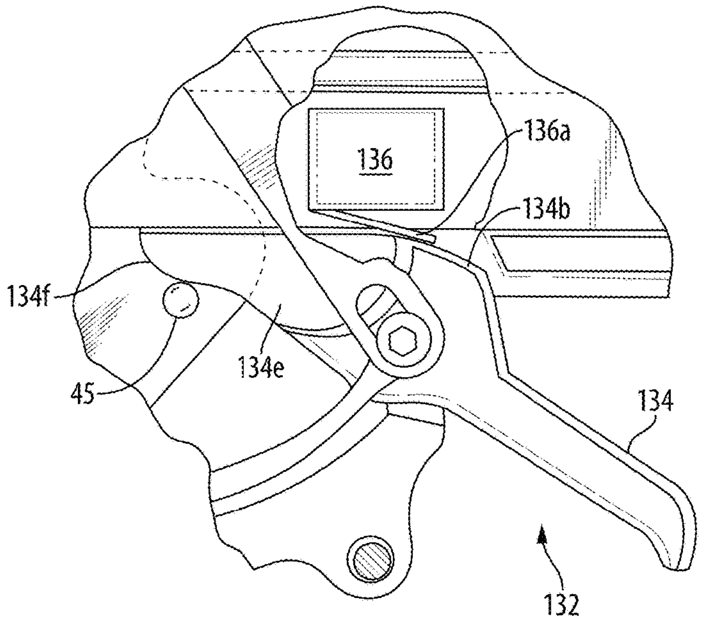
FIG. 6 is an enlarged side elevation view of the tool of FIG. 5 taken from detail 6.

The switch 136 may be, for example a single pole micro-switch, that operatively interacts with the switch camming surface 134*b* of the trigger 134, seen in FIGS. 4-6. The switch 136 is electrically connected between the battery 128, the motor 700 and the one or more lights 130, such that when the trigger 134 is depressed to a point where the camming surface 134*b* of the pivot portion 134*a* of the trigger 134 contacts and depresses the switch arm 136*a* causing the switch 136 to turn “on.” Turning the switch 136 “on” causes the control assembly (not shown) to activate the motor 700 in the drive system 710 and the one or more lights 130 to turn “on” illuminating the area between the first and second jaw assemblies 20 and 40.

In this exemplary embodiment, generally the combination of the trigger 134, the spring arms 80 and 82, the biasing member 28, and the switch 136 work together to provide the multi-stage operation of the trigger assembly 132. The operation of the multi-stage trigger assembly 132 according to this exemplary embodiment will be described with reference to FIGS. 4-14. Initially, as set forth above, the biasing member 28 normally and automatically biases the second jaw assembly 40 in a direction away from the first jaw assembly 20 so that the jaw assemblies are in a fully open position, as shown in FIGS. 5 and 6. Further, the spring arms 80 and 82 normally and automatically biases the trigger 134 in the direction of arrow “A” so that the trigger 134 is normally at the furthest most position relative to the opening 96 in the stop arms 88*a* and 88*b*, as shown in FIG. 3 and described above. When in the fully open position, the leg camming surfaces 134*f* of the legs 134*e* contact the pins 45 extending from the first jaw plate 42 and second jaw plate 44 of the second jaw assembly 40, and the switch camming surface 134*b* of the pivot portion 134*a* of the trigger 134 is in contact with the switch arm 136*a* of the switch 136 but the switch camming surface 134*b* is not activating the switch 136.

Figure 7:
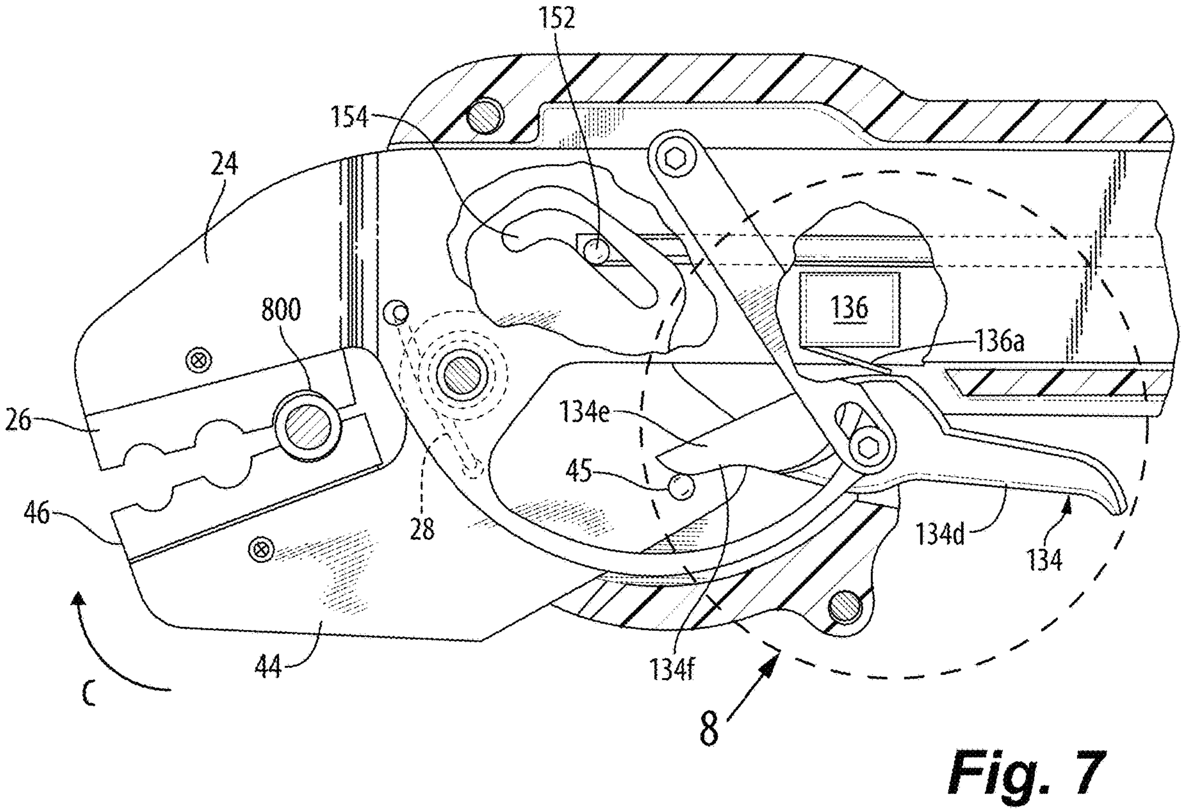
FIG. 7 is the partial cross-sectional view of the tool of FIG. 5, illustrating a portion of one jaw of the fixed jaw assembly removed to reveal the switch used to activate the motor of the tool and the trigger of the tool in a hold position where the jaw assembly of the tool holds an object between the fixed jaw assembly and the movable jaw assembly.
Figure 8:
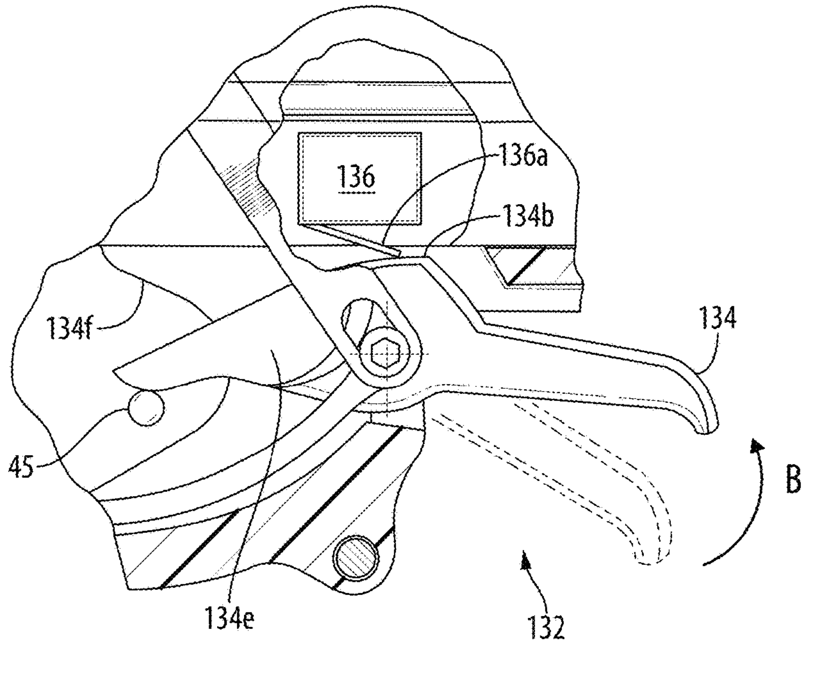
FIG. 8 is an enlarged side elevation view of the tool of FIG. 7 taken from detail 8.
Figure 9:
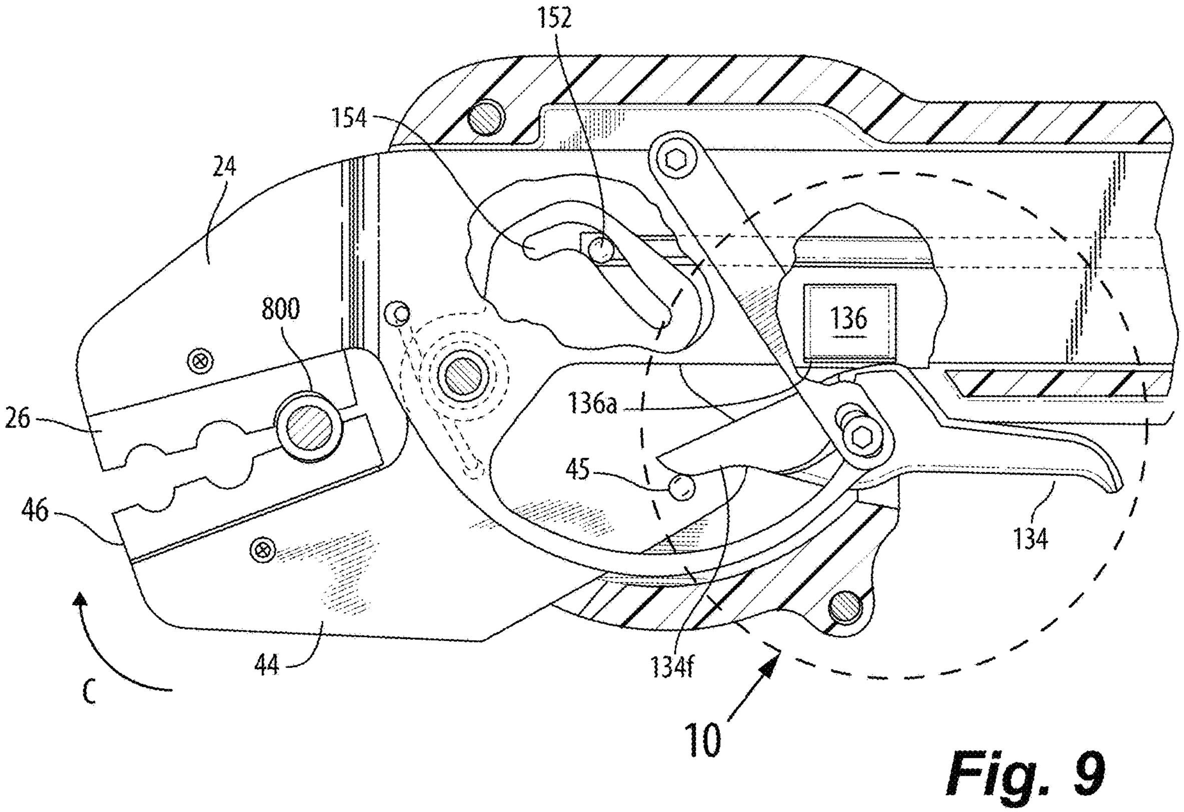
FIG. 9 is the partial cross-sectional view of the tool of FIG. 5, illustrating a portion of one jaw of the fixed jaw assembly removed to reveal the switch used to activate the motor of the tool and the trigger of the tool in a crimp position where the motor is activated to cause the jaw assembly of the tool to activate.
Figure 10:
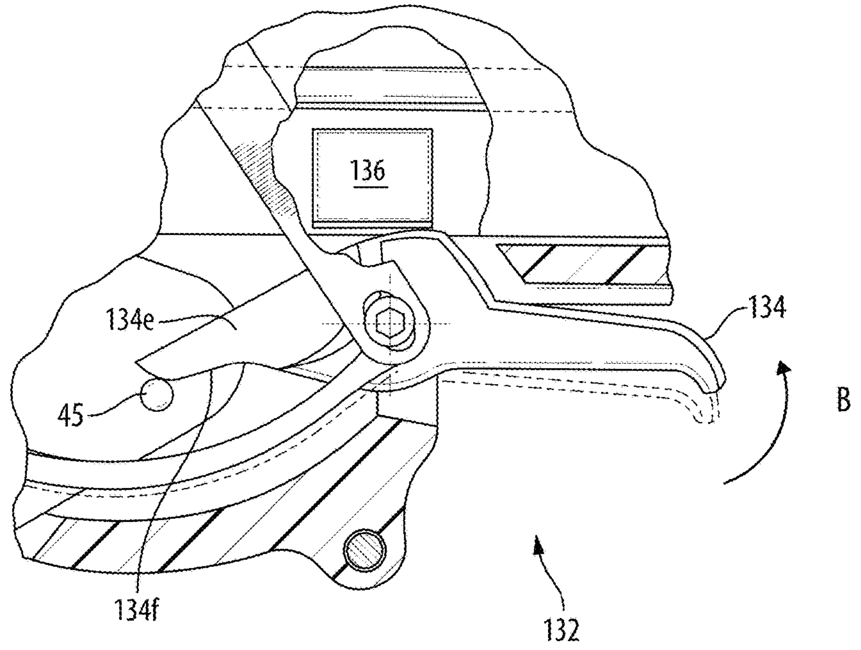
FIG. 10 is an enlarged side elevation view of the tool of FIG. 9 taken from detail 10.

Continuing to refer to FIGS. 4-14, for the first stage of the multi-stage function of the trigger assembly 132, which is a hold stage, the lever portion 134*d* is articulated in the direction of arrow “B,” as seen in FIG. 8, so that the leg camming surfaces 134*f* of the legs 134*e* in contact with the pins 45 cause the second jaw assembly 40 to move in the direction of arrow “C” toward the first jaw assembly 20 so that a wire termination 800 positioned between the jaw assemblies 20 and 40 can be held between an impacting surface 36 of the first jaw assembly 20 and an impacting surface 52 of the second jaw assembly 40, as seen in FIG. 7. The position of the jaw assemblies 20 and 40 holding the wire termination 800 is a hold position of the jaw assemblies. It is noted that moving the jaw assemblies from the fully open position to the hold position is a mechanical process independent of activation of the motor 700 of the drive system 710 of the tool 10. When in the hold position, continued articulation of the lever portion 134*d* in the direction of arrow “B,” seen in FIGS. 9 and 10, overcomes the biasing force of the spring arms 80 and 82 applied to the trigger 134 causing the switch camming surface 134*b* to push the switch arm 136*a* to close activating the motor 700 of the tool 10. Closing the switch 136 initiates a second stage function of the trigger assembly 132. This second stage function of the trigger assembly 132 is an electro-mechanical operation cycle, where the jaw assemblies are driven by the motor 700 of the drive system 710 to move from the hold position to an operation cycle position where the operation of the jaw assemblies is performed. For example, in this exemplary embodiment the jaw assemblies 20 and 40 perform a crimping operation, such that the second stage function of the trigger assembly 132 is a crimping operation.

Figure 11:
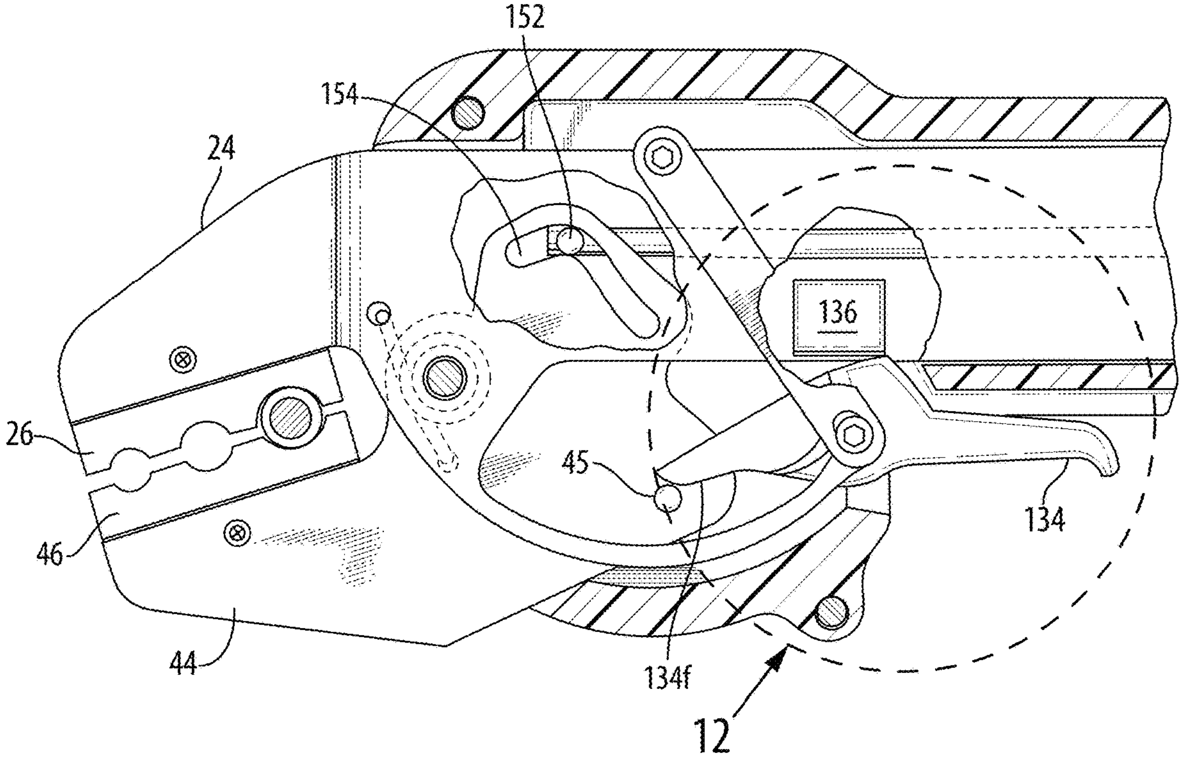
FIG. 11 is the partial cross-sectional view of the tool of FIG. 5, illustrating a portion of one jaw of the fixed jaw assembly removed to reveal the switch used to activate the motor of the tool and the trigger of the tool in an operation cycle position where the operation of the jaw assemblies is performed.
Figure 12:
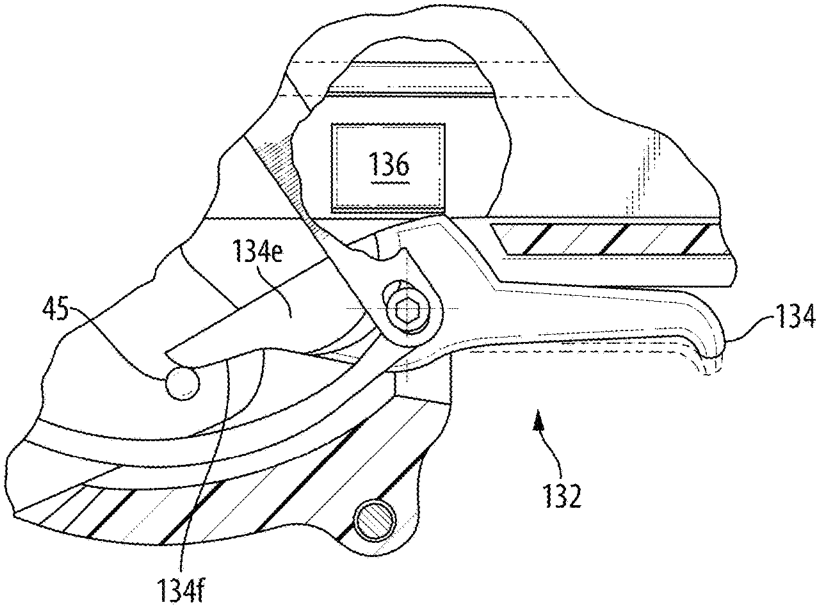
FIG. 12 is an enlarged side elevation view of the tool of FIG. 11 taken from detail 12.
Figure 13:
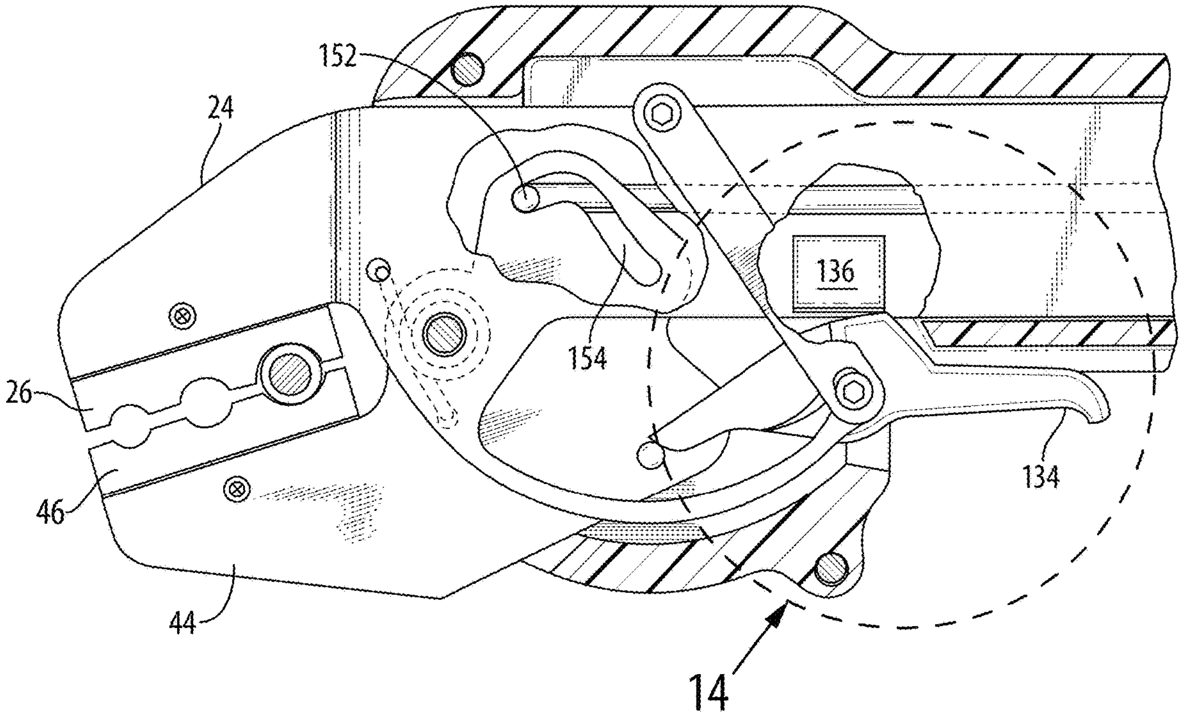
FIG. 13 is the partial cross-sectional view of the tool of FIG. 5, illustrating a portion of one jaw of the fixed jaw assembly removed to reveal the switch used to activate the motor of the tool and the trigger of the tool in the operation cycle position.
Figure 14:
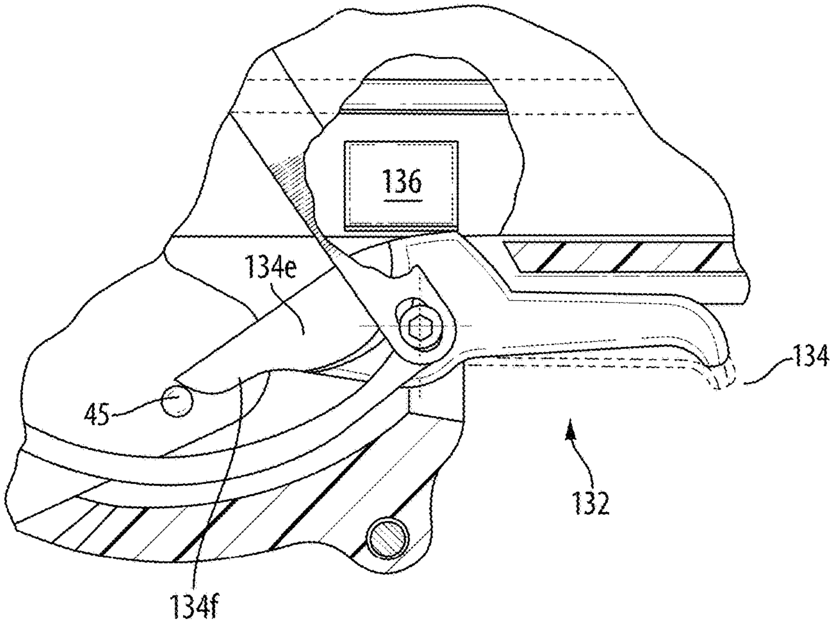
FIG. 14 is an enlarged side elevation view of the tool of FIG. 13 taken from detail 12.
Figure 15:
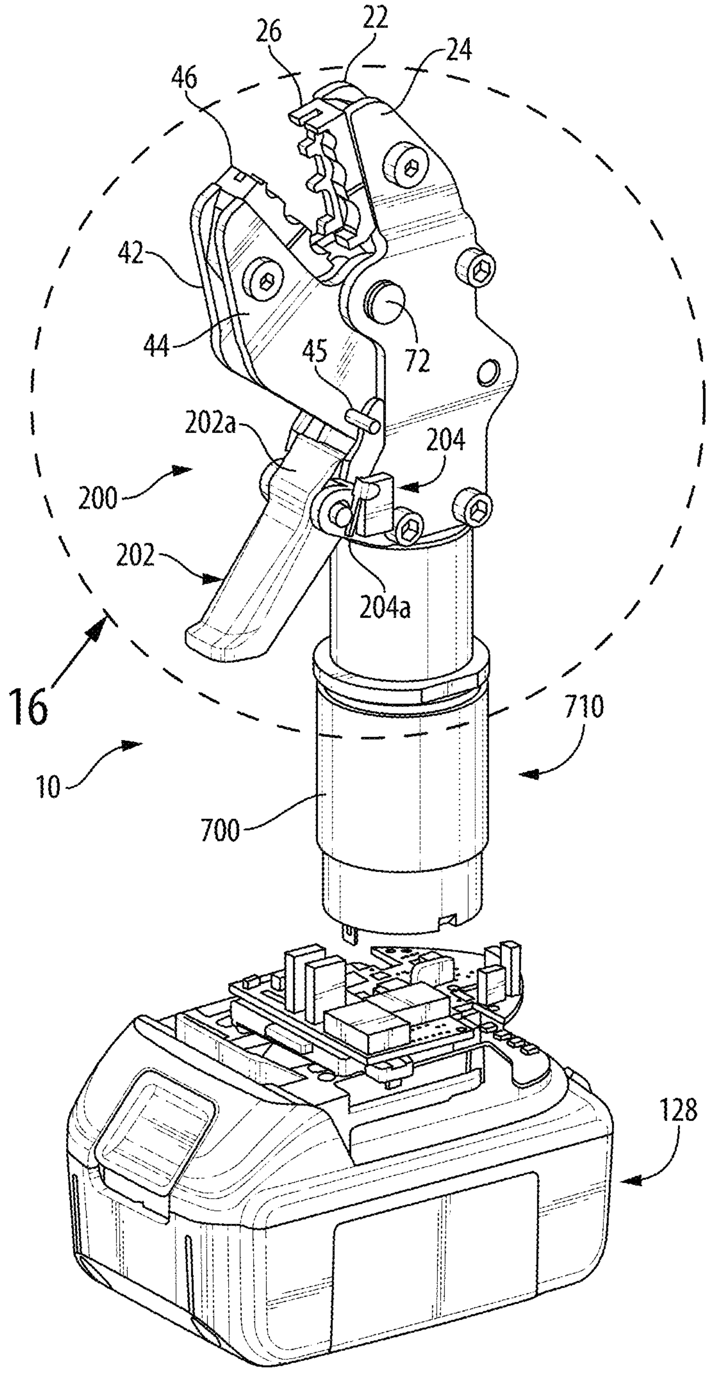
FIG. 15 is a side perspective view of a first side of another exemplary embodiment of a battery-powered tool according to the present disclosure with a handle assembly removed, and illustrating another exemplary embodiment of the trigger assembly.

Continuing to refer to FIGS. 9-14, closing the switch 136 causes the control assembly (not shown) to activate the motor 700 of the drive system 710, seen in FIG. 15. With the motor 700 activated, a lead drive shaft 150 of the tool 10 rotates. Rotation of the lead drive shaft 150 of the drive system 710, seen in FIG. 15, is translated to linear motion of the jaw drive member 152 attached to the lead drive shaft 150. Linear motion of the jaw drive member 152 causes the jaw drive member 152 to ride within slots 154, seen in FIG. 13, in the first and second jaw plates 42 and 44 in the second jaw assembly 40 causing the second jaw assembly 40 to continue to move in the direction of arrow "C," seen in FIGS. 9 and 10. The lead drive shaft 150 includes a distal end portion, a proximal end portion and an intermediate portion between the distal end portion and the proximal end portion. The distal end portion may be threaded with, for example, buttress threads typically used for one-directional loading on the lead drive shaft 150, or acme threads typically used for bi-directional loading on the lead drive shaft 150. As set forth above, a more detailed description of the drive system 710, including the lead drive shaft 150 and the jaw drive member 152 is described in commonly owned U.S. patent application Ser. No. 17/105,172, filed on Nov. 25, 2020, which is incorporated herein in its entirety by reference. The continued movement of the second jaw assembly 40 toward the first jaw assembly begins the crimping operation of the tool 10. When performing the crimping operation, the lead drive shaft 150 causes the jaw drive member 152 to ride within slots 154 to and over an apex of the slots 154 providing additional force to continue the crimping operation, as seen in FIGS. 11 and 12, to deform the wire termination 800. When performing the crimping operation, after jaw drive member 152 of the lead drive shaft 150 has traversed along the slot 154, seen in FIG. 13, the jaw assemblies 20 and 40 are fully closed and the crimping operation has completed, seen in FIGS. 13 and 14. When the jaw assemblies 20 and 40 are fully closed, a cycle end switch (not shown) closes causing the control assembly (not shown) to deactivate the motor 170 of the drive system 710, ending the operating cycle of the jaw assemblies, here the crimp cycle.

Figure 16:
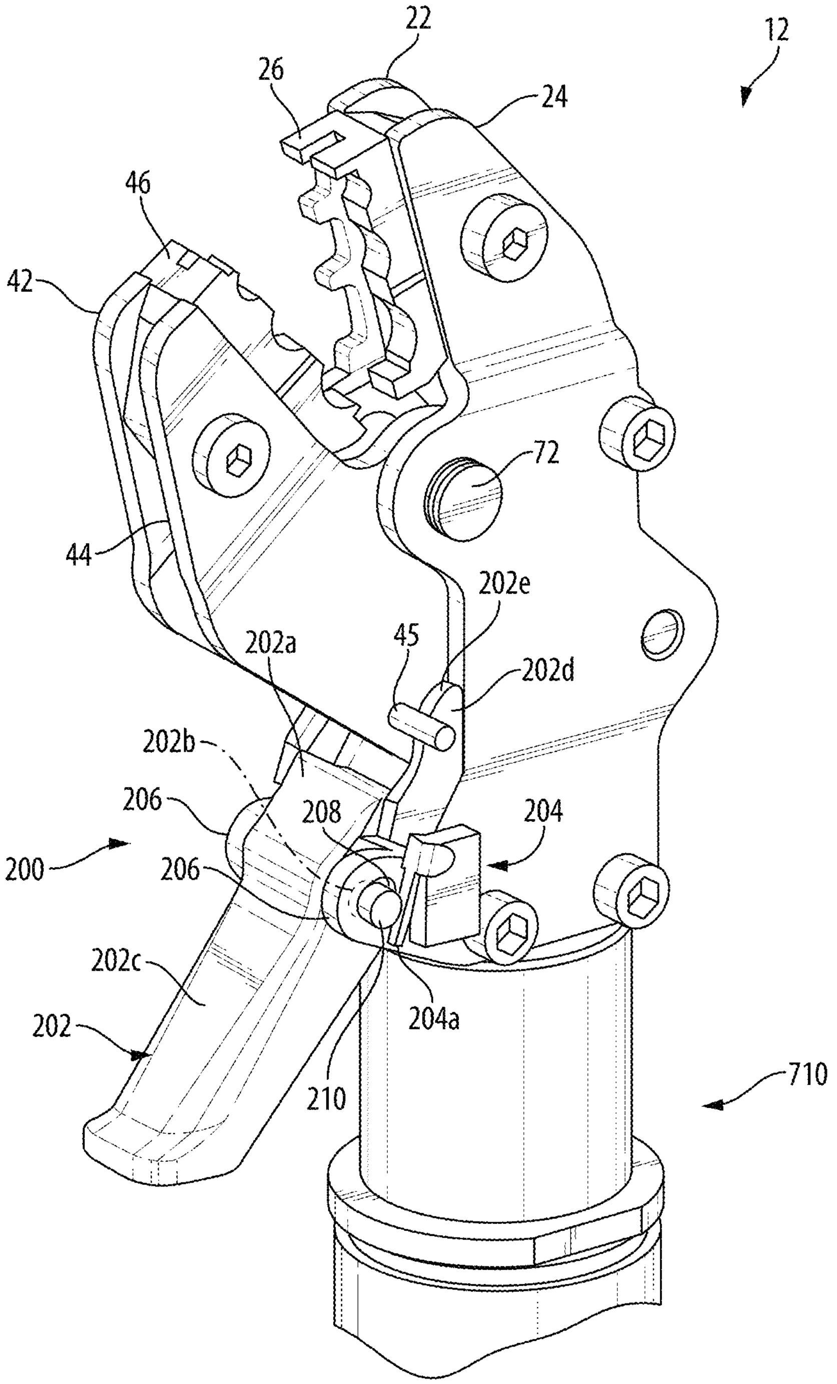
FIG. 16 is an enlarged side perspective view of the tool of FIG. 15 taken from detail 16.
Figure 17:
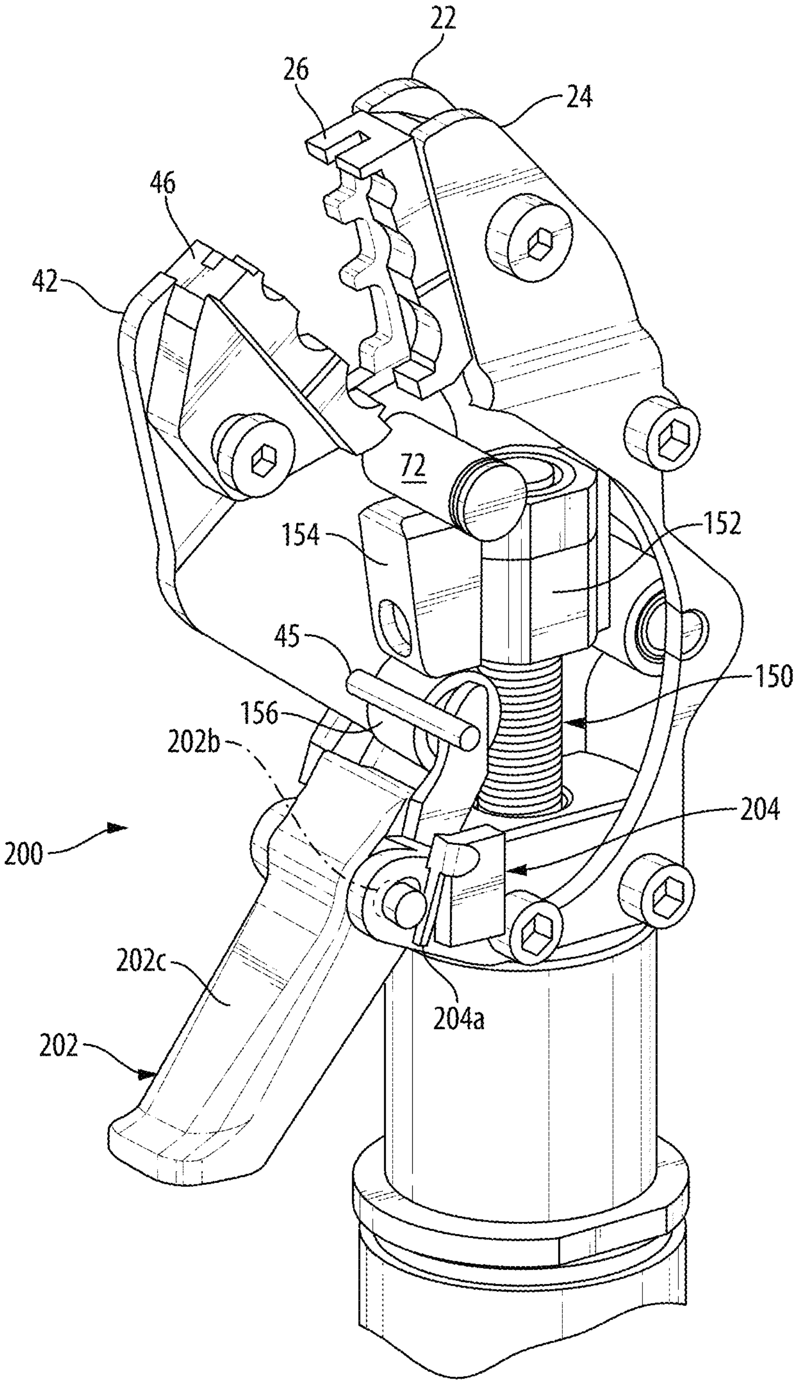
FIG. 17 is the enlarged side perspective view of the tool of FIG. 16 with a portion of jaw assemblies removed to reveal the trigger assembly.
Figure 18:
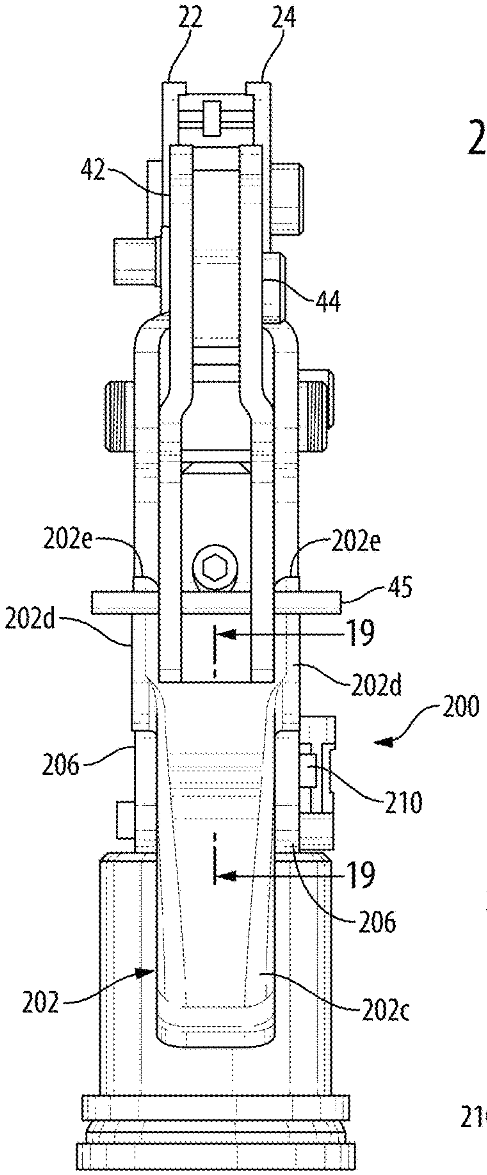
FIG. 18 is a front elevation view of the tool of FIG. 16.
Figure 19:
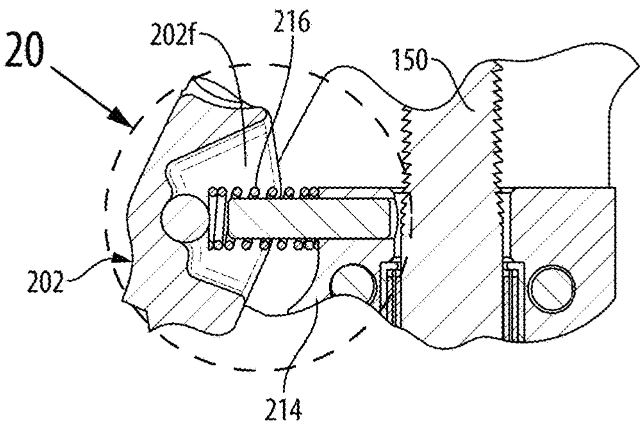
FIG. 19 is a cross-section view of the tool of FIG. 19 taken from line 19-19, and illustrating a biasing member of the trigger assembly used to normally bias a trigger of the trigger assembly in a direction away from the handle assembly.
Figure 20:
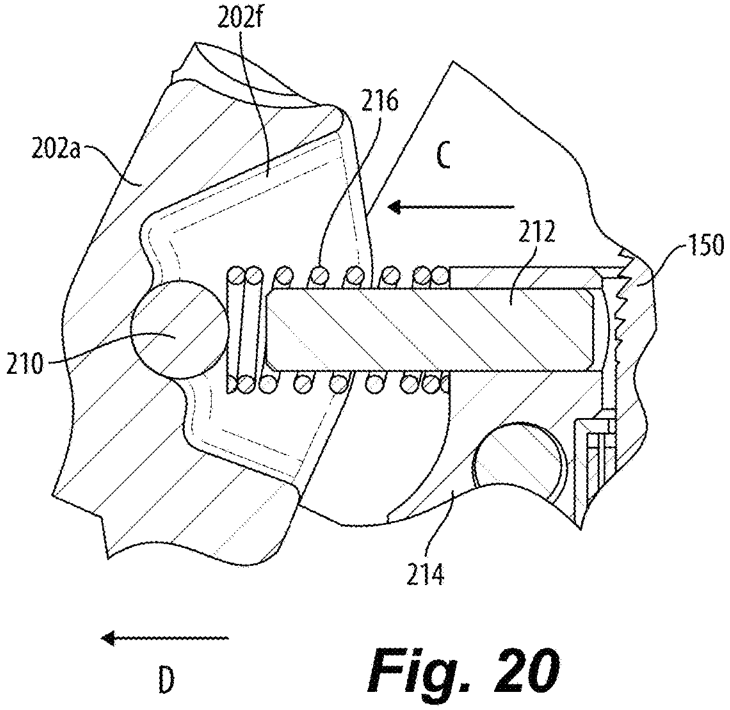
FIG. 20 is an enlarged view of the portion of the tool in FIG. 19 taken from detail 20; and illustrating the biasing member of the trigger assembly used to normally bias the trigger of the trigger assembly in a direction away from the handle assembly.

Turning now to FIGS. 15-30, another exemplary embodiment of the multi-stage trigger assembly for the tool 10 is shown. In this exemplary embodiment, the multi-stage trigger assembly 200 may include a trigger 202 and a switch 204, seen in FIGS. 15-18. The trigger 202 includes a pivot portion **202*a* having a mounting aperture 202*b*, seen in FIG. 16, therethrough, a lever portion 202*c*, and a pair of legs 202*d* each having a leg camming surface 202*e*. The trigger 202 is operatively, e.g., pivotally, connected to a pair of trigger mounting arms 206—one extending from the first jaw plate 22 of the first jaw assembly 20 and the other extending from the second jaw plate 24 of the first jaw assembly 20 to pivotably secure the trigger 202 to the first jaw assembly 20. More specifically, each trigger mounting arm 206 has an opening 208, e.g., a slot, that receives a pivot pin 210 inserted into the mounting aperture 202*b* of the trigger 202. As shown in FIGS. 15-17, the ends of the pivot pin 210 extend through the openings 208 to pivotably secure the trigger 202 to the first jaw assembly 20. A rear portion of the pivot portion 202*a* of the trigger 202 has a spring receiving cavity 202*f*, seen in FIGS. 19 and 20. The spring receiving cavity 202*f* receives a post 212 extending from a post bracket 214 between the first jaw plate 22 and the second jaw plate 24 of the first jaw assembly 20, as shown in FIGS. 18-20. Around the post 212 is a biasing member 216, e.g., a coil spring, that applies a force to the pivot pin 210 to normally cause the pivot pin 210 to move in the direction of arrow "D," seen in FIG. 20, away from the post bracket 214. Biasing the pivot pin 210 in the direction of arrow "D" prevents the portion of the pivot pin 210 in contact with the switch arm 204*a* of the switch 204, seen in FIGS. 21-22, from activating the switch until a force sufficient to overcome the biasing force of the biasing member 216 is applied to the lever portion 202*c* of the trigger 202**.

The switch 204 may be, for example, a single pole micro-switch, that is mounted to the second jaw plate 24 of the first jaw assembly 20 in close proximity to the opening 208 in the trigger mounting arm 206. In this configuration, the switch 204 operatively interacts with a portion of the pivot pin 210, as shown in FIGS. 16 and 17, and described in more detail below. The switch 204 is electrically connected between the battery 128, the motor 700, seen in FIG. 15, and the one or more lights 130, seen in FIG. 1, if used, such that when the trigger 202 is depressed to a point where the end of the pivot pin 210 contacts and depresses the switch arm **204*a*, the switch 204 turns "on" causing the control assembly (not shown) to activate the motor 700 and the one or more lights 130 to turn "on" illuminating the area between the first and second jaw assemblies 20 and 40**.

Figure 21:
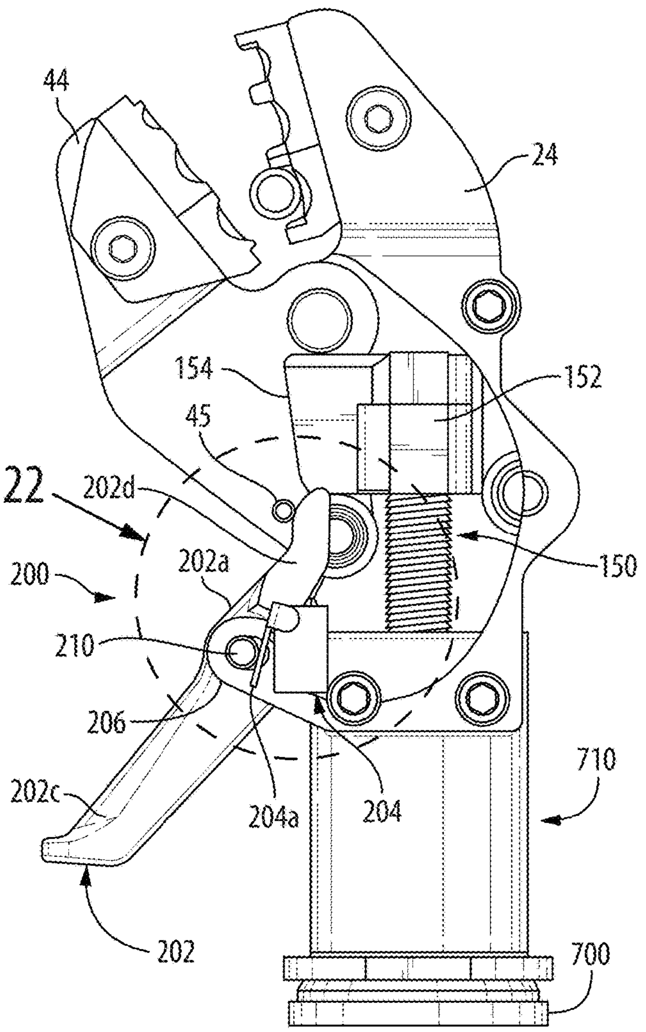
FIG. 21 is a side elevation view of the tool of FIG. 16 with a portion of a jaw plate for a first jaw assembly and a jaw plate of a second jaw assembly removed to reveal the trigger assembly and with the jaw assemblies in a fully open position.
Figure 22:
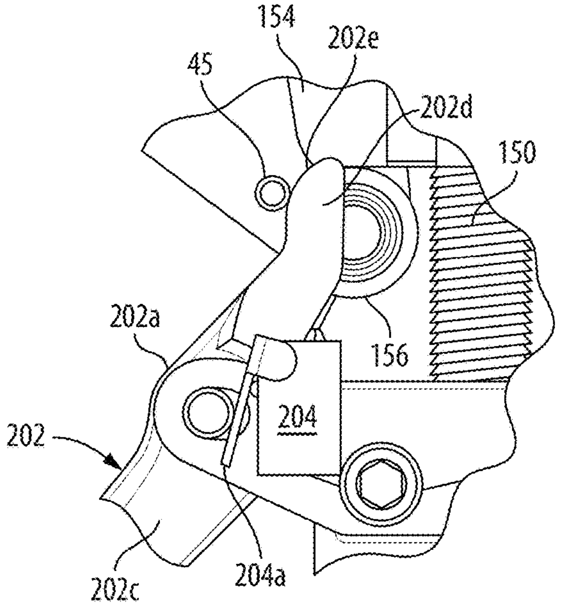
FIG. 22 is an enlarged view of the portion of the tool in FIG. 21 taken from detail 22.
Figure 23:
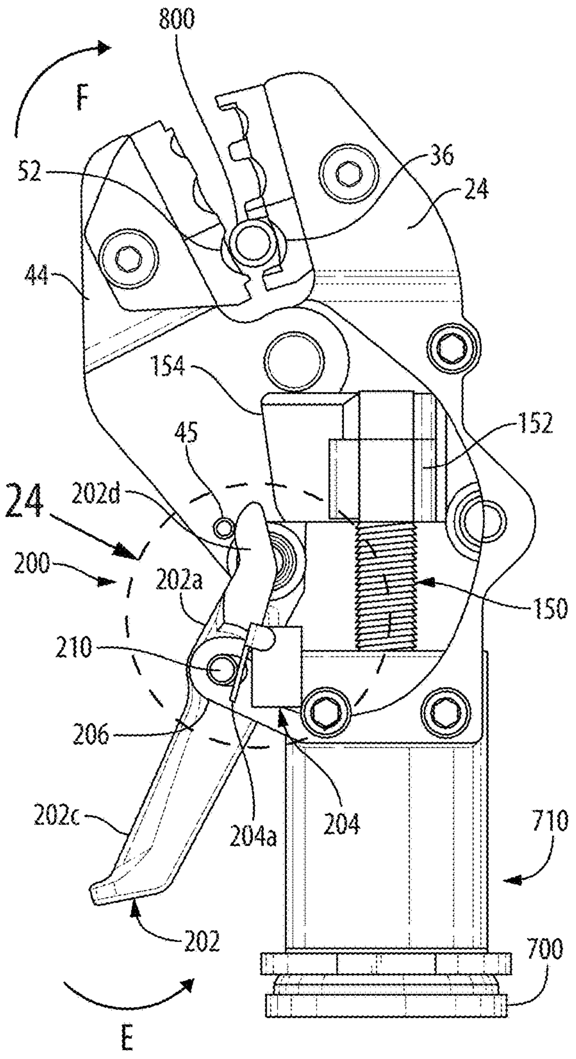
FIG. 23 is the side elevation view of the tool of FIG. 21 with the jaw assemblies in a hold position.

In this exemplary embodiment, generally the combination of the trigger 202, the biasing member 28, the biasing member 216, the pivot pin 210, and the switch 204 work together to provide the multi-stage operation of the trigger assembly 200. The operation of the multi-stage trigger assembly 200 according to this exemplary embodiment will be described with reference to FIGS. 21-30. Initially, as set forth above, the biasing member 28 normally and automatically biases the second jaw assembly 40 in a direction away from the first jaw assembly 20 so that the jaw assemblies are in a fully open position, similar to that shown in FIGS. 5 and 6. Further, the biasing member 216 normally and automatically biases the pivot pin 210 in the direction of arrow "D" so that the switch arm **204*a* of the switch is not depressed as described above. When in the fully open position, the leg camming surfaces 202*e* of the legs 202*d* contact the pins 45 extending from the first jaw plate 42 and second jaw plate 44 of the second jaw assembly 40, as seen in FIGS. 21 and 22. For the first stage of the multi-stage function of the trigger assembly 200, which is a hold stage or position, the lever portion 202*c* is articulated in the direction of arrow "E," as seen in FIG. 23, so that the leg camming surfaces 202*e* of the legs 202*d* in contact with the pins 45 cause the second jaw assembly 40 to move in the direction of arrow "F" toward the first jaw assembly 20 so that a wire termination 800 positioned between the jaw assemblies 20 and 40 can be held between the impacting surface 36 of the first jaw assembly 20 and the impacting surface 52 of the second jaw assembly 40, as seen in FIG. 23. The position of the jaw assemblies 20 and 40 holding the wire termination 800 is a hold position of the jaw assemblies. It is noted that moving the jaw assemblies from the fully open position to the hold position is a mechanical process independent of activation of the motor 700 of the tool 10**.

Figure 24:
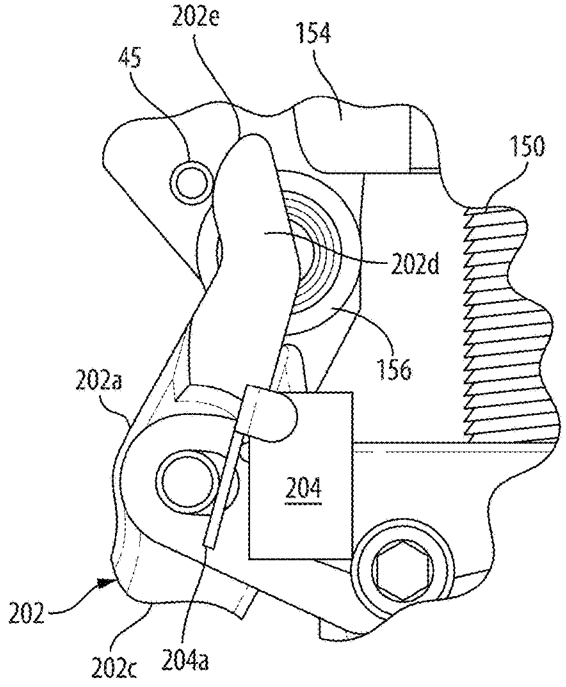
FIG. 24 is an enlarged view of the portion of the tool in FIG. 23 taken from detail 24.
Figure 25:
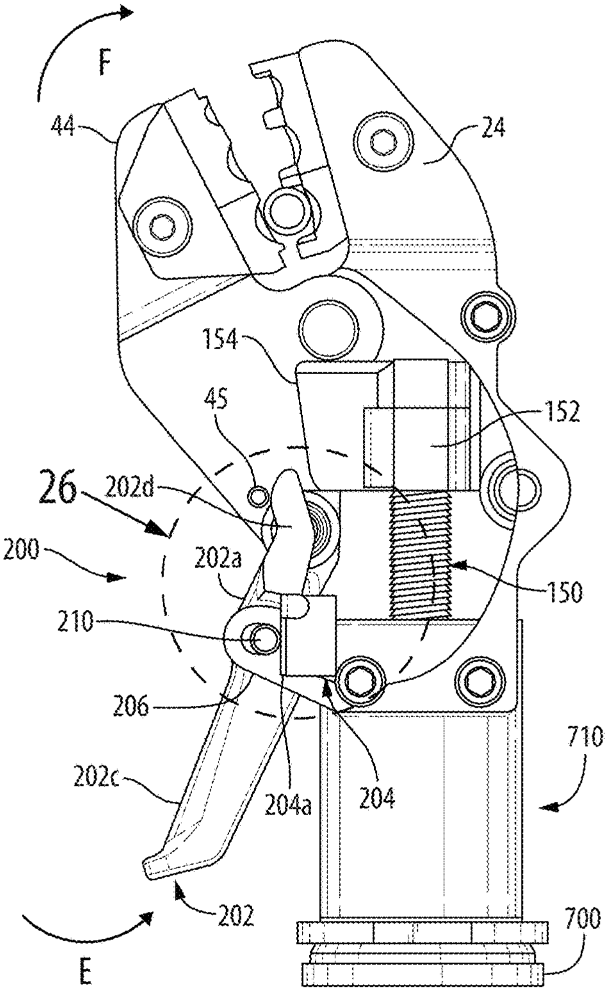
FIG. 25 is the side elevation view of the tool of FIG. 21 with the jaw assemblies in a motor start position.
Figure 26:
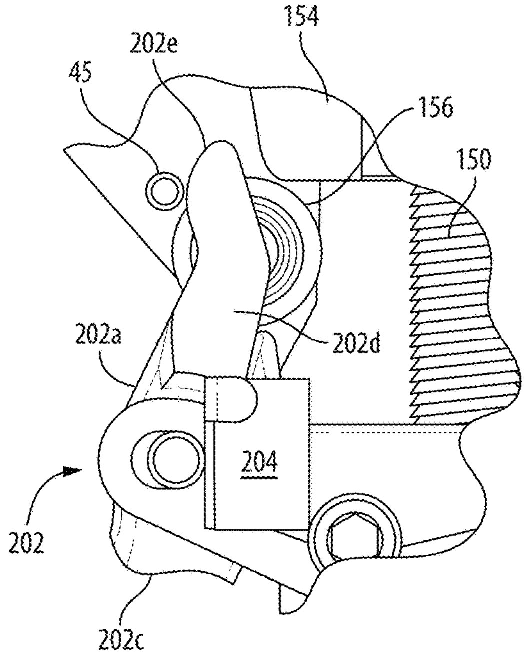
FIG. 26 is an enlarged view of the portion of the tool in FIG. 25 taken from detail 26.

When in the hold position, continued articulation of the lever portion **202*c* in the direction of arrow "E," seen in FIGS. 23 and 24, overcomes the biasing force of the biasing member 216 applied to the pivot pin 210 causing a portion of the pivot pin 210 to push the switch arm 204*a* to close activating the motor 700 of the tool 10. Closing the switch 204 initiates a second stage function of the trigger assembly 200. This second stage function of the trigger assembly 200 is an electro-mechanical operation cycle, where the jaw assemblies are driven by the motor 700 to move from the hold position to an operation cycle position where the operation of the jaw assemblies is performed. For example, in this exemplary embodiment the jaw assemblies 20 and 40 perform a crimping operation, such that the second stage function of the trigger assembly 200** is a crimping operation.

Figure 27:
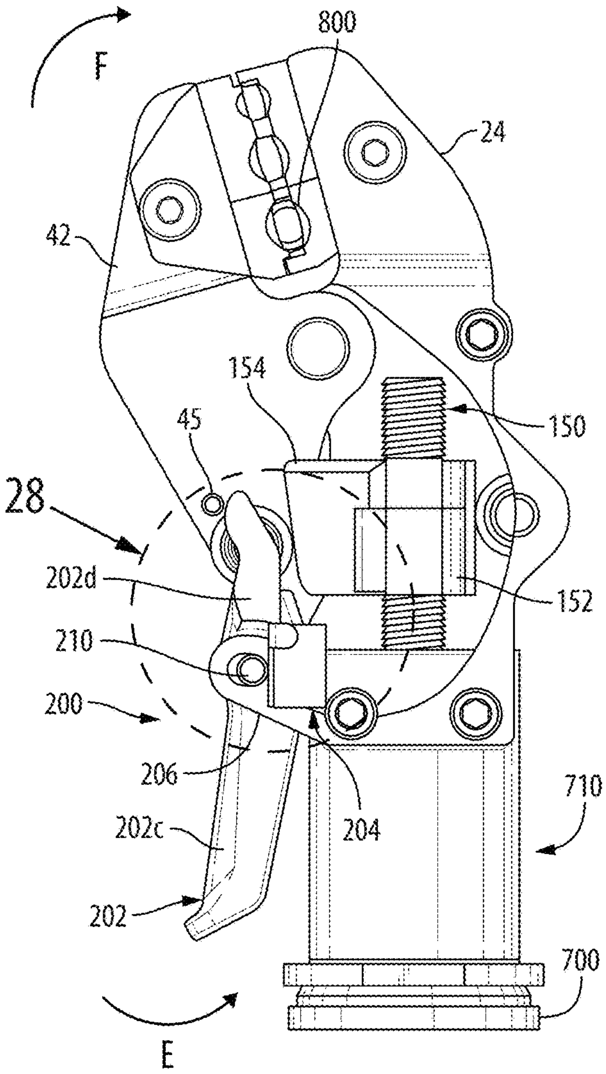
FIG. 27 is the side elevation view of the tool of FIG. 21 with the jaw assemblies in an operation cycle position where the operation of the jaw assemblies is performed.
Figure 28:
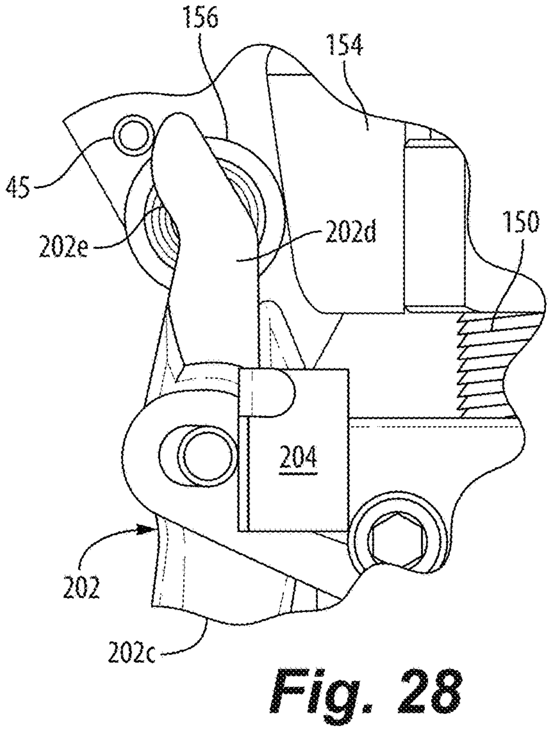
FIG. 28 is an enlarged view of the portion of the tool in FIG. 27 taken from detail 28.
Figure 29:
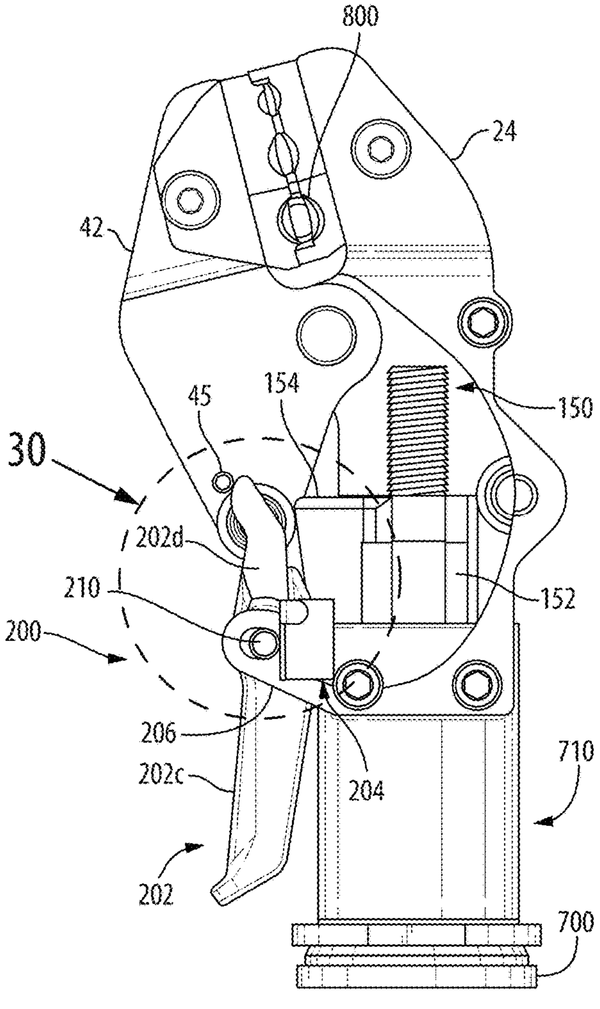
FIG. 29 is the side elevation view of the tool of FIG. 21 with the jaw assemblies in a crimp complete position.
Figure 30:
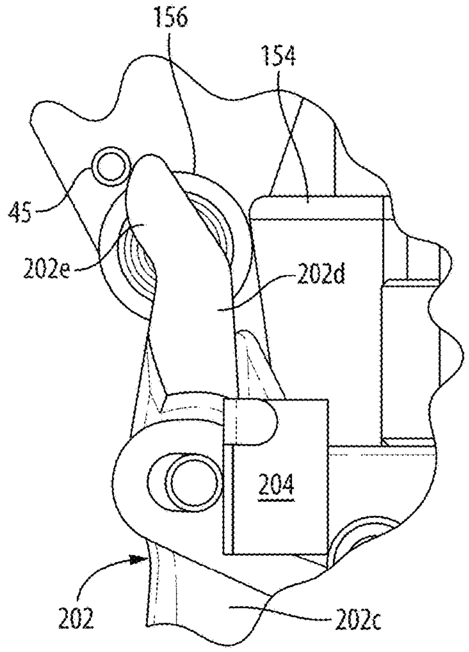
FIG. 30 is an enlarged view of the portion of the tool in FIG. 29 taken from detail 30.
Figure 31:
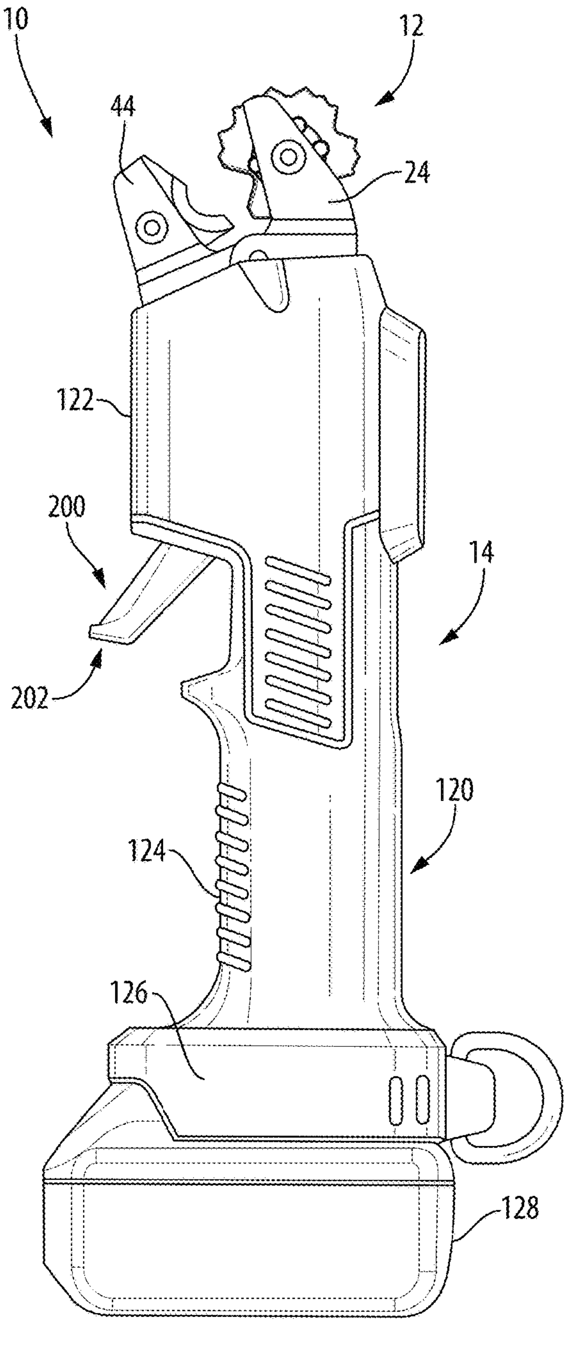
FIG. 31 is a side elevation view of a first side of another exemplary embodiment of a battery-powered tool according to the present disclosure, illustrating a working head assembly and a handle assembly.
Figure 32:
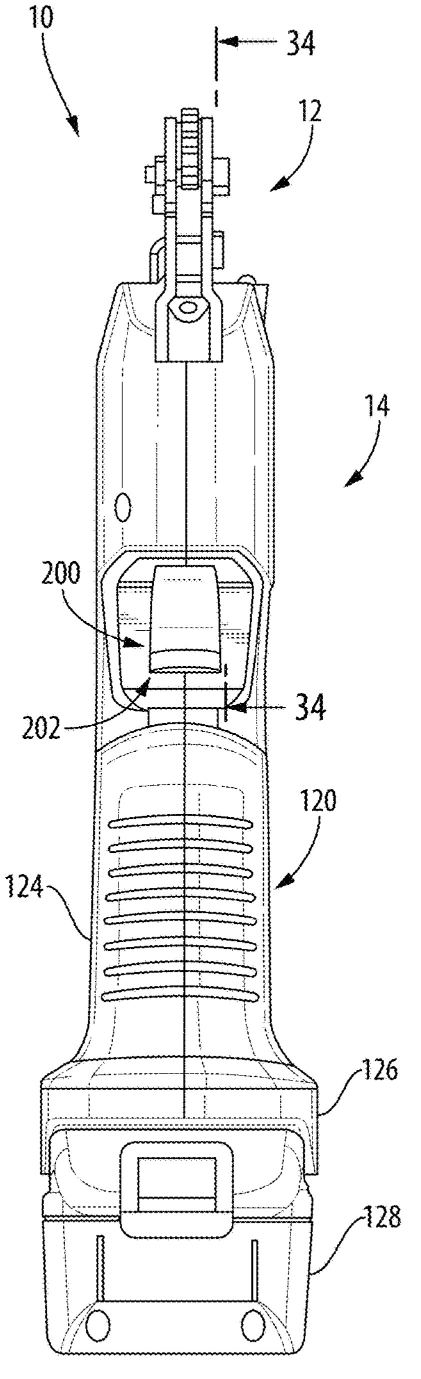
FIG. 32 is a front elevation view of the battery-powered tool of FIG. 31.

Continuing to refer to FIGS. 25-30, closing the switch 204 causes a control assembly (not shown) to activate the motor 700 of the drive system 710. With the motor 700 activated, the lead drive shaft 150 of the drive system 710 rotates. Rotation of the lead drive shaft 150 of the drive system 710 is translated to linear motion of the jaw drive member 152 attached to the lead drive shaft 150. Linear motion of the jaw drive member 152 causes a cam surface 154 of the jaw drive member 152 to contact a cam roller 156 positioned between the first and second jaw plates 42 and 44 in the second jaw assembly 40 causing the second jaw assembly 40 to continue to move in the direction of arrow "F," seen in FIGS. 25 and 26. As set forth above, a more detailed description of the drive system 710, including the lead drive shaft 150 and the jaw drive member 152 is described in commonly owned U.S. patent application Ser. No. 17/105,172, filed on Nov. 25, 2020, which is incorporated herein in its entirety by reference. The continued movement of the second jaw assembly 40 toward the first jaw assembly 20 begins the crimping operation of the tool 10. When performing the crimping operation, the lead drive shaft 150 causes the cam surface 154 of the jaw drive member 152 to ride along the cam roller 156 providing additional force to continue the crimping operation, as seen in FIGS. 27 and 28, to deform the wire termination 800. When performing the crimping operation, after the cam surface 154 of the jaw drive member 152 has traversed along the cam roller 156, the jaw assemblies 20 and 40 are fully closed and the crimping operation has completed, seen in FIGS. 29 and 30. When the jaw assemblies 20 and 40 are fully closed, a cycle end switch (not shown) closes causing the control assembly (not shown) to deactivate the motor 700 of the drive system 710, ending the operating cycle of the jaw assemblies, here the crimp cycle.

Figure 33:
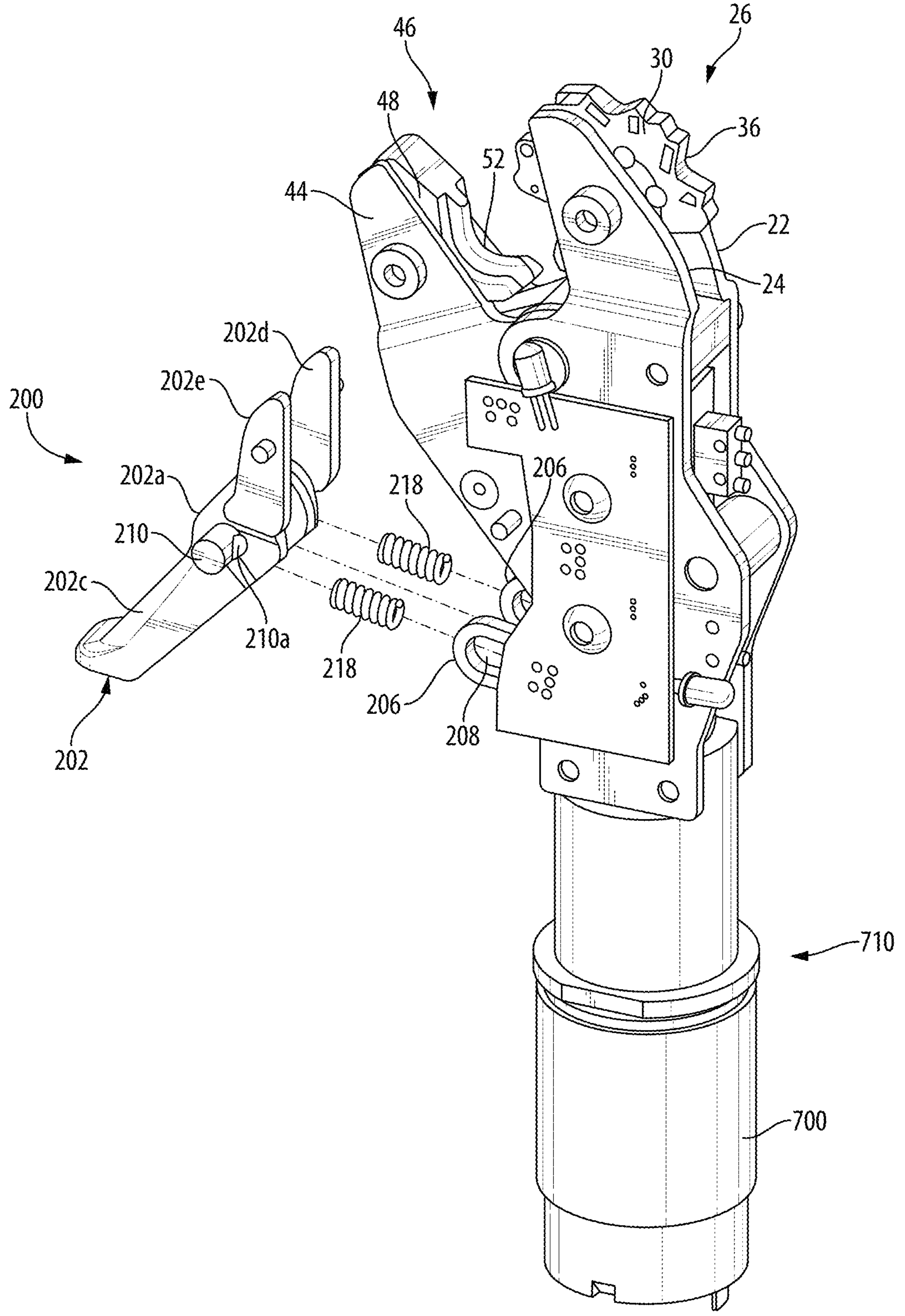
FIG. 33 is a side perspective view of the tool of FIG. 31 with the handle assembly removed, and illustrating another exemplary embodiment of the trigger assembly.
Figure 34:
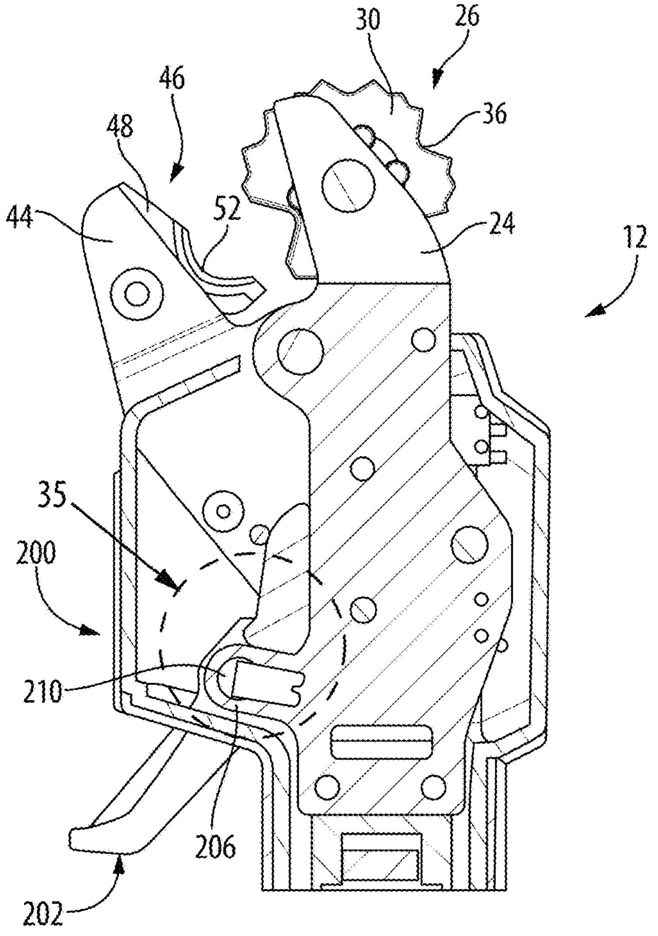
FIG. 34 is a cross-sectional view of the tool of FIG. 32 taken from line 34-34, illustrating components of the trigger assembly.
Figure 35:
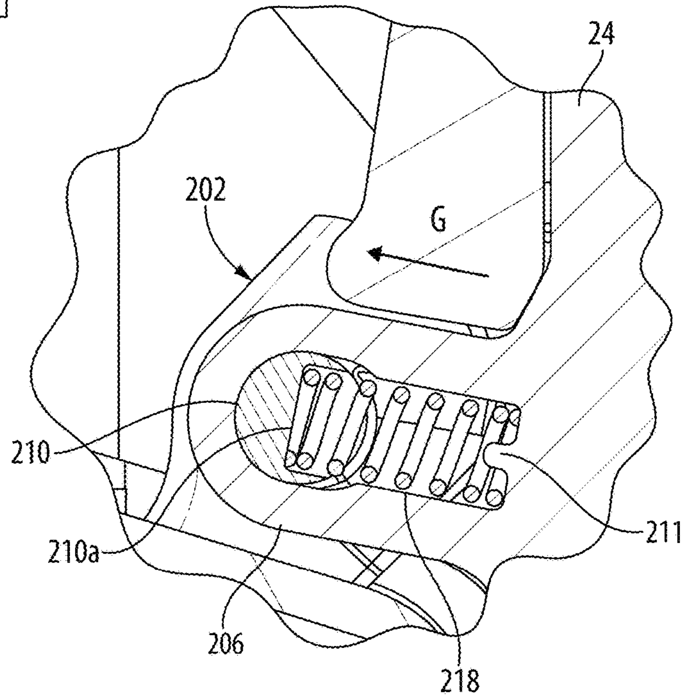
FIG. 35 is an enlarged view of the portion of the tool in FIG. 34 taken from detail 35, illustrating a biasing members used to bias the trigger of the trigger assembly.

Referring to FIGS. 31-35, another exemplary embodiment of the trigger assembly 200 is shown. In this exemplary embodiment, the trigger assembly 200 is substantially the same as the trigger assembly of FIGS. 15-30 except for the description of the biasing member 216 used to apply a force to the pivot pin 210 to normally cause the pivot pin 210 to move in the direction of arrow "D" away from the post bracket 214. In this exemplary embodiment, each trigger mounting arm 206 has an opening 208, e.g., a slot, that receives a portion of the pivot pin 210 inserted into the mounting aperture 202*b* of the trigger 202 and that holds a biasing member 218 used to apply a force to the pivot pin 210 to normally cause the pivot pin 210 to move in the direction of arrow "G," seen in FIG. 35, toward the pivot pin 210. More specifically, as shown in FIGS. 33-35, each end of the pivot pin 210 that extend through the openings 208 has a cavity 210*a* configured and dimensioned to receive one end of the biasing member 218. The other end of the biasing member 218 is positioned within the opening 208 of the mounting arm 206 and is aligned and held within the opening 208 using a rib 211, shown in FIG. 35, extending into the opening 208. Biasing the pivot pin 210 in the direction of arrow "G" prevents the portion of the pivot pin 210 in contact with the switch arm 204*a* of the switch 204 from activating the switch 204 until a force sufficient to overcome the biasing force of the biasing members 218 is applied to the lever portion 202*c* of the trigger 202. It is noted that in this exemplary embodiment, the die 26 and 46 differ from the die 26 and 46 shown in FIG. 2. In this embodiment, the die 26 is a rotatable wheel die or die wheel with an impinging region 30 having a plurality of impacting surfaces 36, and the die 46 has an impinging region 48 with a single impacting surface 52 similar to a nest, as will be described in more detail below.

Figure 36:
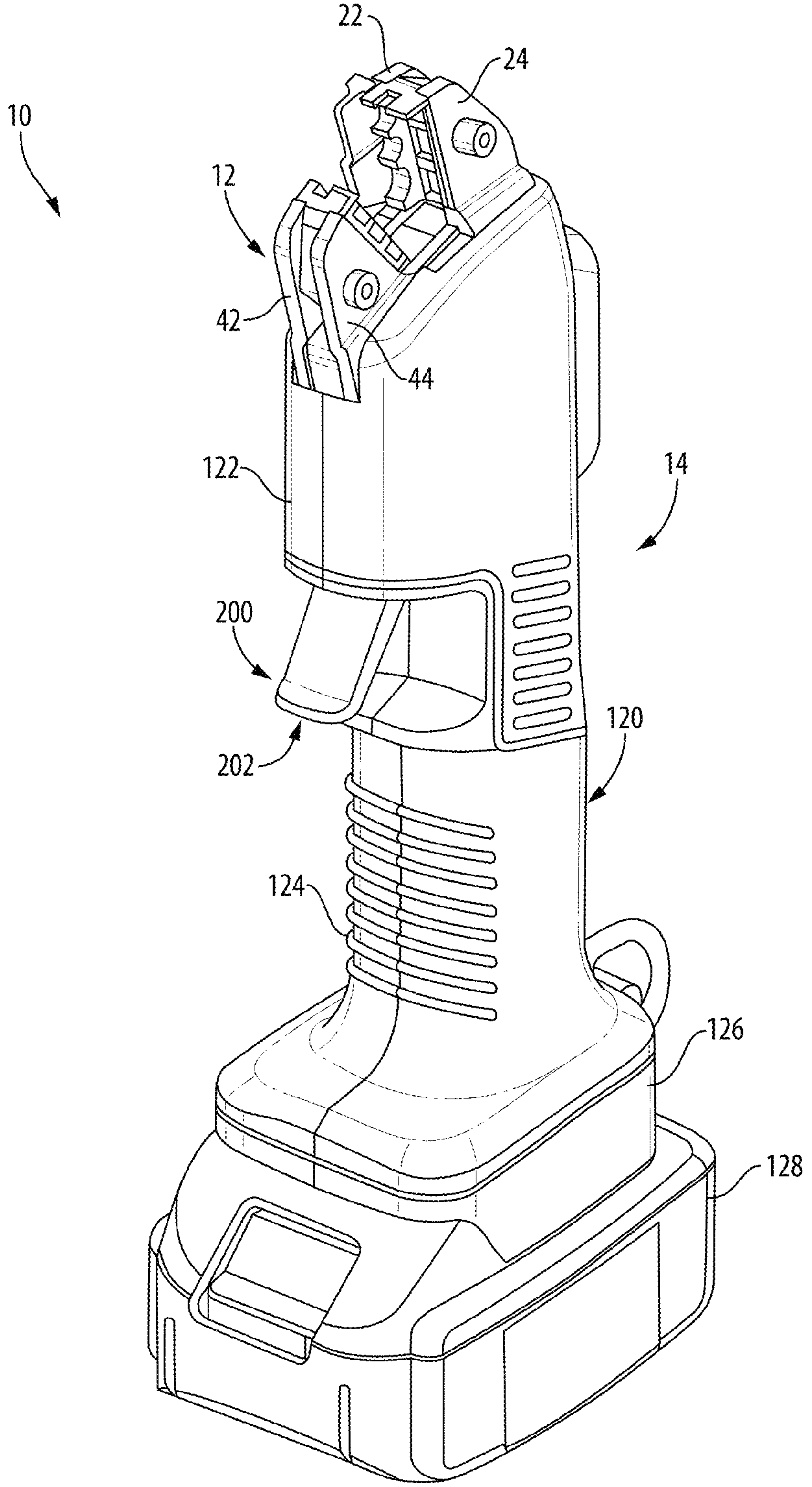
FIG. 36 is a side perspective view of a first side of another exemplary embodiment of a battery-powered tool according to the present disclosure, illustrating a working head assembly and a handle assembly.
Figure 37:
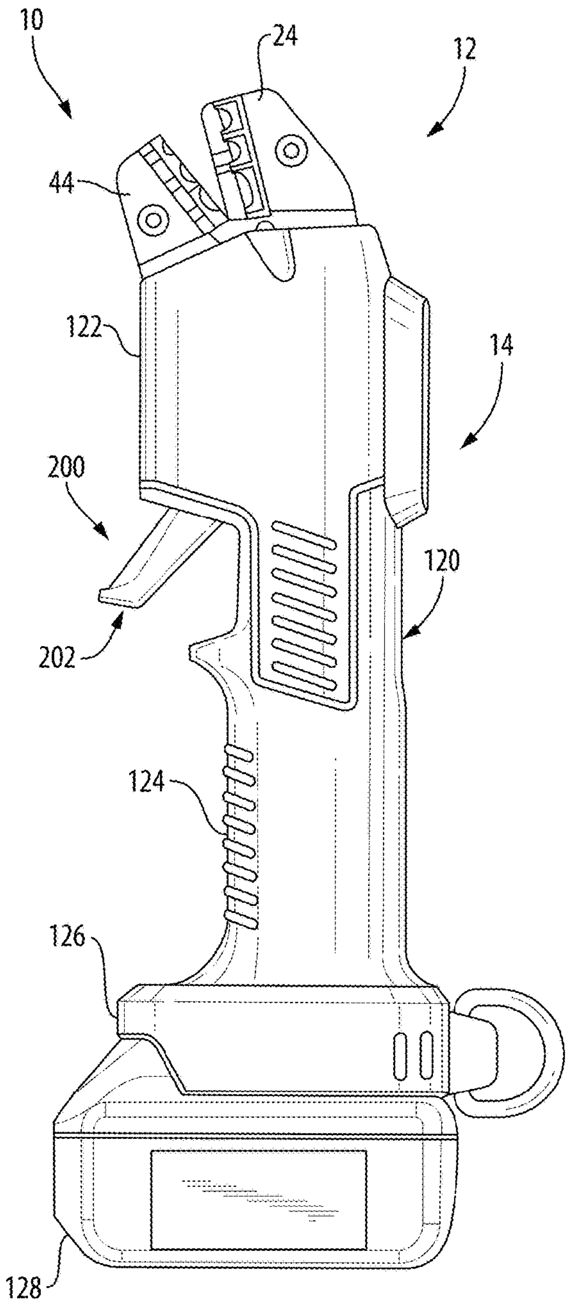
FIG. 37 is a side elevation view of a first side of the tool of FIG. 36 with the jaw assemblies in a fully open position.
Figure 38:
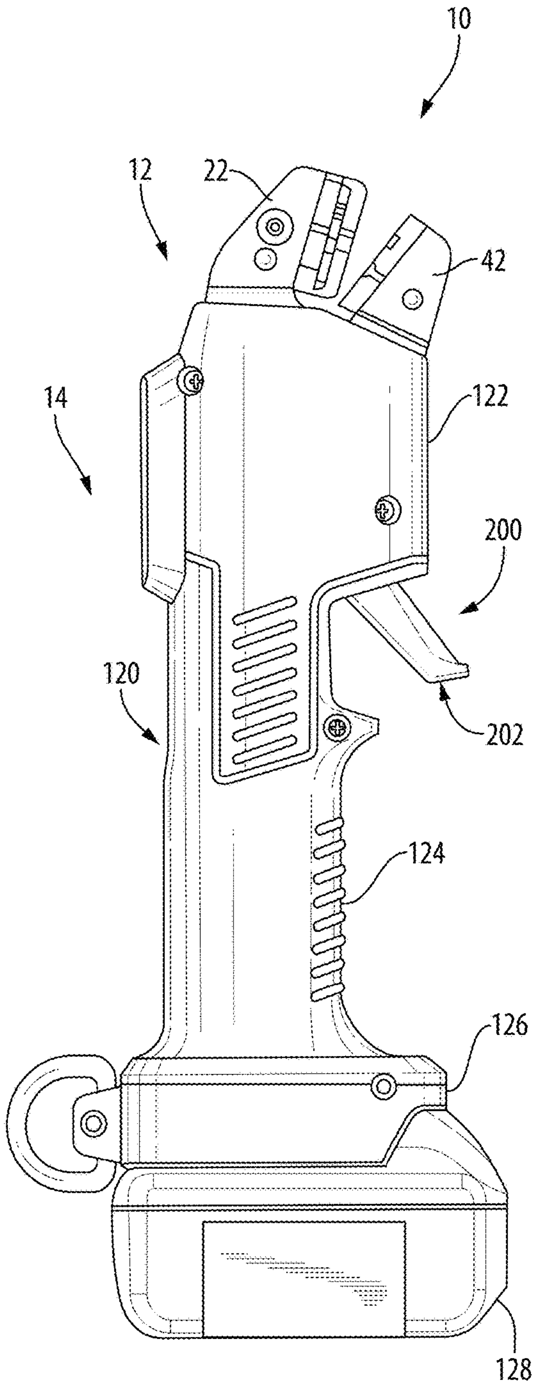
FIG. 38 is a side elevation view of a second side of the tool of FIG. 36 with the jaw assemblies in a fully open position.
Figure 39:
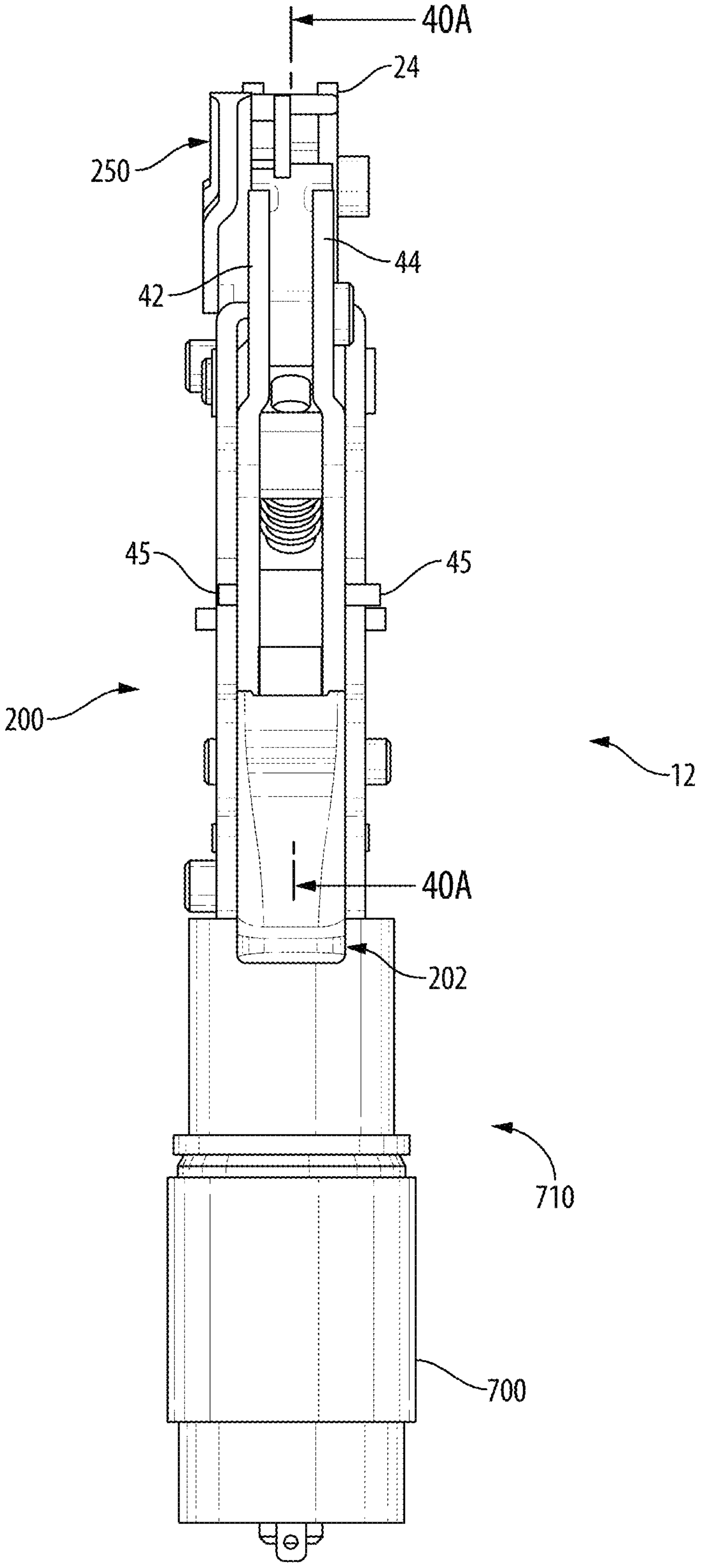
FIG. 39 is a front elevation view of the working head assembly and drive system of the tool of FIG. 36 with the handle assembly removed.
Figure 40A:
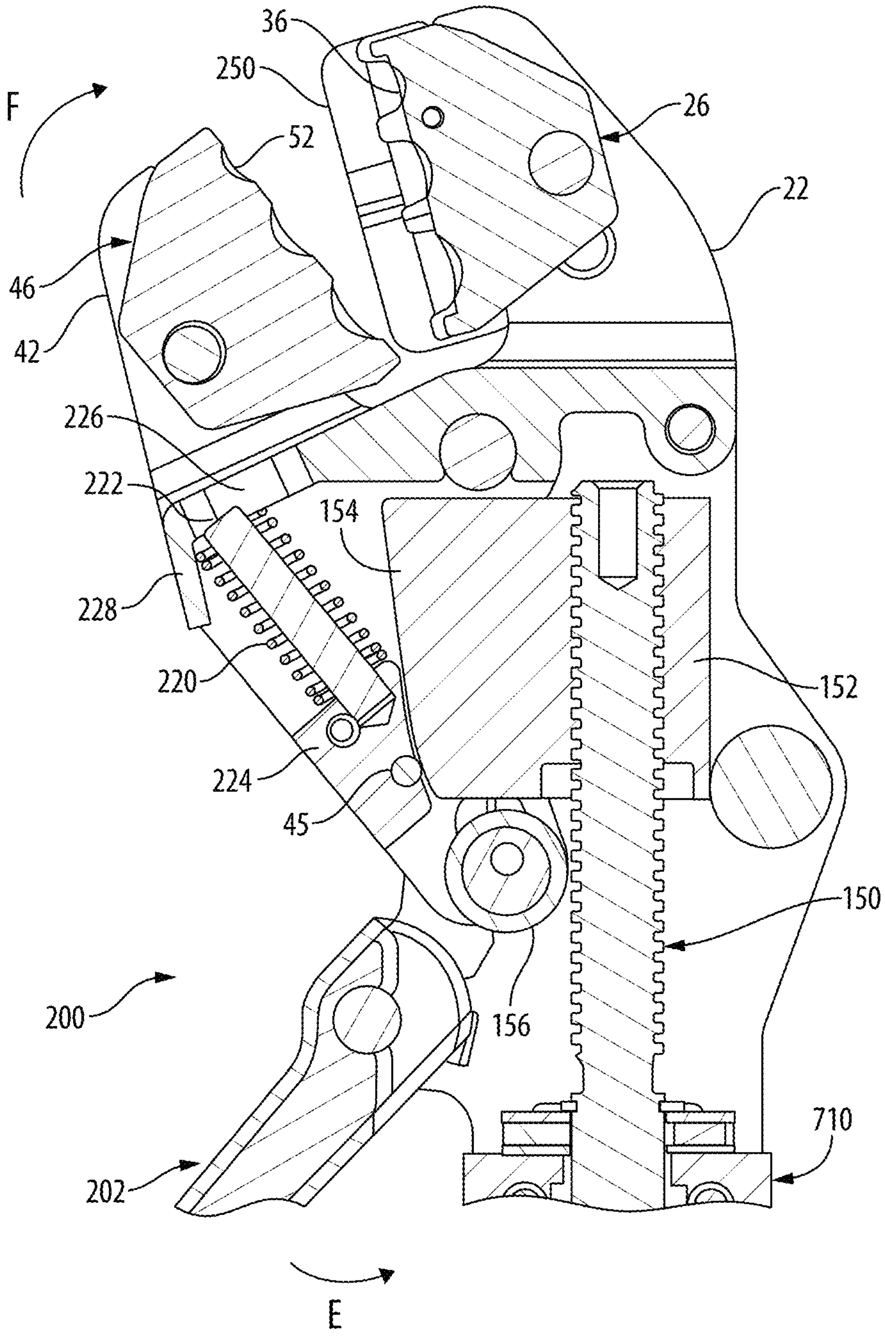
FIG. 40A is a cross-sectional view of the working head assembly of FIG. 39 taken from line 40A-40A, illustrating a biasing member used to normally bias the second jaw assembly to the fully open position.
Figure 40B:
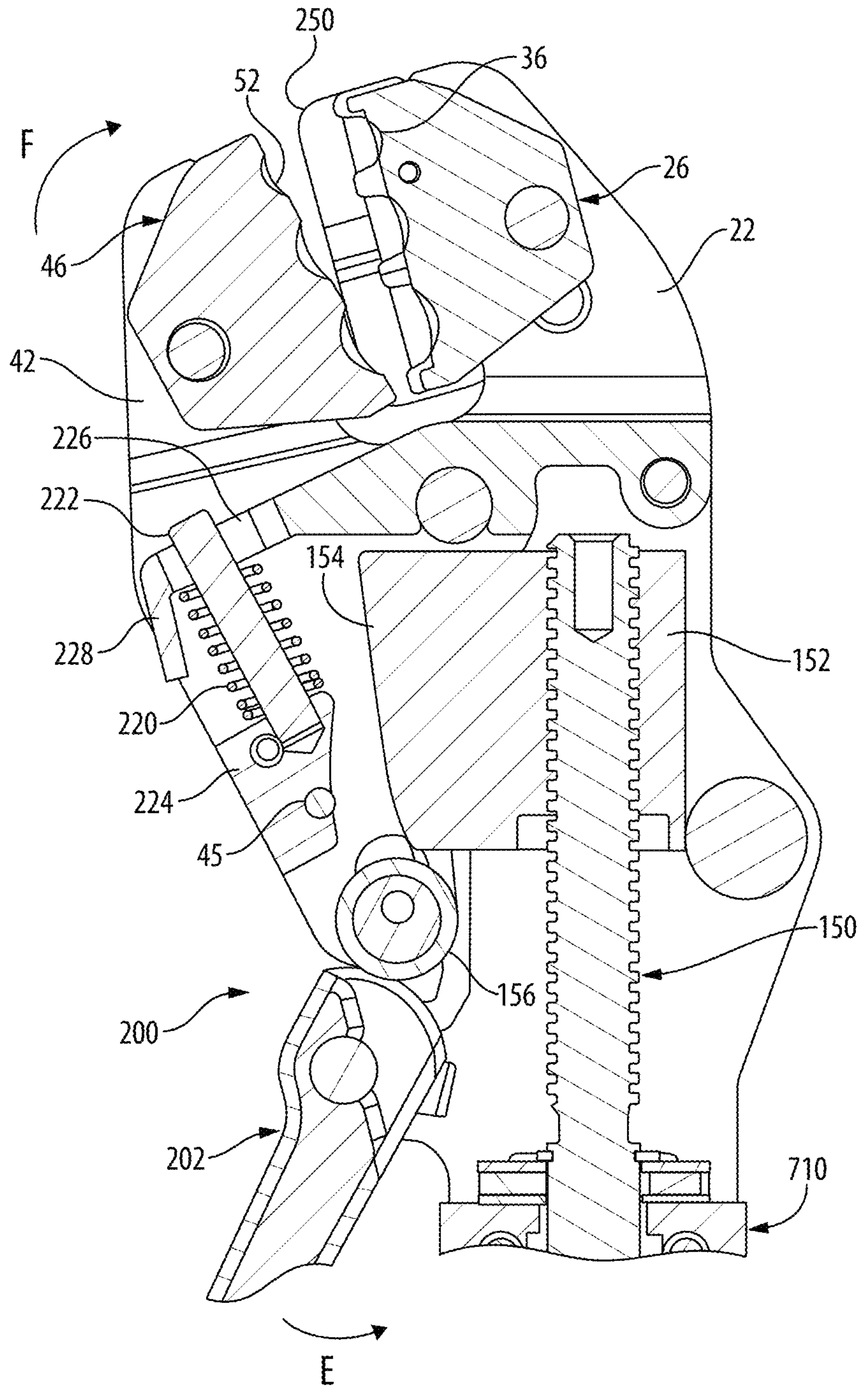
FIG. 40B is the cross-sectional view of the working head assembly of FIG. 40A, illustrating the biasing member compressing as the second jaw assembly is moved to the hold position.
Figure 40C:
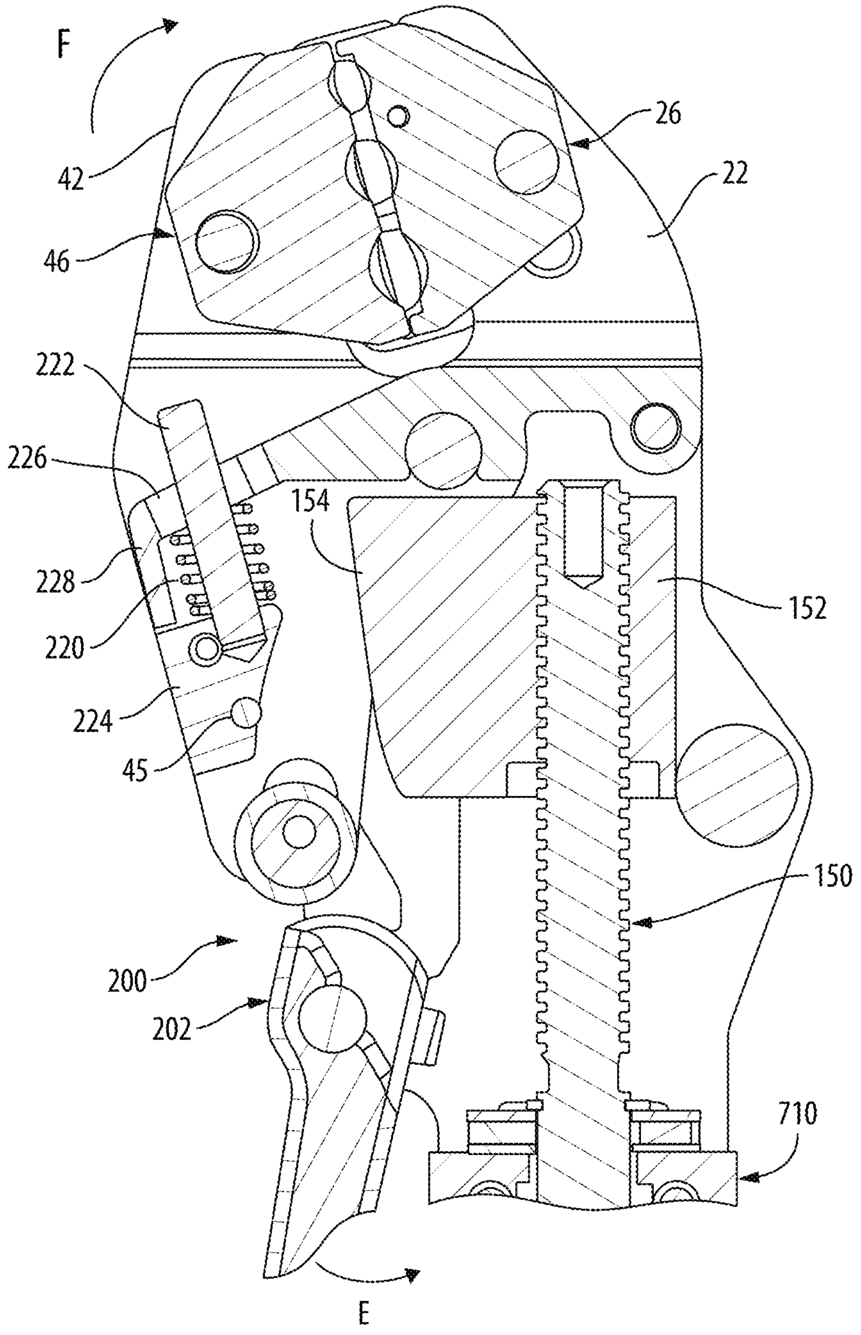
FIG. 40C is the cross-sectional view of the working head assembly of FIG. 40B, illustrating the biasing member fully compressed with the second jaw assembly in the fully crimped position.

Referring to FIGS. 36-40C, another exemplary embodiment of the mechanism used to normally and automatically bias the second jaw assembly 40 in a direction away from the first jaw assembly 20 to a fully open position, seen in FIGS. 36-38 is shown. As described in the above embodiment, the mechanism used to normally and automatically bias the second jaw assembly 40 in a direction away from the first jaw assembly 20 to a fully open position was the biasing member 28, e.g., a helical torsion spring. In this exemplary embodiment, a biasing member 220 is used to normally and automatically bias the second jaw assembly 40 in a direction away from the first jaw assembly 20. However, in this exemplary embodiment, the biasing member 220 uses compression force to normally and automatically bias the second jaw assembly 40 in a direction away from the first jaw assembly 20 to a fully open position. In the exemplary embodiment shown, the biasing member 220 is a coil spring positioned around a post 222. The post 222 has a first end secured to a bracket 224 positioned between and attached to the first jaw plate 42 and the second jaw plate 44 of the second jaw assembly 40. The post 222 has a second end that extends into an aperture 226 in a bracket 228 positioned between the first jaw plate 42 and the second jaw plate 44 of the second jaw assembly 40 and secured to the first jaw plate 22 and the second jaw plate 24 of the first jaw assembly 20. The aperture 226 is smaller in diameter than the diameter of the biasing member 220 so that an end of the biasing member 220 in contact with the bracket 228 does not pass through the aperture 226. In this configuration, when the jaw assemblies 20 and 40 are in the fully open position, the biasing member 220 is at its normal extended position, as shown in FIG. 40A. For the first stage of the multi-stage function of the trigger assembly 200, which is the hold stage, the lever portion 202*c* of the trigger 202 is articulated in the direction of arrow "E," as seen in FIG. 40B, so that the leg camming surfaces 202*e* of the legs 202*d* in contact with the pins 45 cause the second jaw assembly 40 to move in the direction of arrow "F" toward the first jaw assembly 20 so that a wire termination 800 positioned between the jaw assemblies 20 and 40 can be held between the impacting surface 36 of the die 26 of the first jaw assembly 20 and the impacting surface 52 of the die 46 of the second jaw assembly 40, seen in FIG. 40B. The position of the jaw assemblies 20 and 40 holding the wire termination 800 is a hold position of the jaw assemblies. It is noted that moving the jaw assemblies from the fully open position to the hold position is a mechanical process independent of activation of the motor 700 of the tool 10. After the crimping cycle described in the embodiments above, the jaw assemblies 20 and 40 are in the fully crimped position, seen in FIG. 40C. As the jaw assembly 40 is moved from the fully open position, seen in FIG. 40A, to the hold position, seen in FIG. 40B, and to the fully crimped position, seen in FIG. 40C, the biasing member 200 compresses. After the crimp operation is completed and the control assembly (not shown) causes the motor 700 of the drive system 710 to return the jaw drive member 152 to its normal at rest position, seen in FIG. 40A, the compressive force on the biasing member 220 is released so that the second jaw assembly 40 returns to the fully open position, seen in FIG. 40A.

Figure 41:
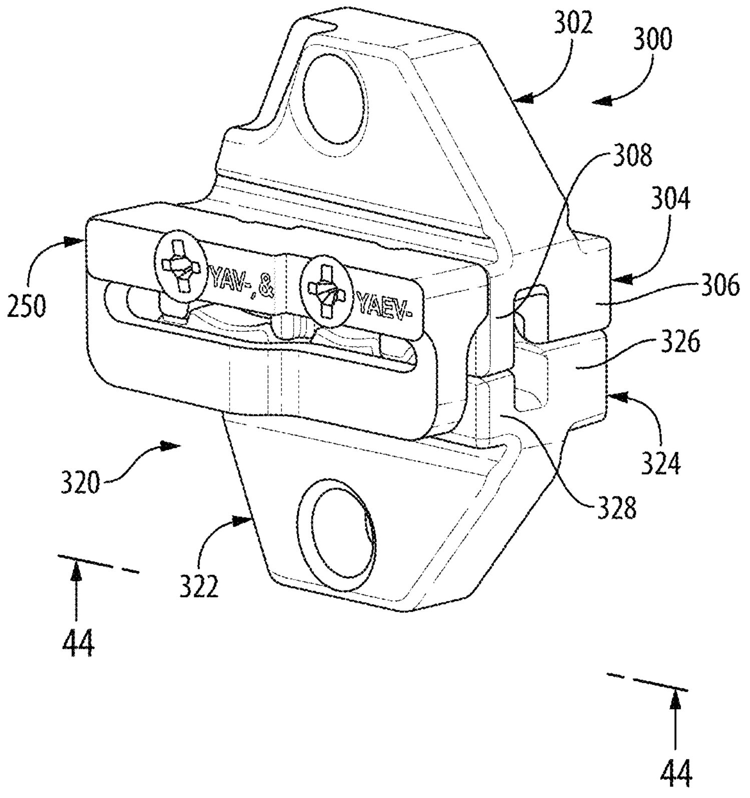
FIG. 41 is a perspective view from a first side of another exemplary embodiment of die assembly and a first side of an exemplary embodiment of a locator that can be used with the tools.
Figure 42:
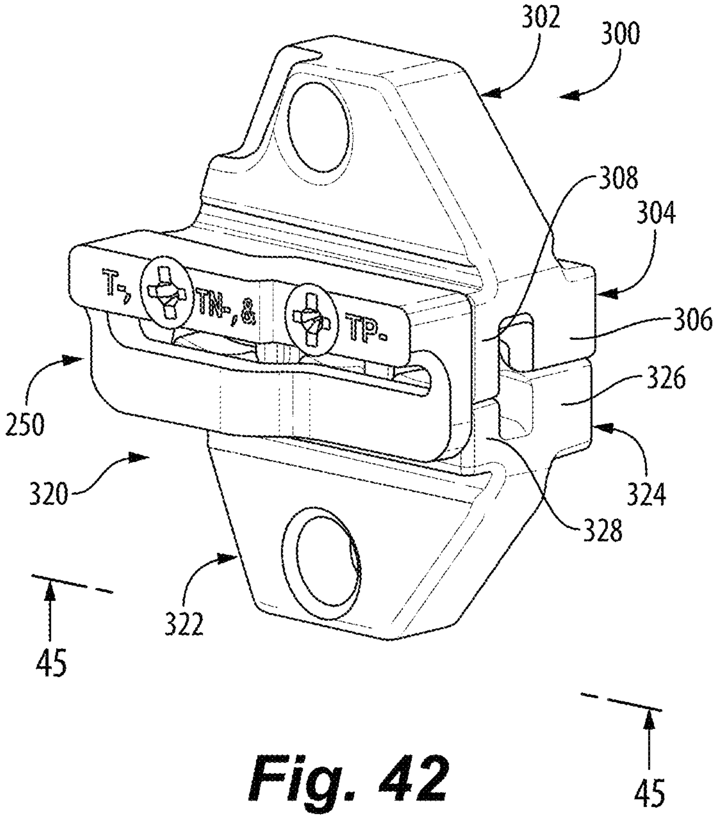
FIG. 42 is a perspective view from the first side of the die assembly and a second side of the locator of FIG. 41.
Figure 47:
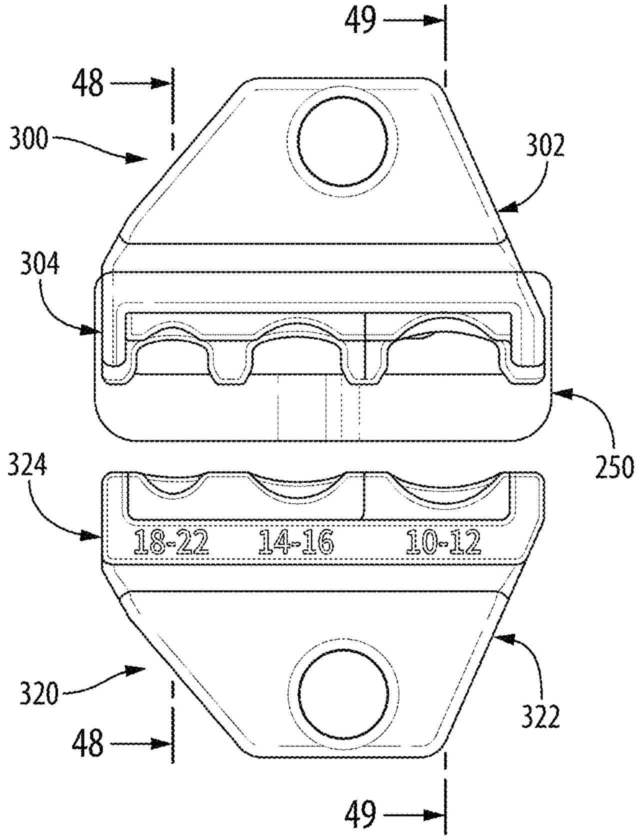
FIG. 47 is a side elevation view of the second side of the die assembly of FIG. 41, illustrating the dies separated.
Figure 48:
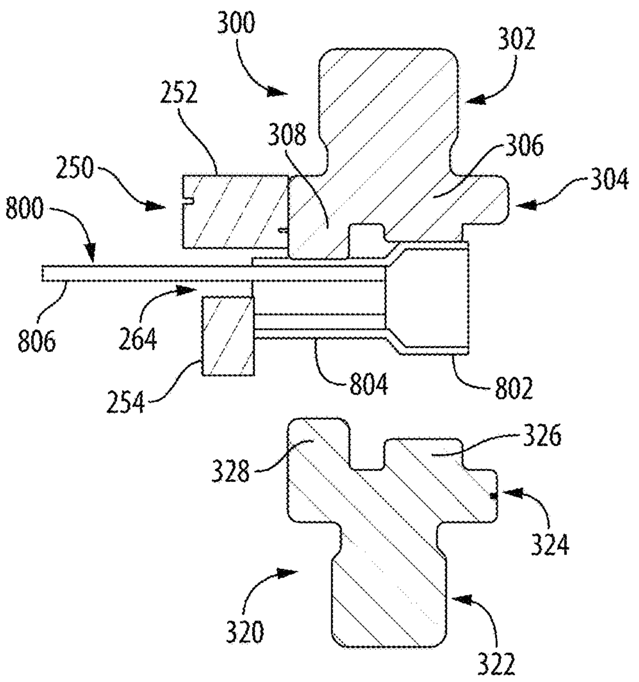
FIG. 48 is a cross-sectional view of the die assembly and the first side of the locator of FIG. 47 taken from line 48-48, illustrating a small gauge wire termination positioned between the die and aligned for impact.

Referring now to FIGS. 41-53, an exemplary embodiment of a locator 250 that can be used with the die assembly of the present disclosure is shown. In this exemplary embodiment, the die 300 would replace die 26 and the die 320 would replace die 46. The dies 300 and 320 form the die assembly. The die 300 includes a main body portion 302 and a termination holding portion 304. The main body portion 302 of the die 300 is attached to the first and second jaw plates 22 and 24 of the first jaw assembly 20 as described herein above. The termination holding portion 304 is configured and dimensioned to grip and hold one or more wire terminations 800 and to impact a barrel 804 of the wire terminations, as seen in FIG. 48. In the embodiment shown, the termination holding portion 304 is configured to hold three different size wire terminations 800. For example, as shown in FIG. 47, the termination holding portion 304 can hold a wire termination 800 capable of receiving 18-22 AWG wire, 14-16 AWG wire and 10-12 AWG wire. It is noted that for each AWG size range, the barrel 804 of the wire termination 800 would have a different inner diameter. Of course, the termination holding portion 304 of the die 300 may be configured to hold many different size ranges of wire. As shown in FIGS. 41, 42 and 48, the termination holding portion 304 includes a shroud gripping portion 306 and an impinging portion 308. In the exemplary embodiment shown, the shroud gripping portion 306 is configured and dimensioned to grip and hold a shroud 802 of the wire termination 800 inserted between the dies 300 and 320, and the impinging portion 308 is configured to grip and impact the barrel 804 of the wire termination 800.

Continuing to refer to FIGS. 41 and 42, the die 320 includes a main body portion 322 and a termination holding portion 324. The main body portion 322 of the die 320 is attached to the first and second jaw plates 42 and 44 of the second jaw assembly 40 as described herein above. The termination holding portion 324 is configured and dimensioned to grip and hold one or more wire terminations 800 and to impact the barrel 804 of the wire terminations. In the embodiment shown, the termination holding portion 324 is configured to hold three different size wire terminations 800. For example, as shown in FIG. 47, the termination holding portion 324 can hold a wire termination 800 capable of receiving 18-22 AWG wire, 14-16 AWG wire and 10-12 AWG wire. It is noted that for each AWG size range, the barrel 804 of the wire termination 800 would have a different inner diameter. Of course, the termination holding portion 324 of the die 320 may be configured to hold many different size ranges of wire. As shown in FIGS. 41, 42 and 48, the termination holding portion 324 includes a shroud gripping portion 326 and an impinging portion 328. In the exemplary embodiment shown, the shroud gripping portion 326 is configured and dimensioned to grip and hold the shroud 802 of the wire termination 800 inserted between the dies 300 and 320, and the impinging portion 328 is configured to grip and impact the barrel 804 of the wire termination 800.

Figure 43:
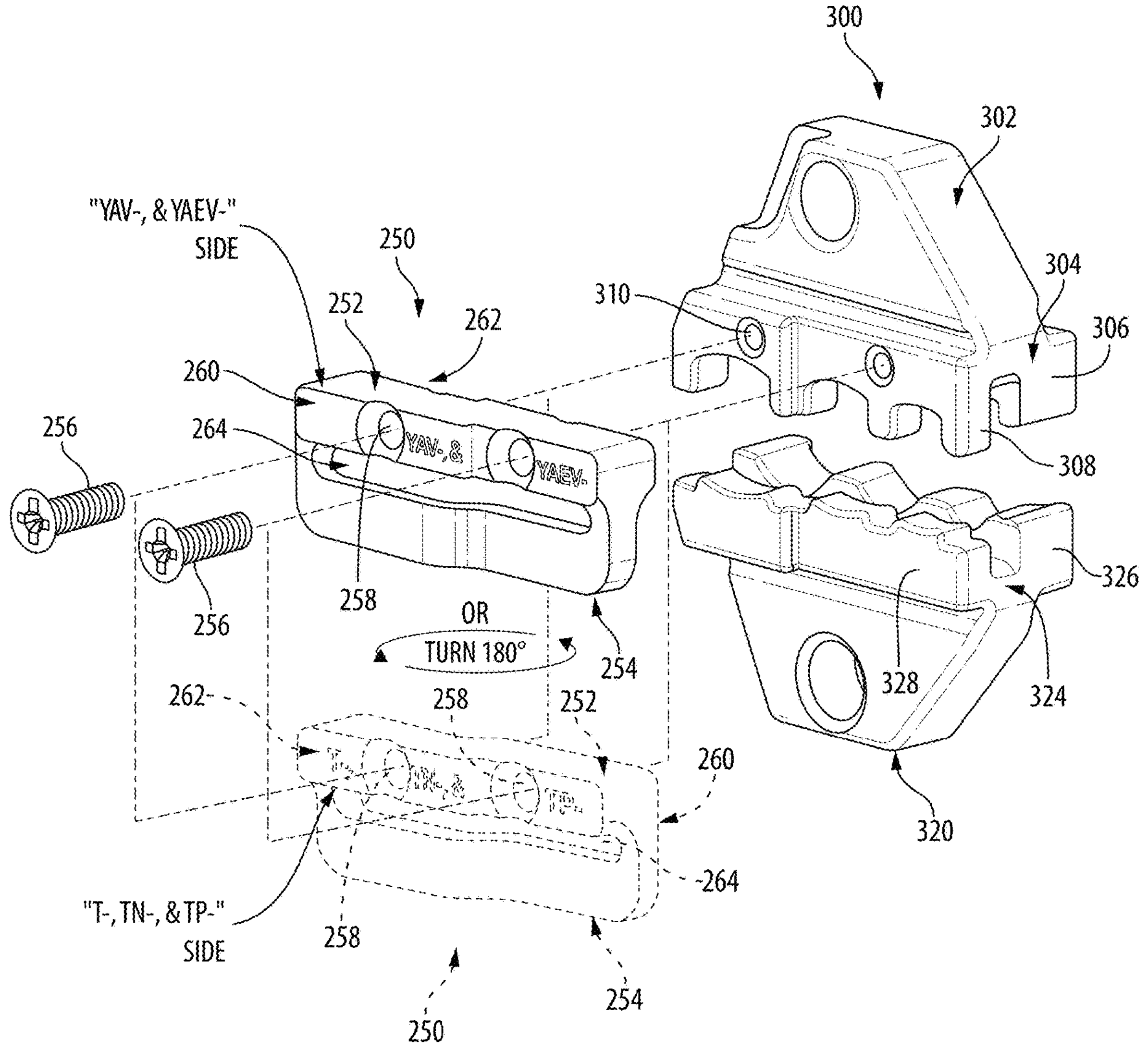
FIG. 43 is an exploded perspective view from the first side of the die assembly and the first and second side of the locator of FIG. 41.
Figure 44:
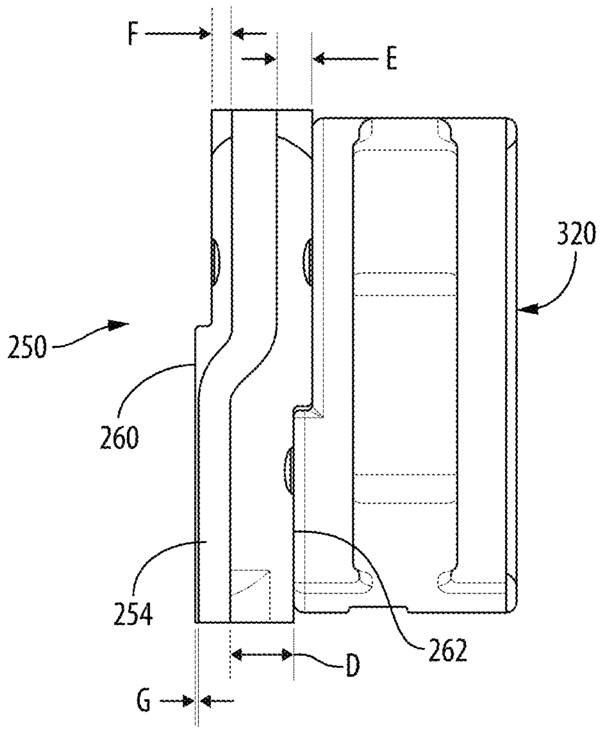
FIG. 44 is a bottom plan view of the die assembly and the locator of FIG. 41 taken from line 44-44.
Figure 45:
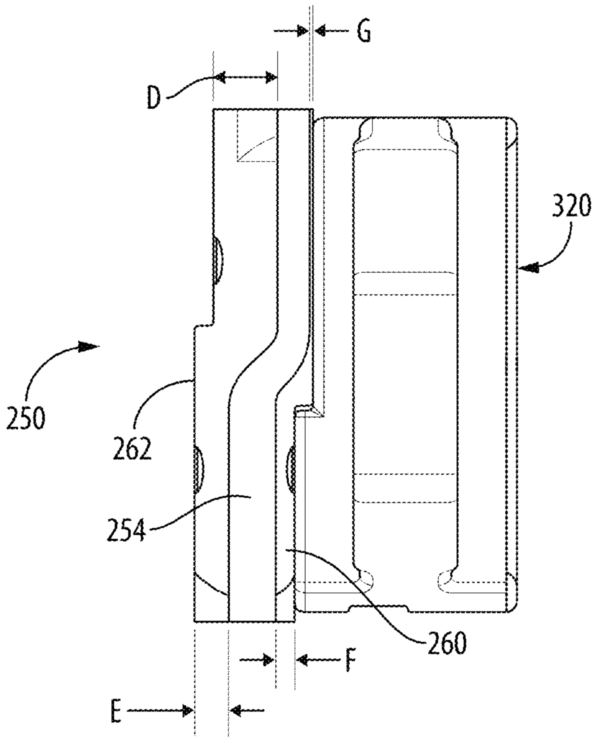
FIG. 45 is a bottom plan view of the die assembly and the locator of FIG. 42 taken from line 45-45.
Figure 46:
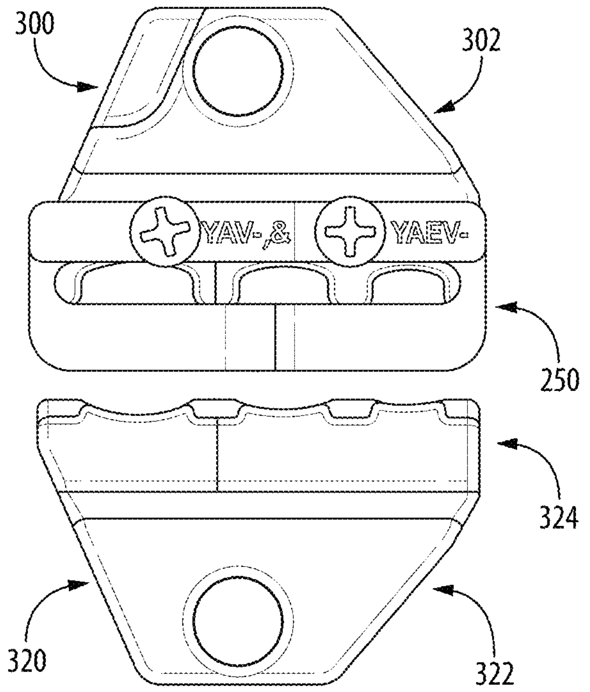
FIG. 46 is a side elevation view of the first side of the die assembly and the first side of the locator of FIG. 41, illustrating the dies separated.
Figure 49:
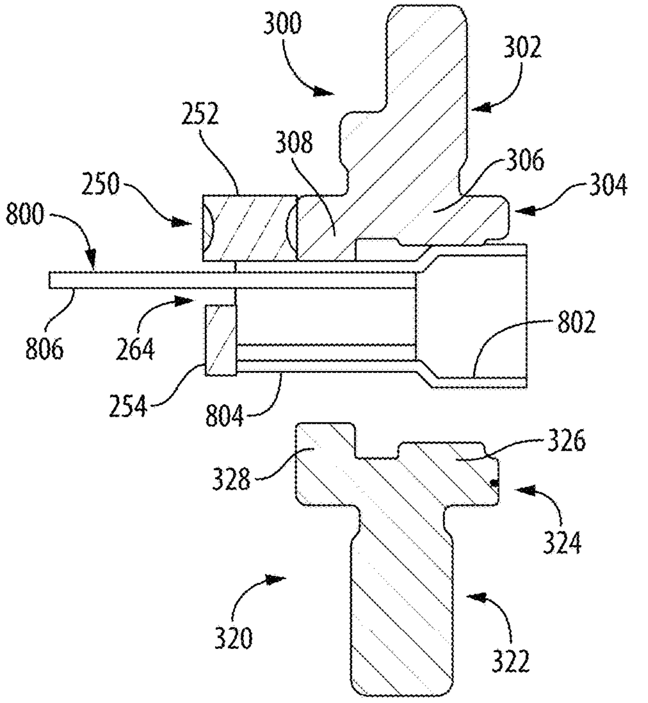
FIG. 49 is a cross-sectional view of the die assembly and the first side of the locator of FIG. 47 taken from line 49-49, illustrating a large gauge wire termination positioned between the die and aligned for impact.
Figure 50:
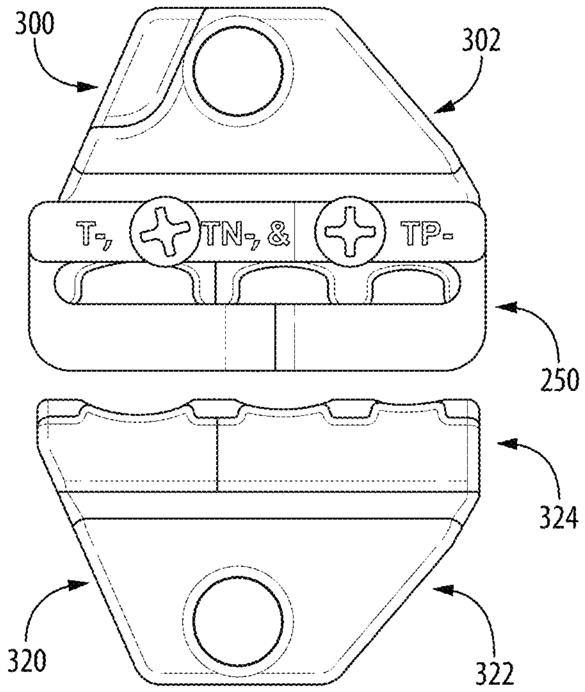
FIG. 50 is a side elevation view of the first side of the die assembly and the second side of locator of FIG. 42, illustrating the dies separated.
Figure 51:
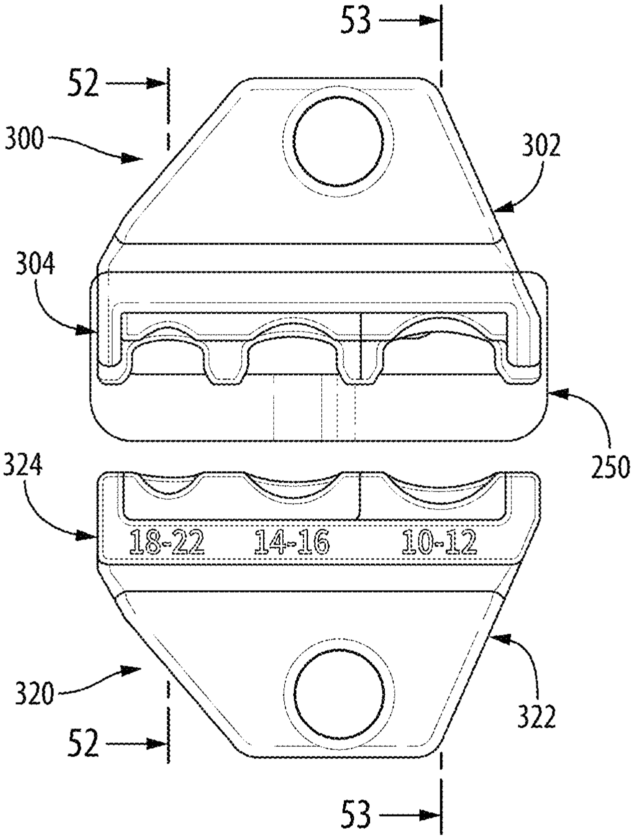
FIG. 51 is a side elevation view of the second side of the die assembly of FIG. 42, illustrating the dies separated.
Figure 52:
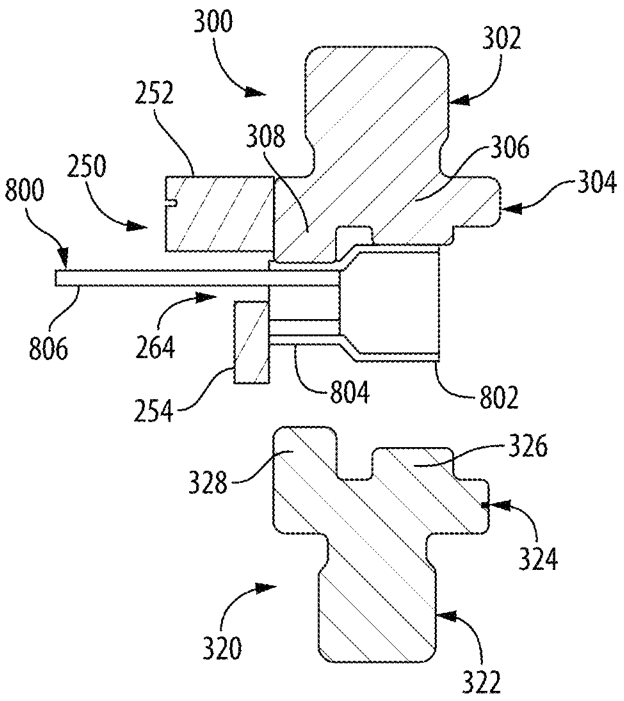
FIG. 52 is a cross-sectional view of the die assembly and the second side of the locator of FIG. 51 taken from line 52-52, illustrating a small gauge wire termination positioned between the die and aligned for impact.
Figure 53:
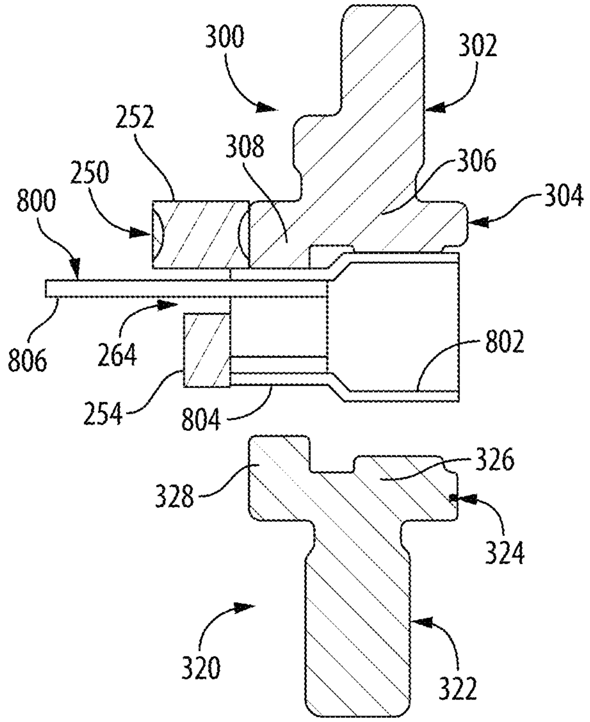
FIG. 53 is a cross-sectional view of the die assembly and the second side of the locator of FIG. 51 taken from line 53-53, illustrating a large gauge wire termination positioned between the die and aligned for impact.
Figure 54:
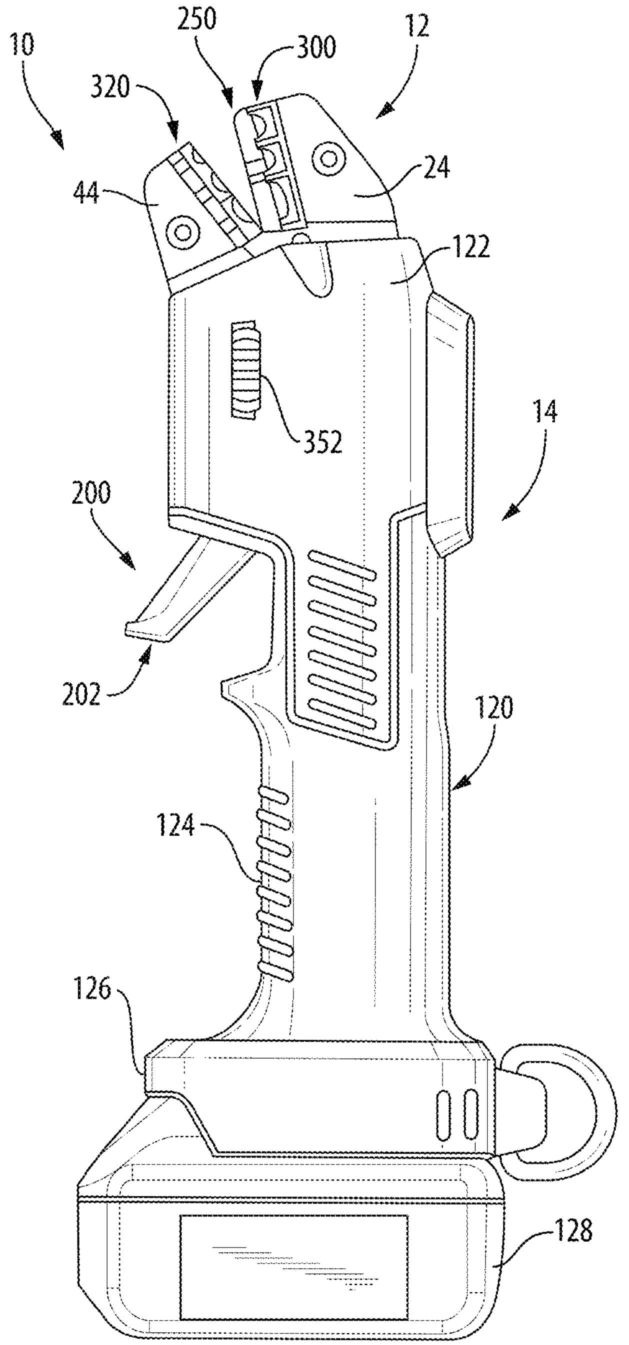
FIG. 54 is a side elevation view of a first side of another exemplary embodiment of a battery-powered tool according to the present disclosure, illustrating a working head assembly and a handle assembly.

Continuing to refer to FIGS. 41-53, the locator 250 is provided to position the wire termination between the dies 300 and 320, preferably so that the barrel 804 of the wire termination is substantially centered in the impinging portions 308 and 328. The locator 250 has a mounting body 252 and a positioning wall 254. The mounting body 252 is used, in this exemplary embodiment, to attach the locator 250 to the die 300 using fasteners 256 that pass through mounting holes 258 in the locator into mounting apertures 310 in the impinging portion 308 of the die 300, as shown in FIG. 43. The locator 250 is configured to be reversable, where a first side 260 is configured to position a first type of wire termination 800 between the dies 300 and 320, and a second side 262 is configured to position a second type of wire termination 800 between the dies 300 and 320. As a non-limiting example, the first side 260 of the locator 250 may be configured to position YAV-/YAEV-type wire terminations 800 between the dies 300 and 320, and the second side 262 of the locator 250 may be configured to position T-/TN-/TP-type wire terminations 800 between the dies 300 and 320. The locator 250 also includes a window 264 through which a terminal 806 of the wire termination 800 can pass when positioning the wire termination 800 between the dies 300 and 320, as seen in FIGS. 48 and 49. The positioning wall 254 of the locator 250 is configured so that the impinging portion 308 of die 300 and the impinging portion 328 of die 320 are at an approximate center of the barrel 804 of the wire termination 800 positioned between the dies 300 and 320, as seen in FIGS. 48, 49, 52 and 53. To achieve this objective, the positioning wall 254 of the locator 250 may be, for example, a curved wall that alters the distance between the positioning wall 254 and an approximate center of the impinging portion 308 of the die 300 and the impinging portion 328 of the die 320 so that a barrel of a particular wire termination is approximately centered on the impinging portion 308 of the die 300 and the impinging portion 328 of the die 320. However, the present disclosure contemplates the positioning wall 254 to have any suitable shape that alters the distance between the positioning wall 254 and an approximate center of the impinging portion 308 of the die 300 and the impinging portion 328 of the die 320 so that a barrel of a particular wire termination is approximately centered on the impinging portion 308 of the die 300 and the impinging portion 328 of the die 320. As a non-limiting example, the positioning wall 254 may be a segmented wall where each segment alters the distance between the positioning wall 254 and an approximate center of the impinging portion 308 of the die 300 and the impinging portion 328 of the die 320. As another non-limiting example, the positioning wall 254 may be a stepped wall where each step in the positioning wall altering the distance between the positioning wall 254 and an approximate center of the impinging portion 308 of the die 300 and the impinging portion 328 of the die 320.

Figure 60:
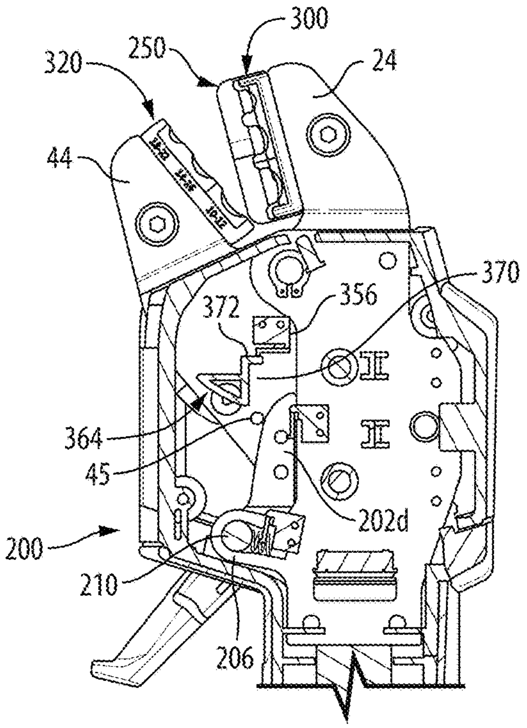
FIG. 60 is a cross-sectional view of the portion of the battery-powered tool of FIG. 58 taken from line 60-60, illustrating the jaw assembly in the fully open position and the positioning of the safety system in the unlocked position.
Figure 61:
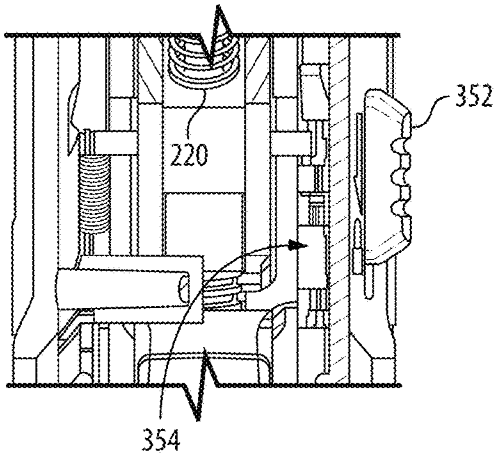
FIG. 61 is a cross-sectional view of a portion of the battery-powered tool of FIG. 59 taken from line 61-61, and illustrating the positioning of the safety system in the unlocked position.
Figure 62:
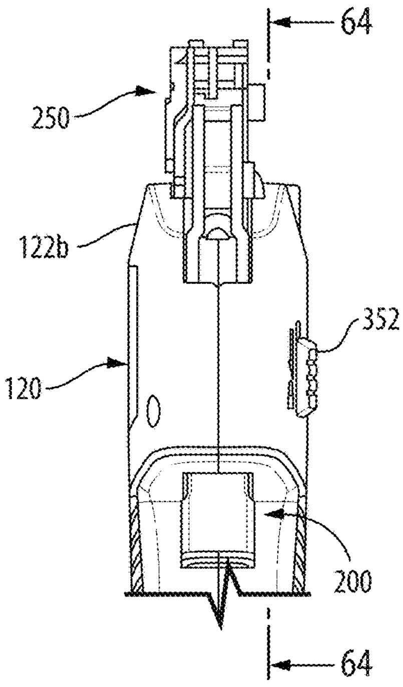
FIG. 62 is front elevation view of a portion of the battery-powered tool of FIG. 55, illustrating a button of a safety system in the locked position.
Figure 63:
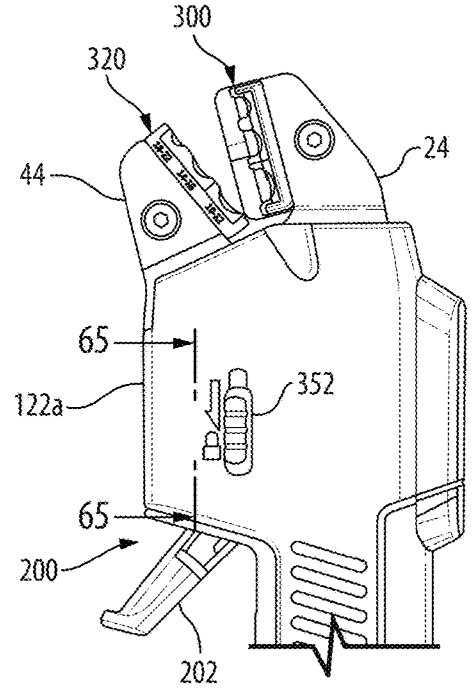
FIG. 63 is a side elevation view of the portion of the battery-powered tool of FIG. 62, illustrating the button of the safety system in the locked position.

Referring now to FIGS. 54-76, exemplary embodiments of safety systems that may be included in the tool 10 are shown. The safety system is provided to block activation of the motor 700 of the tool 10 when the safety system is in an "off" state or position and to permit activation of the motor 700 when the safety system is in an "on" state or position. In this exemplary embodiment, the safety system 350 includes a button 352, a trigger blocking member 354, and a cutout switch 356. The button 352 and trigger blocking member 354 are shown in FIG. 56, and the cutout switch 356 is shown in FIG. 60.

Figure 55:
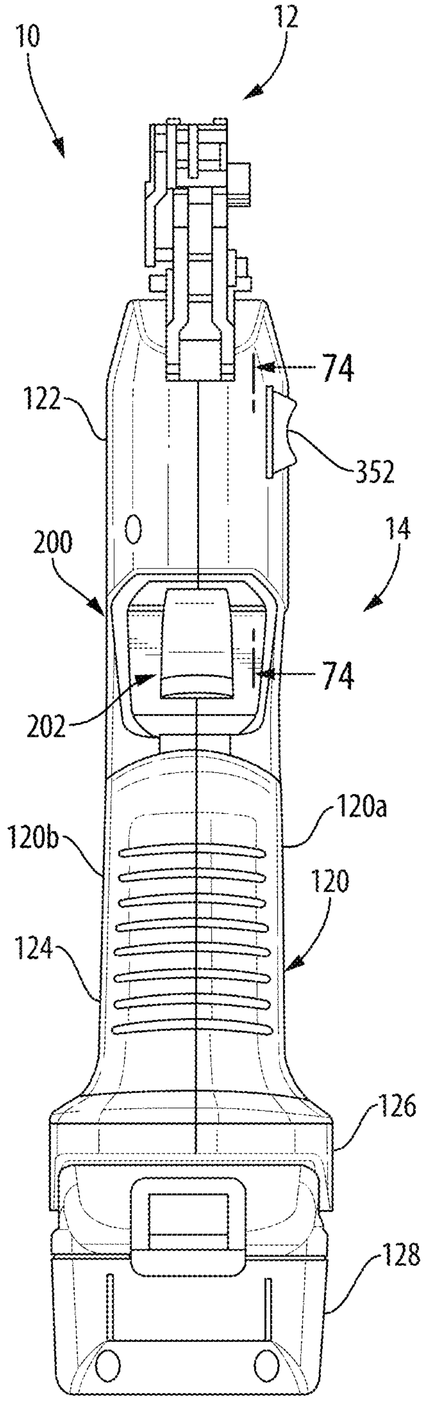
FIG. 55 is a front elevation view of the battery-powered tool of FIG. 54.
Figure 56:
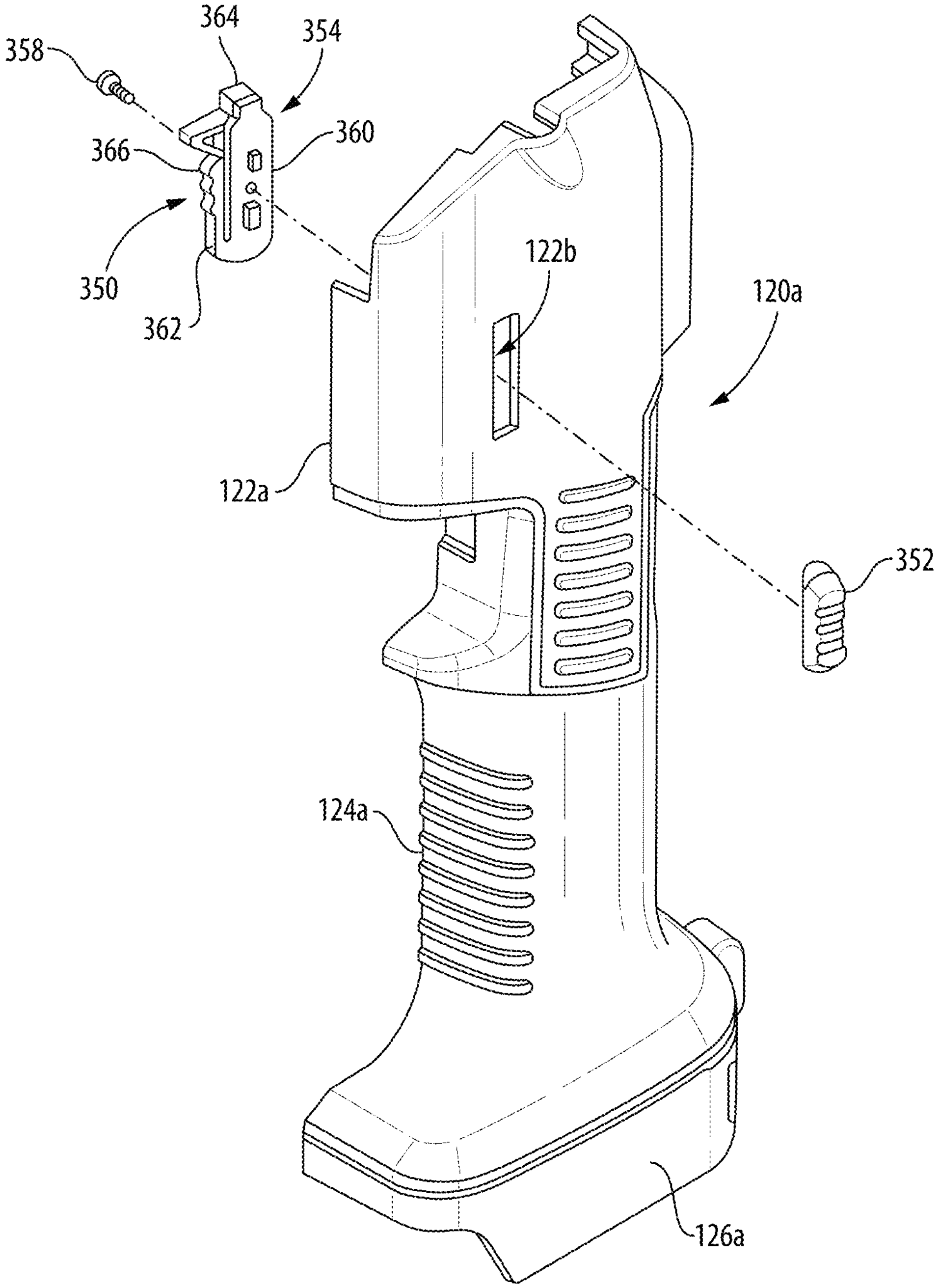
FIG. 56 is an outside perspective view of a housing half of the handle assembly according to the present disclosure, illustrating components of a safety system.
Figure 57:
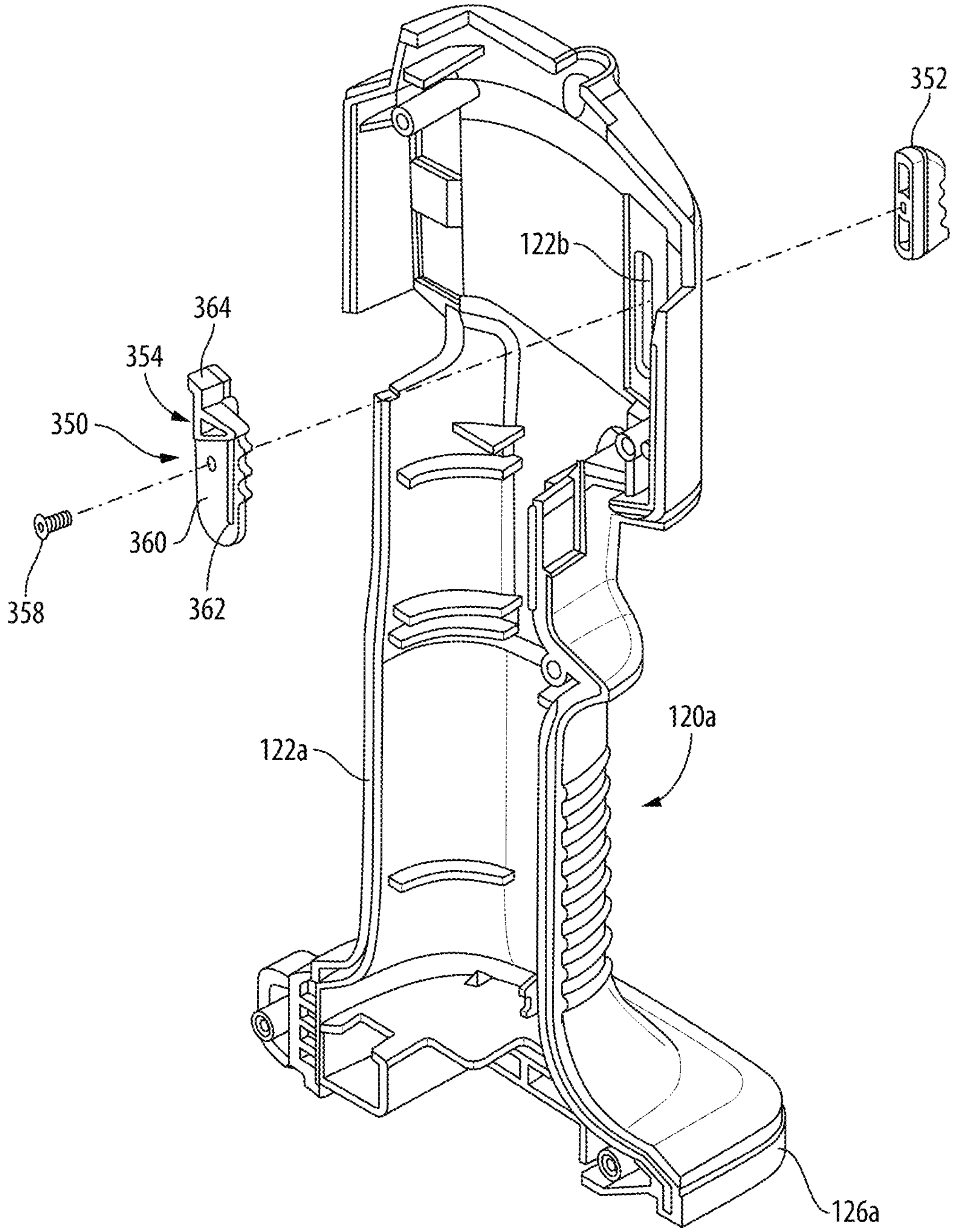
FIG. 57 is an inside perspective view of the housing half of the handle assembly of FIG. 56.
Figure 58:
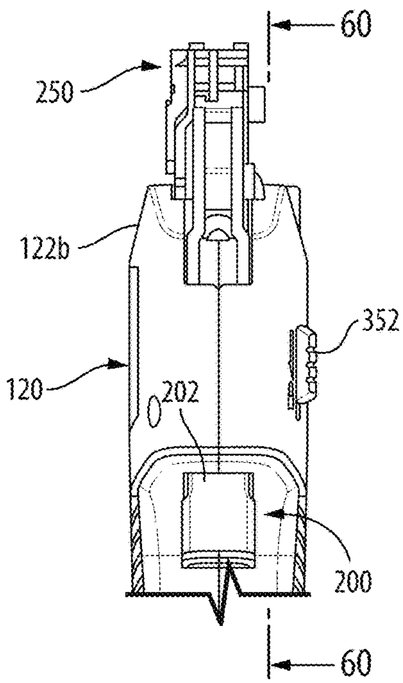
FIG. 58 is front elevation view of a portion of the battery-powered tool of FIG. 55, illustrating a button of a safety system in the unlocked position.
Figure 59:
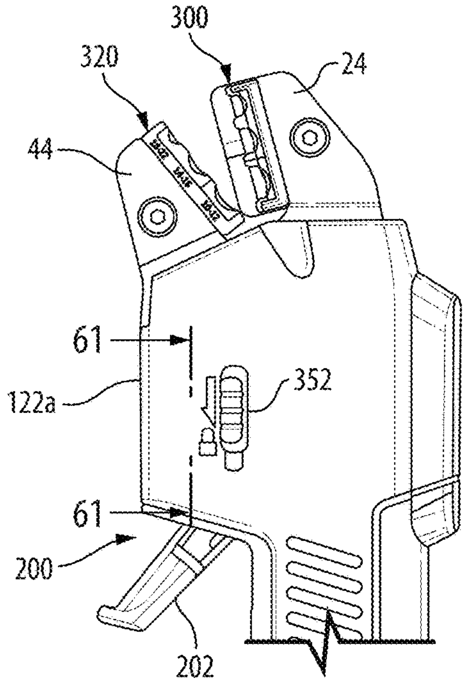
FIG. 59 is a side elevation view of the portion of the battery-powered tool of FIG. 58, illustrating the button of the safety system in the unlocked position.

As shown in FIGS. 54-57, the housing 120 of the handle assembly 14 is a two-part housing having a first housing half 120*a*, seen in FIGS. 55, 56 and 57, and a second housing half 120*b*, seen in FIG. 55, that when joined form the housing 120, seen in FIG. 55. In this exemplary embodiment, the first housing half 120*a* includes a window 122*b* through which the button 352 and the trigger blocking member 354 are movably, e.g., slidably, connected to the first housing half 120*a* using a fastener 358, as shown in FIGS. 56 and 57. The window 122*b* is positioned on the first housing half 120*a* so that the trigger blocking member 354 is aligned to selectively interfere with the operation of the trigger 202. More specifically, the trigger blocking member 354 includes a body 360 having a flexible ribbed arm 362 extending from the body 360 and a blocker 364 attached to an inside surface of the body 360. The flexible ribbed arm 362 includes one or more ribs 366 configured to engage one or more detent members 368 secured to or monolithically formed into the first housing half 120*a*, as shown in FIGS. 70, 70A and 71-73. The ribs 366 and detent member 368 holds the button 352 and the trigger blocking member 354 in an unlocked position or a locked position and provide a tactile indication when the button 352 and the trigger blocking member 354 are moved between the unlocked and locked positions. The blocker 364 includes a blocking arm 370 and a switch arm 372, seen in FIGS. 71-73. When the trigger blocking member 354 is in the locked position, seen in FIG. 64, the blocking arm 370 is positioned to interfere with the pin 45 used to move the second jaw assembly 40 from the fully open position to the hold position. When the trigger blocking member 354 is in the unlocked position, seen in FIG. 60, the blocking arm 370 is positioned to permit use of the pin 45 to move the second jaw assembly 40 from the fully open position to the hold position.

Figure 64:
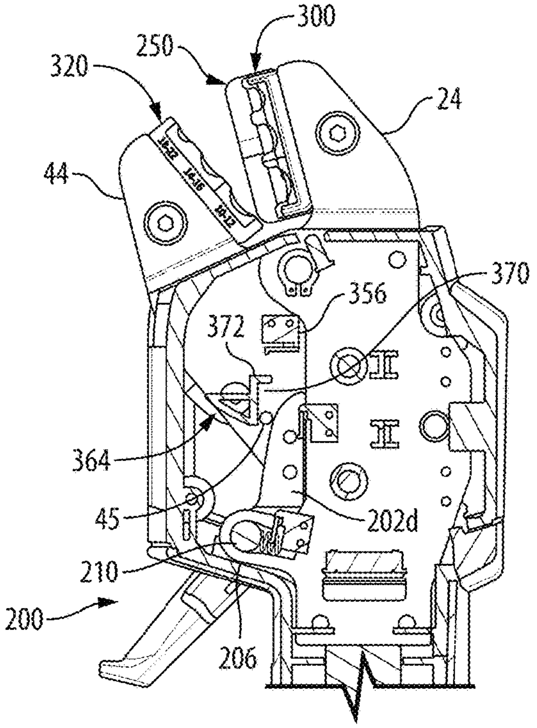
FIG. 64 is a cross-sectional view of the portion of the battery-powered tool of FIG. 62 taken from line 64-64, illustrating the jaw assembly in the fully open position and the positioning of the safety system in the locked position.
Figure 65:
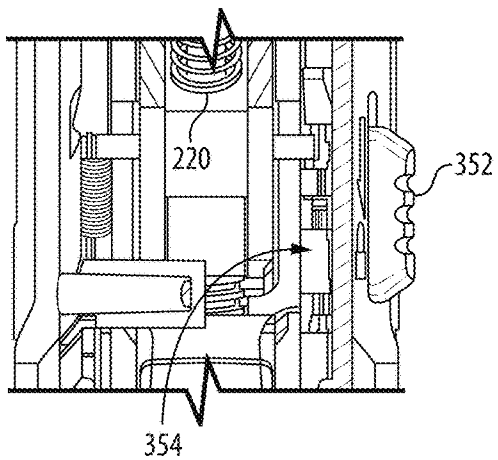
FIG. 65 is a cross-sectional view of a portion of the battery-powered tool of FIG. 63 taken from line 65-65, and illustrating the positioning of the safety system in the locked position.
Figure 66:
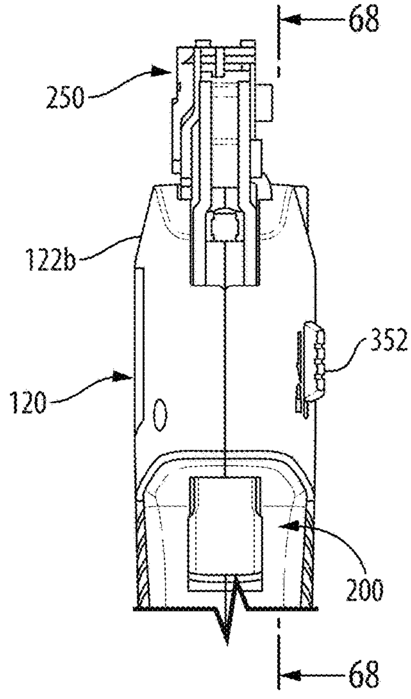
FIG. 66 is front elevation view of a portion of the battery-powered tool of FIG. 55, illustrating a positioning of a trigger blocking member of the safety system when attempting to move the safety system to the locked position while the jaws of the jaw assembly are in the hold position.
Figure 67:
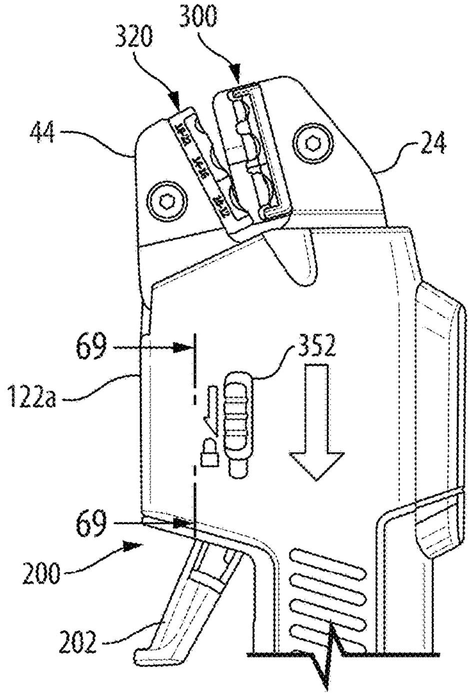
FIG. 67 is a side elevation view of the portion of the battery-powered tool of FIG. 66, illustrating a positioning of a trigger blocking member of the safety system when attempting to move the safety system to the locked position while the jaws of the jaw assembly are in the hold position.
Figure 68:
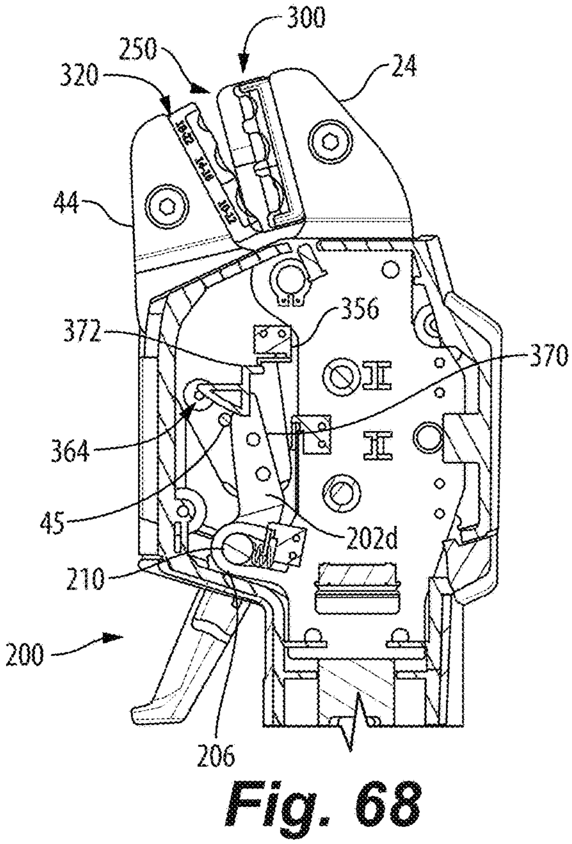
FIG. 68 is a cross-sectional view of the portion of the battery-powered tool of FIG. 66 taken from line 68-68, illustrating a positioning of a trigger blocking member of the safety system when attempting to move the safety system to the locked position while the jaws of the jaw assembly are in the hold position.
Figure 69:
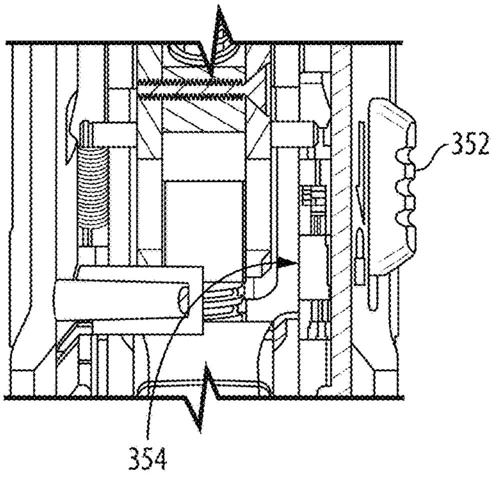
FIG. 69 is a cross-sectional view of a portion of the battery-powered tool of FIG. 67 taken from line 69-69, and illustrating the button of the safety system from moving toward the locked position.
Figure 70:
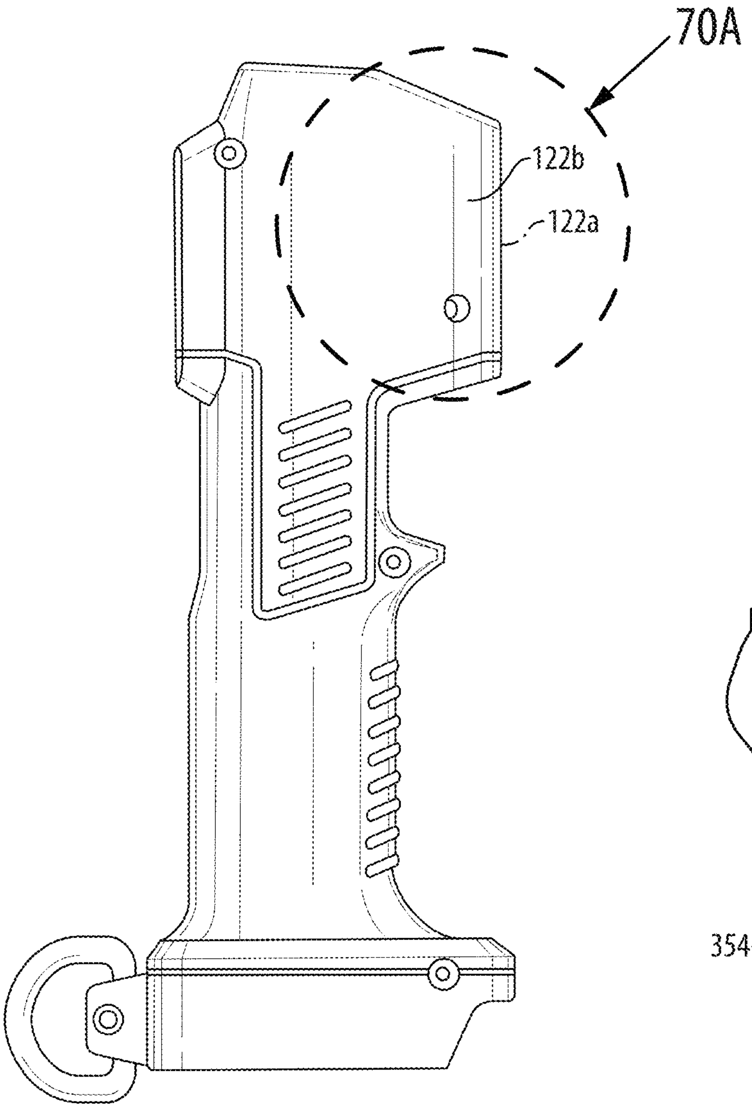
FIG. 70 is a side elevation view of the handle assembly of FIG. 54.
Figure 70A:
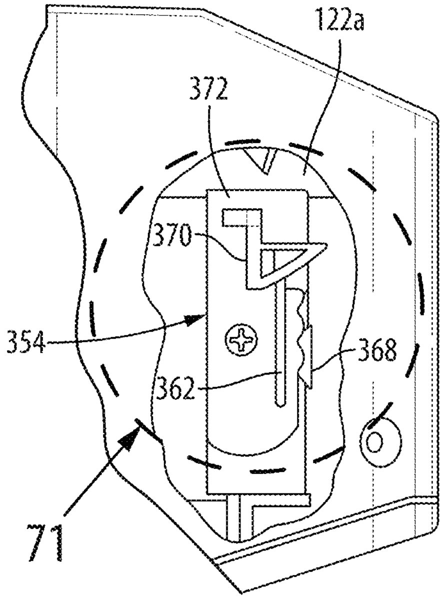
FIG. 70A is an enlarged portion of the handle assembly of FIG. 70 taken from detail 70A, and illustrating a portion of the handle assembly cutaway to reveal a trigger blocking member of the safety system.
Figure 71:
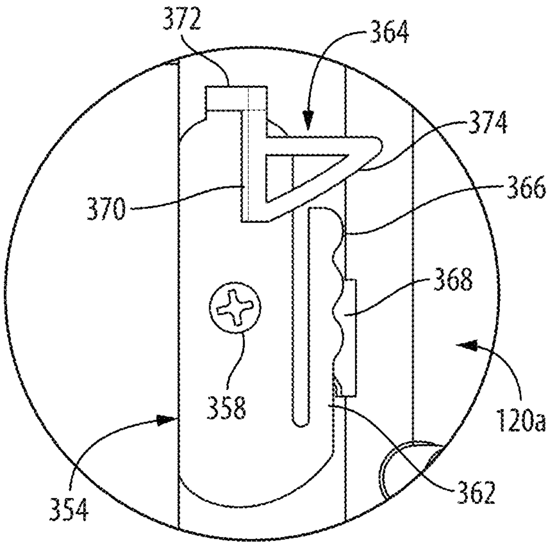
FIG. 71 is an enlarged portion of the housing half of the handle assembly of FIG. 70A taken from detail 71, and illustrating the position of the trigger blocking member of the safety system when the safety system is in the unlocked position.
Figure 72:
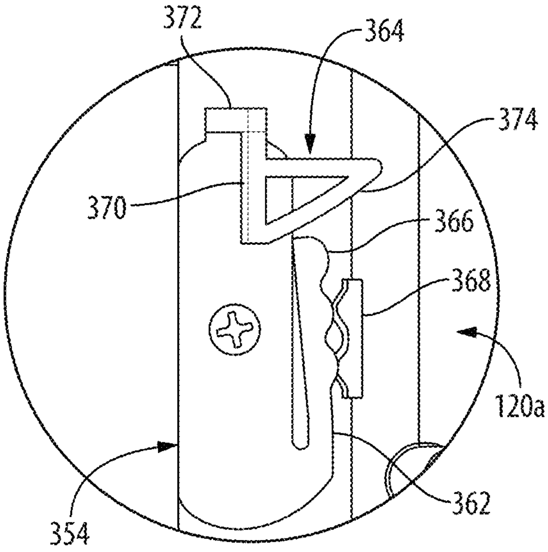
FIG. 72 is the enlarged portion of the housing half of FIG. 71, illustrating the position of the trigger blocking member of the safety system in an intermediate position.
Figure 73:
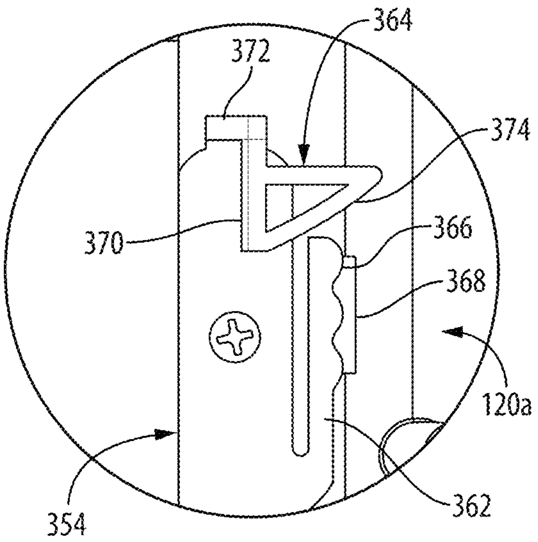
FIG. 73 is the enlarged portion of the housing half of FIG. 71, illustrating the position of the trigger blocking member of the safety system when the safety system is in the locked position.

The operation of the safety system 350 will be described with reference to FIGS. 58-69. With the button 352 of the safety system 350 in the unlocked position, seen in FIGS. 59 and 61, the blocking arm 370 of the blocker 364, seen in FIG. 60, is positioned away from the pin 45 extending from the second jaw plate 44. With the blocking arm 370 positioned away from the pin 45, the blocking arm 370 is in an unblocking position and does not interfere with the movement of the pin 45. As a result, the blocking arm 370 does not interfere with the movement the second jaw assembly 40 from the fully open position to the hold position. In addition, a switch arm of the cutout switch 356 is contacted by the switch arm 372 of the blocker 364 turning the cutout switch 356 "on." Turning the cutout switch "on" causes the control assembly (not shown) to enable the motor 700 to be activated by the trigger 202 as described herein. With the button 352 of the safety system 350 in the locked position, seen in FIGS. 62-65, the blocking arm 370 of the blocker 364, seen in FIG. 64, is positioned to block movement of pin 45. With the blocking arm 370 in a blocking position, the blocking arm 370 interferes with the movement of the pin 45 and thus interferes with the movement the second jaw assembly 40 from the fully open position to the hold position. In addition, with the button 352 in the locked position, the switch arm of the cutout switch 356 is no longer in contact with the switch arm 372 of the blocker 364 so that the cutout switch 356 is turned "off" Turning the cutout switch 356 "off" causes the control assembly (not shown) to disable the motor 700 from being activated by the trigger 202. Further, when the button 352 of the safety system 350 is in the unlocked position and the trigger 202 is articulated to move the second jaw assembly 40 toward the hold position, seen in FIGS. 66-69, the surface 374 of the blocker 364 contacts the pin 45 so that the pin moves along the surface 374 as the trigger 202 is moved. As a result, the surface 374 blocks the button 352 from being moved to the locked position when the trigger 202 is moved.

Figure 74:
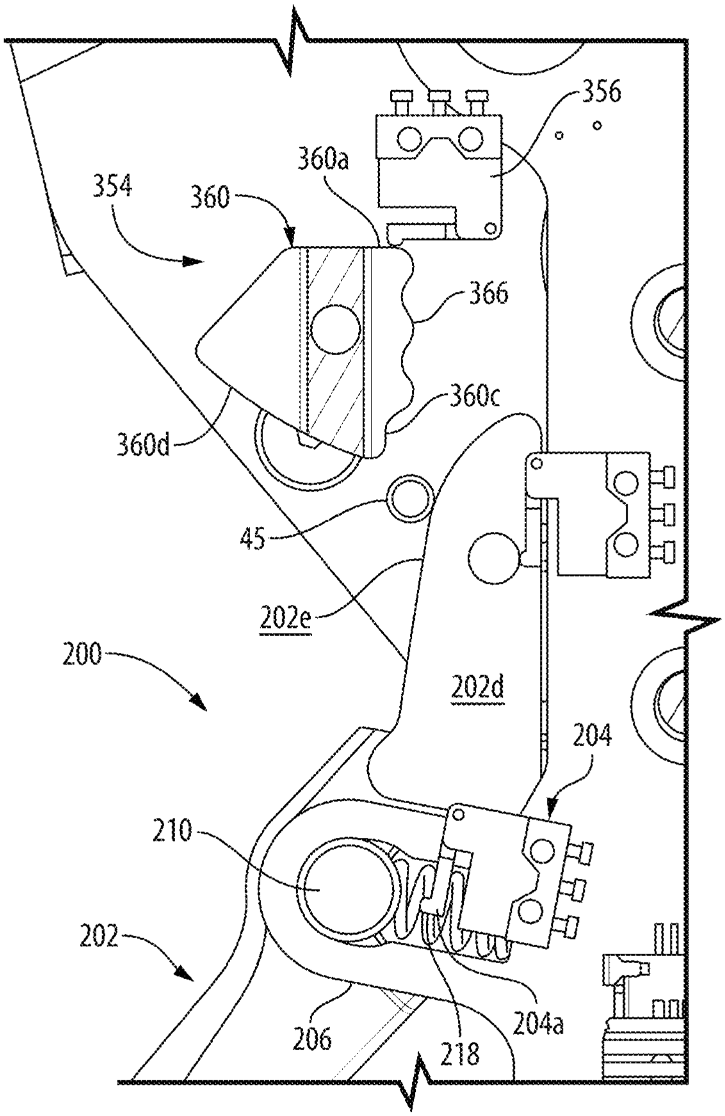
FIG. 74 is an enlarged view of another exemplary embodiment of a safety system according to the present disclosure, illustrating a positioning of a trigger blocking member of the safety system when the safety system is in the unlocked position.
Figure 75:
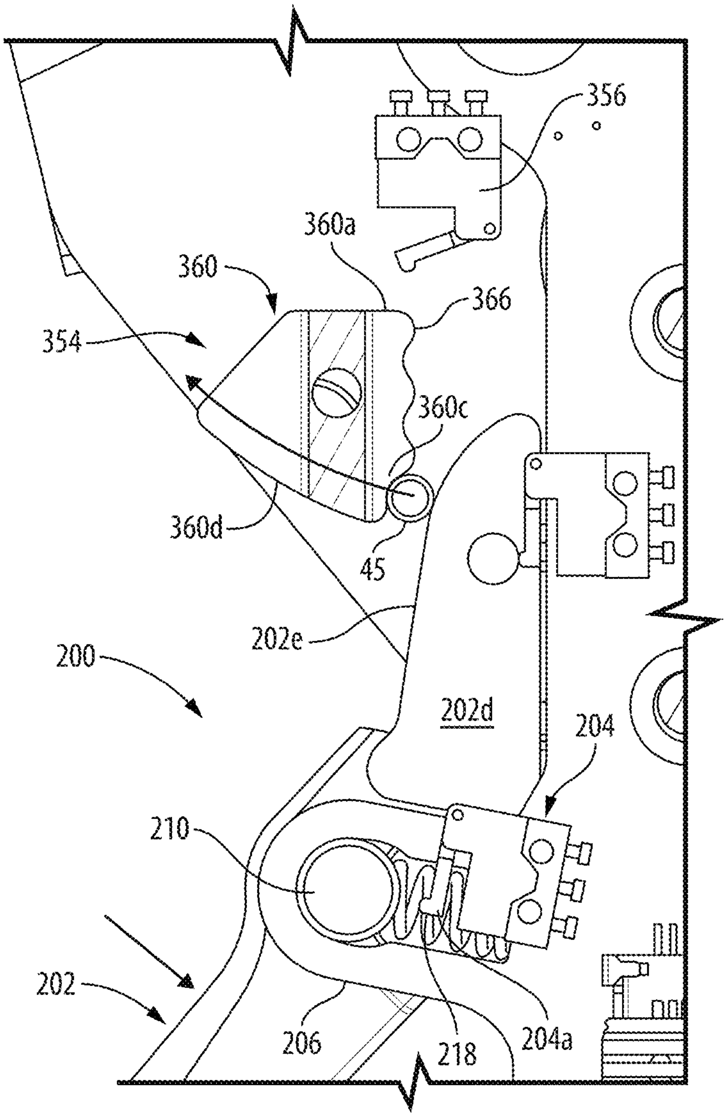
FIG. 75 is the enlarged view of the safety system of FIG. 74, illustrating a positioning of a trigger blocking member of the safety system when the safety system is in the locked position.
Figure 76:
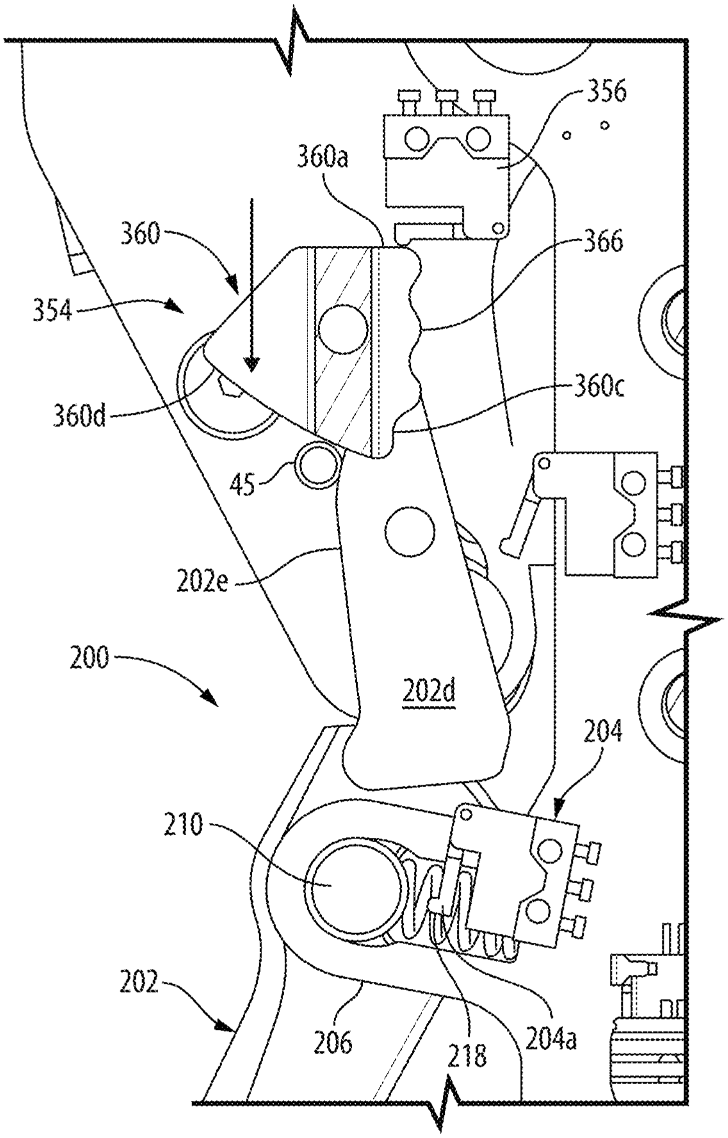
FIG. 76 is the enlarged view of the safety system of FIG. 75, illustrating a positioning of a trigger blocking member of the safety system when attempting to move the safety system to the locked position while the jaws of the jaw assembly are in an intermediate position.
Figure 77:
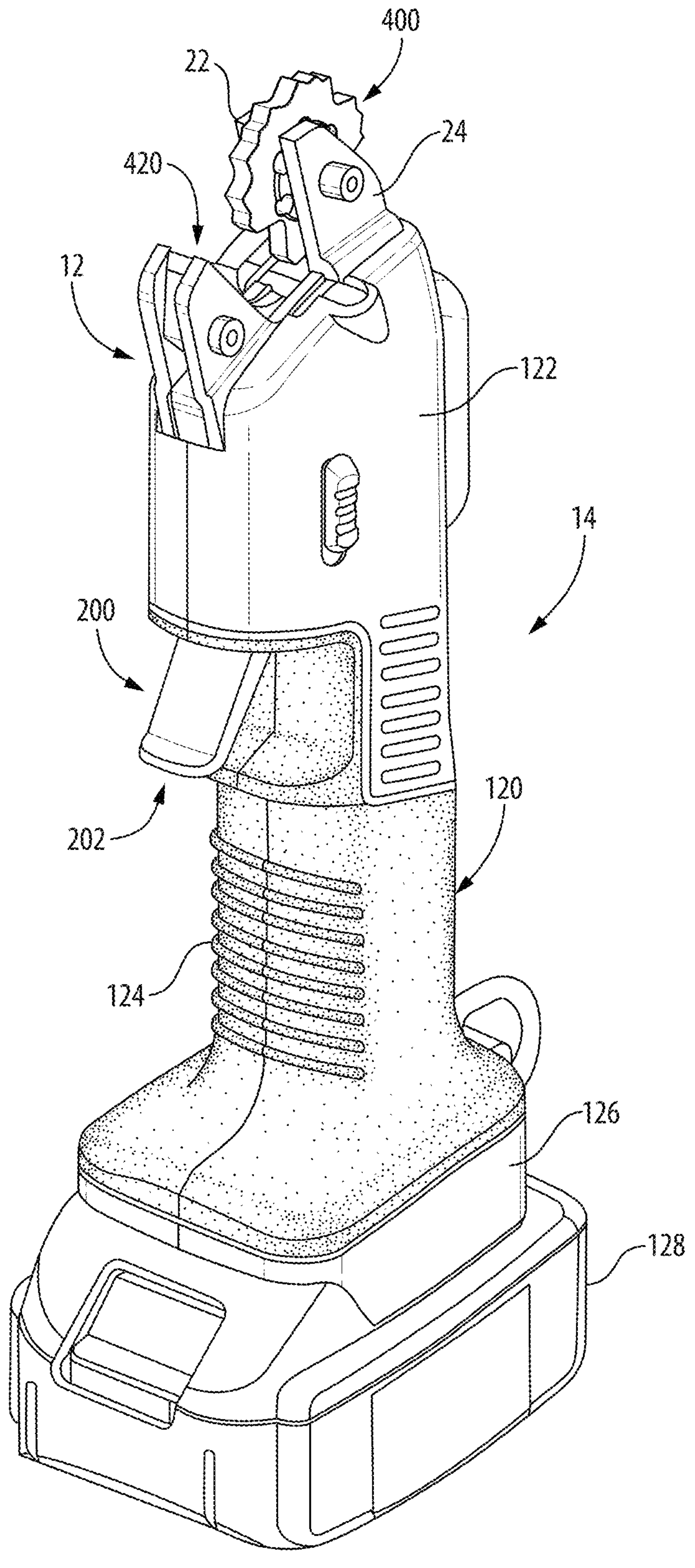
FIG. 77 is a side perspective view of a first side of another exemplary embodiment of a battery-powered tool according to the present disclosure, illustrating a working head assembly with a die wheel and a handle assembly.
Figure 78:
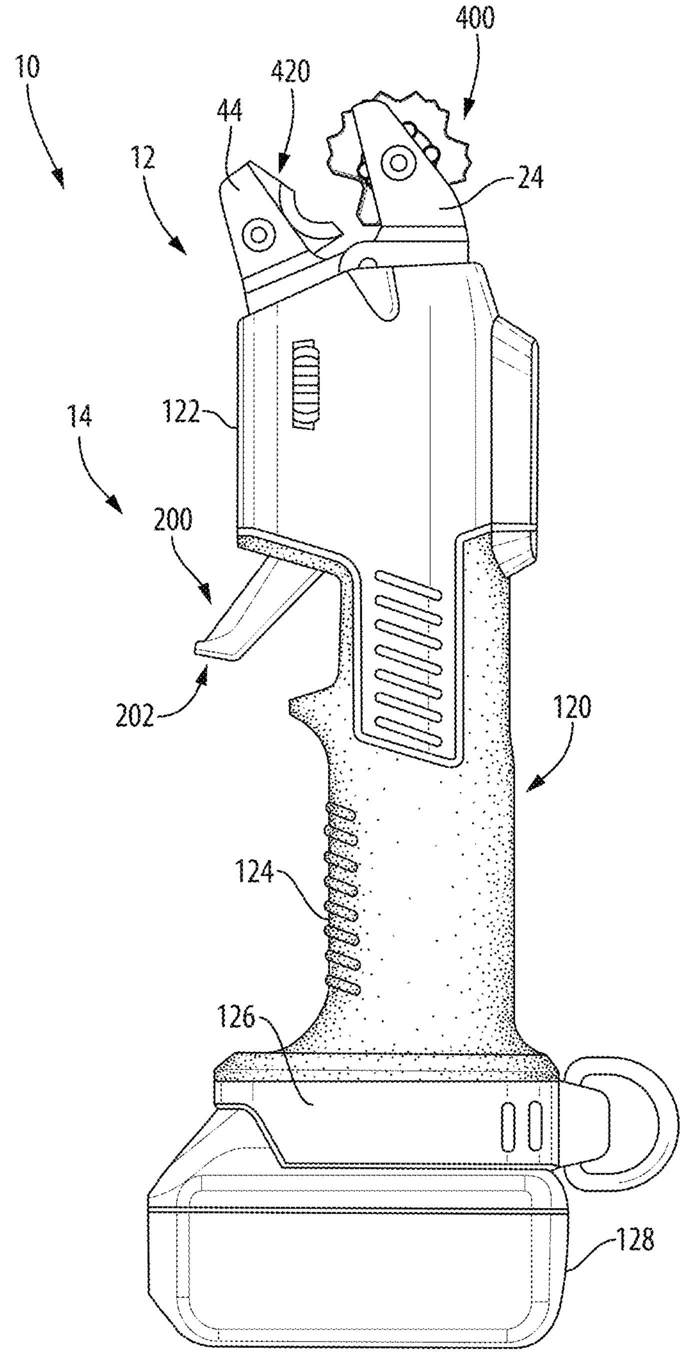
FIG. 78 is a side elevation view of the first side of the battery-powered tool of FIG. 77.
Figure 79:
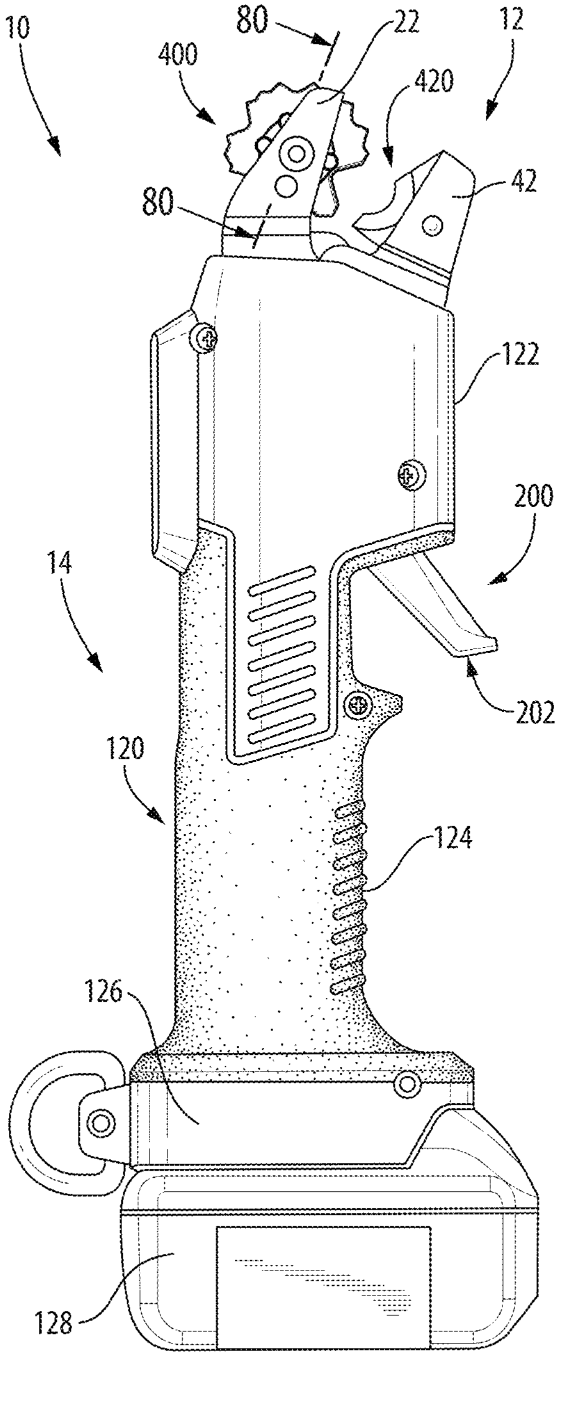
FIG. 79 is a side elevation view of a second side of the battery-powered tool of FIG. 77.

Referring to FIGS. 74-76, another exemplary embodiment of the trigger blocking member 354 is shown. In this exemplary embodiment, the body 360 of the trigger blocking member 354 acts as the blocker 364 described above. More specifically, the body 360 includes the one or more ribs 366, a first surface 360*a* that contacts the switch 356, a second surface 360*b* that contacts the pin 45 and a blocking surface 360*c*. With the button 352 and trigger blocking member 354 of the safety system 350 in the unlocked position, seen in FIG. 74, the one or more ribs 366 of the body 360 are positioned within the detent member 368, seen in FIG. 73, holding the button 352 and trigger blocking member 354 in the unlocked position. In this configuration, the blocking surface 360*c* is positioned away from the pin 45 extending from the second jaw plate 44. With the blocking surface 360*c* of the body 360 positioned in an unblocking position, the blocking surface 360*c* does not interfere with the movement of the pin 45. As a result, the blocking surface 360*c* does not interfere with the movement the second jaw assembly 40 from the fully open position to the hold position. In addition, with the button 352 in the unlocked position, the first surface 360*a* of the body 360 is in contact with the switch arm of the cutout switch 356 turning the cutout switch 356 "on." Turning the cutout switch "on" causes the control assembly (not shown) to enable the motor 700 to be activated by the trigger 202 as described herein. With the button 352 and trigger blocking member 354 of the safety system 350 in the locked position, seen in FIG. 75, the blocking surface 360*c* of the body 360 is positioned to block movement of the pin 45 extending from the second jaw plate 44. With the blocking surface 360*c* in a blocking position, the blocking surface 360*c* interferes with the movement of the pin 45, and thus interferes with the movement the second jaw assembly 40 from the fully open position to the hold position. In addition, with the button 352 and trigger blocking member 354 of the safety system 350 in the locked position, the first surface 360*a* of the body 360 is no longer in contact with the switch arm of the cutout switch 356. As a result, the cutout switch 356 is turned "off" Turning the cutout switch "off" causes the control assembly (not shown) to disable the motor 700 from being activated by the trigger 202. Further, when the button 352 and trigger blocking member 354 of the safety system 350 are in the unlocked position and the trigger 202 is articulated to move the second jaw assembly 40 toward the hold position, seen in FIG. 76, the second surface 360*b* of the body 360 contacts the pin 45 so that the pin moves along the surface 360*b* as the trigger 202 is moved. As a result, the surface 360*b* blocks the button 352 from being move to the locked position when the trigger 202 is moved.

Figure 80:
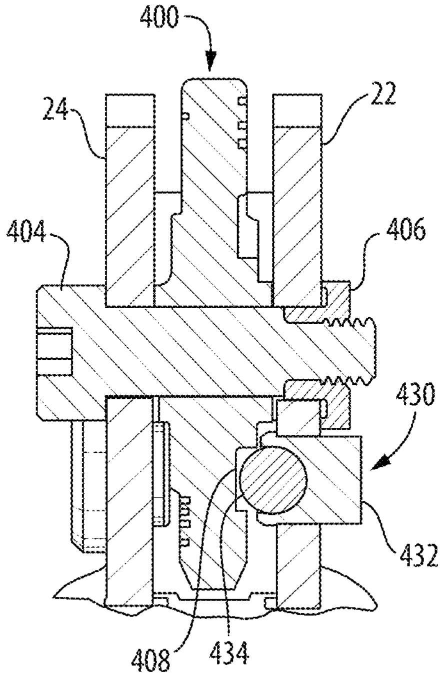
FIG. 80 is a cross-sectional view of the working head assembly of the battery-powered tool of FIG. 79 taken from line 80-80, illustrating a spring plunger mechanism used to lock the die wheel in position.
Figure 81:
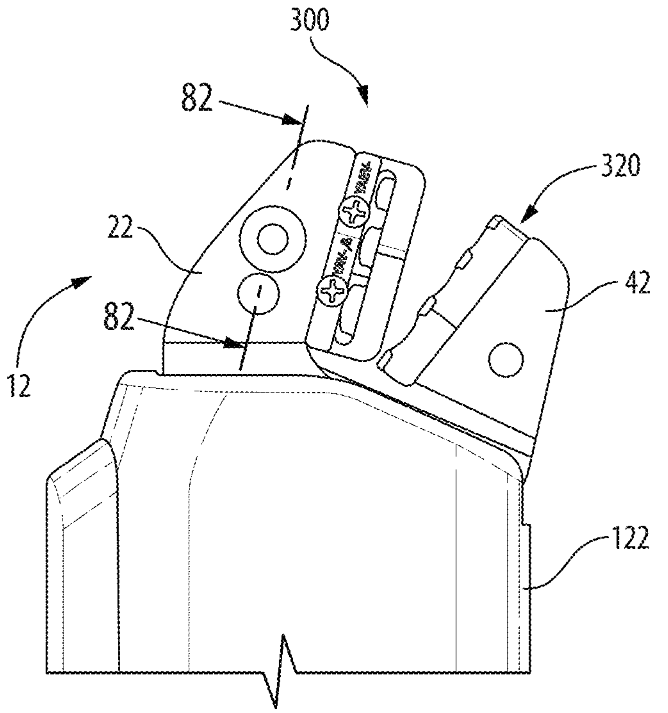
FIG. 81 is a side elevation of the working head assembly of the battery-powered tool of FIG. 79.
Figure 82:
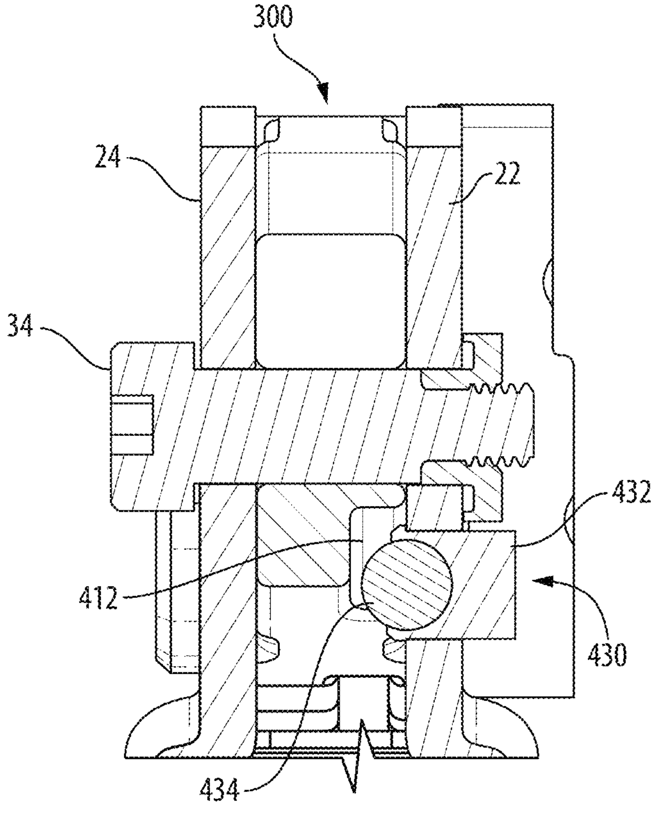
FIG. 82 is a cross-sectional view of the working head assembly of the battery-powered tool of FIG. 81 taken from line 82-82, illustrating the spring plunger mechanism when the die assembly of FIGS. 54 and 55 are used with the tool.
Figure 83:
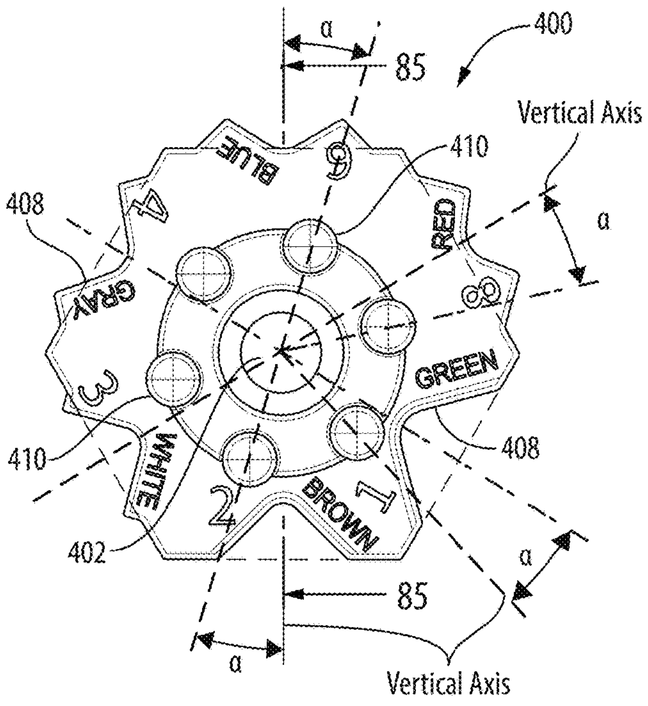
FIG. 83 is a side elevation view of a first side of the die wheel of FIG. 79, illustrating an angular relationship between detents forming part of the spring plunger mechanism positioned around an inner portion of the die wheel and impacting surfaces on the outer perimeter of the die wheel.
Figure 84:
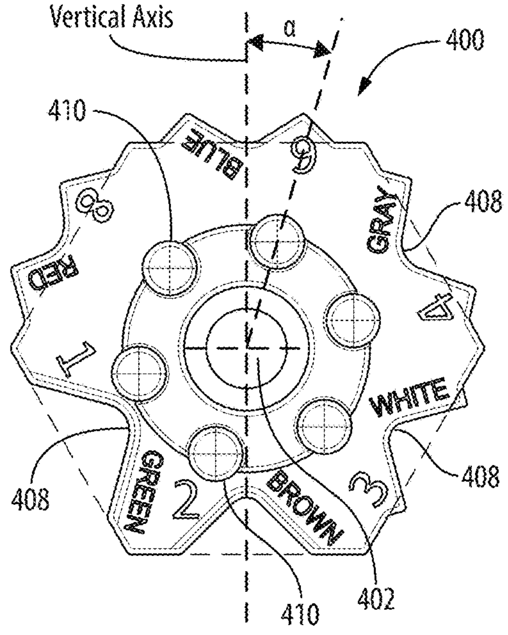
FIG. 84 is a side elevation view of a second side of the die wheel of FIG. 79, illustrating an angular relationship between detents forming part of the spring plunger mechanism positioned around an inner portion of the die wheel and impacting surfaces on the outer perimeter of the die wheel.
Figure 85:
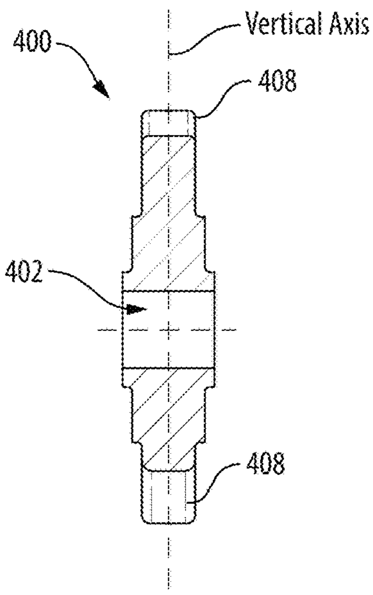
FIG. 85 is a cross-sectional view of the die wheel of FIG. 83 taken from line 85-85.
Figure 86:
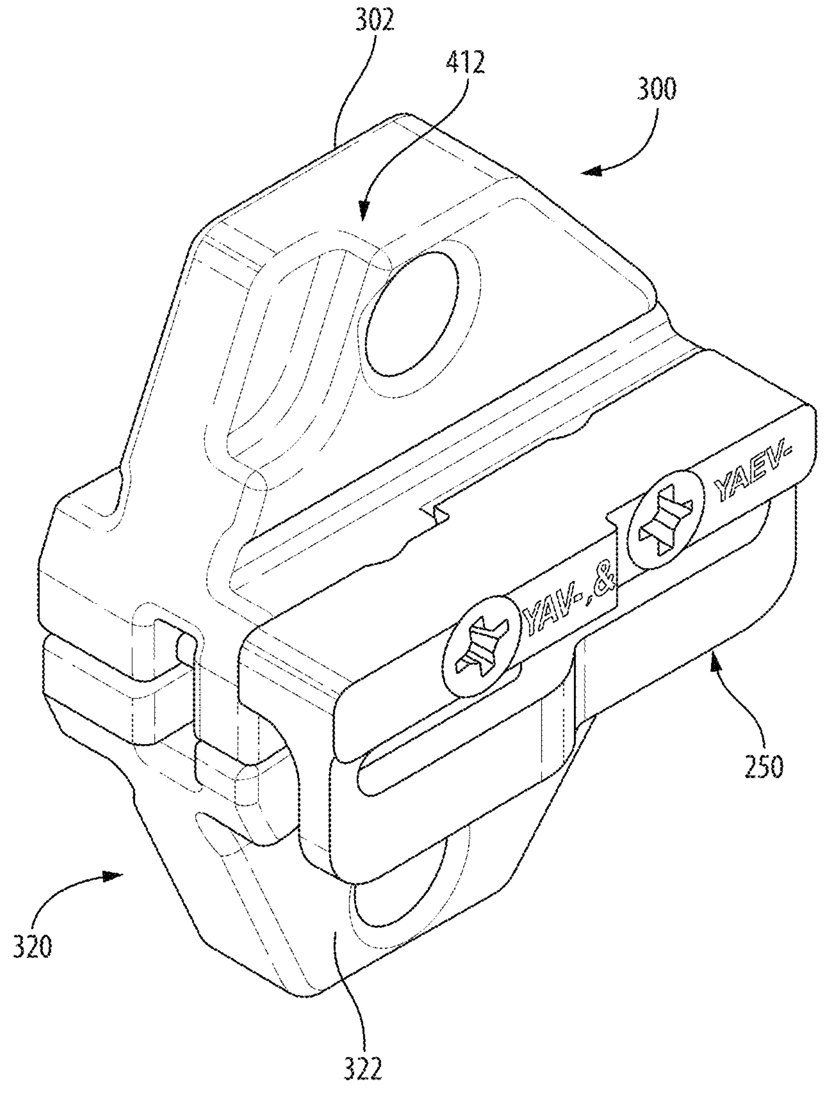
FIG. 86 is an end perspective view of the die assembly of FIG. 41, illustrating a recess in the flat die providing clearance for the spring plunger mechanism when the flat die is used with the battery-powered tool of FIG. 77.

Referring now to FIGS. 77-86, another exemplary embodiment of a battery-powered tool according to the present disclosure is shown. In this exemplary embodiment, the tool 10 is substantially similar to the embodiments of the tools described herein, except the working head assembly 12 of the tool 10 is adapted to work with different die assemblies. As a non-limiting example, one type of die assembly includes a die wheel and a nest, and another type of die assembly includes the flat dies of FIGS. 2 and 43. In the exemplary embodiment shown, the die assembly includes two dies. The first die 400 is a rotatable wheel die or die wheel and the second die 420 is a nest. The die wheel 400 includes a center mounting aperture 402 used for securing the die wheel 400 to the first jaw plate 22 and the second jaw plate 24 of the first jaw assembly 20 using a fastener 404 and a nut 406, as shown in FIG. 80. An outer perimeter of the die wheel 400 includes a plurality of impacting surfaces 408. Each impacting surface 408 is configured and dimensioned to impact a certain size and type of wire termination 800. In the exemplary embodiment shown in FIGS. 83 and 84, the impacting surfaces 408 are arranged around the perimeter of the die wheel 400 from a smallest size to a largest size designed to accommodate wire terminations 800 capable of receiving, for example 1-8 AWG wire. Each side of the die wheel 400 includes a plurality of detent holes 410 forming part of a detent mechanism 430, e.g., spring plunger mechanism. The detent mechanism 430 includes a housing 432 holding a spring loaded ball 434 that is configured to be at least partially received within the detent holes 410 and used to hold the die wheel 400 in a fixed position. The detent holes 410 are positioned around an inner portion of each side of the die wheel 400 near the mounting aperture 402 as shown in FIGS. 83 and 84. As noted, the detent holes 410 are aligned to interact with the spring loaded ball 434 of the detent mechanism 430 to hold the die wheel 400 in a fixed position until the die wheel is manually rotated with sufficient force to move the die wheel 400 to a new fixed position. The detent holes 410 are symmetrically positioned around the inner portion of each side of the die wheel 400 so that the same angular relationship "a" is between a center of each detent hole 410 and a corresponding vertical axis through a center of the mounting aperture 402 as shown in FIG. 83. The angle "a" may be, for example, in the range of about 0 degrees and about 60 degrees. By symmetrically positioning the detent holes 410 around the inner portion of each side of the die wheel 400, permits the die wheel 400 to be mounted into the first jaw assembly 20 with the sides of the die wheel facing either direction. The nest 420 includes a single impacting surface 422 that is configured and dimensioned to receive all of the sizes and type of wire terminations 800 that the die wheel 400 is configured to impact.

As noted above, the die wheel 400 and a nest 420 of FIGS. 77-79 may be changed for the flat dies of FIGS. 2 and 43. In order for the flat dies to work with the detent mechanism 430, the die 300, shown in FIG. 86, includes a notch 412 in which the ball 434 of the detent mechanism 430 can rest when the die 300 is mounted to the first jaw assembly 20.

The foregoing embodiments and advantages are merely exemplary and are not to be construed as limiting the scope of the present invention. The description of an exemplary embodiment of the present invention is intended to be illustrative, and not to limit the scope of the present invention. Various modification, alternatives and variations will be apparent to those of ordinary skill in the art and are intended to fall within the scope of the invention.

What is claimed is:

1. A multi-stage trigger assembly for moving a movable jaw of a two jaw, portable, hand-held, motorized tool, the multi-stage trigger assembly comprising:

a trigger having a pivot portion, a lever portion extending from a first end of the pivot portion and at least one leg extending from a second end of the pivot portion; and at least one switch attached to an interior of the tool so that the pivot portion of the trigger is in close proximity to the at least one switch;

wherein the pivot portion of the trigger is pivotably coupled to a portion of a second jaw of the two jaws of the tool such that when the lever portion of the trigger is manually articulated a first predefined distance, the at least one leg interacts with the movable jaw of the tool mechanically causing the movable jaw to move from a fully open position to a hold position, and when the lever portion of the trigger is manually articulated a second predefined distance, the switch is activated causing a motor in the tool to activate to electro-mechanically move the movable jaw from the hold position to an operation cycle position where an operation of the jaw assemblies is performed; and wherein the pivot portion of the trigger is normally biased away from the at least one switch while the lever portion of the trigger is manually articulated the first predefined distance, and wherein when the lever portion of the trigger is manually articulated the second predefined distance the biasing force is overcome permitting the trigger to activate the switch.

2. The multi-stage trigger assembly according to claim 1, wherein the pivot portion of the trigger is normally biased away from the at least one switch using at least one spring.

3. The multi-stage trigger assembly according to claim 2, wherein the at least one spring comprises two springs.

4. The multi-stage trigger assembly according to claim 1, wherein a pivot pin is inserted into a mounting aperture in the pivot portion of the trigger, and wherein at least a portion of the pivot pin activates the switch.

5. The multi-stage trigger assembly according to claim 1, wherein the at least one leg extending from a second end of the pivot portion comprises a pair of legs.

6. The multi-stage trigger assembly according to claim 1, further comprising a safety system configured to selectively block movement of the lever portion of the trigger to the first predefined distance.

7. The multi-stage trigger assembly according to claim 6, wherein the safety system comprises a button, a trigger blocking member and a cutout switch.

8. The multi-stage trigger assembly according to claim 7, wherein button is movable between an ON position and an OFF position, and wherein when the button is in the ON position the trigger blocking member blocks movement of the lever portion of the trigger to the first predefined distance and activates the cutout switch.

9. A portable, hand-held, motorized tool comprising:

a working head assembly having a fixed jaw assembly, a movable jaw assembly and a biasing member used to normally bias the movable jaw assembly in a direction away from the fixed jaw assembly to a fully open position;

a handle assembly; and a trigger assembly including:

a trigger having a pivot portion, a lever portion extending from a first end of the pivot portion and at least one leg extending from a second end of the pivot portion; and at least one switch attached to an interior of the handle assembly so that the pivot portion of the trigger is in close proximity to the at least one switch;

wherein the pivot portion of the trigger is pivotably coupled to a portion of a fixed jaw assembly such that when the lever portion of the trigger is manually articulated a first predefined distance, the at least one leg interacts with the second jaw assembly mechanically causing the movable jaw to move from the fully open position to a hold position, and when the lever portion of the trigger is manually articulated a second predefined distance, the switch is activated causing a motor in the handle assembly to activate so as to electro-mechanically move the movable jaw from the hold position to an operation cycle position where an operation of the jaw assemblies is performed; and wherein the pivot portion of the trigger is normally biased away from the at least one switch while the lever portion of the trigger is manually articulated the first predefined distance, and wherein when the lever portion of the trigger is manually articulated the second predefined distance the biasing force is overcome permitting the trigger to activate the switch.

10. The multi-stage trigger assembly according to claim 9, wherein the pivot portion of the trigger is normally biased away from the at least one switch using at least one spring.

11. The multi-stage trigger assembly according to claim 10, wherein the at least one spring comprises two springs.

12. The multi-stage trigger assembly according to claim 9, wherein a pivot pin is inserted into a mounting aperture in the pivot portion of the trigger, and wherein at least a portion of the pivot pin activates the switch.

13. The multi-stage trigger assembly according to claim 9, wherein the at least one leg extending from a second end of the pivot portion comprises a pair of legs.

14. The multi-stage trigger assembly according to claim 9, further comprising a safety system configured to selectively blocks movement of the lever portion of the trigger to the first predefined distance.

15. The multi-stage trigger assembly according to claim 14, wherein the safety system comprises a button, a trigger blocking member and a cutout switch.

16. The multi-stage trigger assembly according to claim 15, wherein the button is movable between an ON position and an OFF position, and wherein when the button is in the ON position the trigger blocking member block movement of the lever portion of the trigger to the first predefined distance and activates the cutout switch.

* * * * *